US011593658B2

(12) United States Patent
Liu et al.

(10) Patent No.: US 11,593,658 B2
(45) Date of Patent: Feb. 28, 2023

(54) PROCESSING METHOD AND DEVICE

(71) Applicant: Shanghai Cambricon Information Technology Co., Ltd, Pudong New Area (CN)

(72) Inventors: Shaoli Liu, Pudong New Area (CN);
Xuda Zhou, Pudong New Area (CN);
Zidong Du, Pudong New Area (CN);
Daofu Liu, Pudong New Area (CN)

(73) Assignee: SHANGHAI CAMBRICON INFORMATION TECHNOLOGY CO., LTD, Pudong New Area (CN)

( * ) Notice: Subject to any disclaimer, the term of this patent is extended or adjusted under 35 U.S.C. 154(b) by 358 days.

(21) Appl. No.: 16/482,710

(22) PCT Filed: Jul. 13, 2018

(86) PCT No.: PCT/CN2018/095548
§ 371 (c)(1),
(2) Date: Jul. 31, 2019

(87) PCT Pub. No.: WO2019/076095
PCT Pub. Date: Apr. 25, 2019

(65) Prior Publication Data
US 2020/0250539 A1 Aug. 6, 2020

(30) Foreign Application Priority Data

Oct. 20, 2017 (CN) .......................... 201710989575.4
Oct. 24, 2017 (CN) .......................... 201711004974.7
Oct. 24, 2017 (CN) .......................... 201711061069.5
Oct. 29, 2017 (CN) .......................... 201711029543.6
Oct. 29, 2017 (CN) .......................... 201711118938.3
Dec. 7, 2017 (CN) .......................... 201711289667.8

(51) Int. Cl.
*G06N 3/08* (2006.01)
*G06N 20/10* (2019.01)
*G06K 9/62* (2022.01)
*G06N 5/04* (2006.01)
*G06N 3/084* (2023.01)
*G06N 5/046* (2023.01)

(52) U.S. Cl.
CPC .......... *G06N 3/084* (2013.01); *G06K 9/6223* (2013.01); *G06N 5/046* (2013.01); *G06N 20/10* (2019.01)

(58) Field of Classification Search
None
See application file for complete search history.

(56) References Cited

U.S. PATENT DOCUMENTS

| 5,768,179 | A | 6/1998 | Hart | |
| 10,140,574 | B2* | 11/2018 | Henry | G06N 3/04 |
| 10,949,766 | B2* | 3/2021 | Akerib | G06N 3/08 |
| 11,074,072 | B2* | 7/2021 | Nealis | G06F 7/5443 |
| 2010/0296746 | A1* | 11/2010 | Strom | G06T 9/00 |
| | | | | 382/233 |
| 2011/0066580 | A1* | 3/2011 | Tsai | G06N 3/08 |
| | | | | 706/25 |
| 2014/0198950 | A1 | 7/2014 | Tanaka et al. | |
| 2015/0170021 | A1 | 6/2015 | Lupon et al. | |
| 2015/0180482 | A1 | 6/2015 | Bourstein et al. | |
| 2017/0031430 | A1 | 2/2017 | Ansorregui et al. | |
| 2017/0147053 | A1 | 5/2017 | Chang | |
| 2019/0200904 | A1* | 7/2019 | Gupta | A61B 5/1455 |

FOREIGN PATENT DOCUMENTS

| CN | 105512723 | A | 4/2016 |
| CN | 105512723 | A | 4/2016 |
| CN | 106296692 | A | 1/2017 |
| CN | 107229598 | A | 10/2017 |
| CN | 107257958 | A | 10/2017 |
| DE | 102105007943 | A1 | 1/2016 |
| EP | 3153999 | A2 | 4/2017 |
| EP | 3153999 | A3 | 7/2017 |
| WO | 2017123334 | A1 | 7/2017 |

OTHER PUBLICATIONS

Graves, Alex, "Generating Sequences With Recurrent Neural Networks," Univ. Toronto, 2014, 43pg. (Year: 2014).*
Razlighi et al., "LookNN: Neural Network with No Multiplication," IEEE, 2017, 6pg. (Year: 2017).*
CN 201711061069.5—First Office Action, dated Jun. 3, 2020, 14 pages. (no English translation).
CN 201711004974.7—First Office Action, dated Jul. 28, 2020, 15 pages. (no English translation).
Razlighi, et al., "LookNN: Neural Network with No Multiplication", IEEE, 2017, 7 pages.
Han, et al., "A Deep Neural Network Compression Pipeline: Pruning, Quantization, Huffman Encoding", arXiv, Oct. 1, 2015, 11 pages.
CN 201710989575.4—Second Office Action, dated Jul. 1, 2020, 3 pages. (no English translation).
PCT/CN2018/095548—International Search Report, dated Sep. 29, 2018, 9 pages. (no English translation).
EP 18868807.1—Extended European Search Report, dated Jul. 8, 2020, 9 pages.
EP 18868807.1—Response to the Invitation to File Search Results Pursuant to Rule 70b(1) EPC dated Apr. 2, 2021, filed Feb. 18, 2021, 14 pages.
EP 18868807.1—Invitation to File Search Results Pursuant to Rule 70b(1) EPC, dated Apr. 2, 2021, 2 pages.

(Continued)

Primary Examiner — Ryan D. Coyer
(74) Attorney, Agent, or Firm — Getech Law LLC; Jun Ye

(57) ABSTRACT

The application provides a processing method and device. Weights and input neurons are quantized respectively, and a weight dictionary, a weight codebook, a neuron dictionary, and a neuron codebook are determined. A computational codebook is determined according to the weight codebook and the neuron codebook. Meanwhile, according to the application, the computational codebook is determined according to two types of quantized data, and the two types of quantized data are combined, which facilitates data processing.

22 Claims, 18 Drawing Sheets

(56) References Cited

OTHER PUBLICATIONS

EP 19215859.0—Extended European Search Report, dated Apr. 29, 2020, 9 pages.
EP 19215860.8—Extended European Search Report, dated Apr. 14, 2020, 16 pages.
Oh, et al., "A 320 mW 342 GOPS Real-Time Dynamic Object Recognition Processor for HD 720p Video Streams", IEEE Journal of Solid-State Circuits, vol. 48, No. 1, Jan. 2013, 13 pages.
Illig, et al, "Two-Dimensional Convolution on the SCC", Many-Core Architecture Research Community Symposium, Oct. 18, 2013, 7 pages.
Mei, et al., "Energy Efficient Real-Time Task Scheduling on CPU-GPU Hybrid Clusters", IEEE INFOCOM 2017, 9 pages.
CN 201711289667.8—Office Action, dated Jun. 3, 2020, 18 pages. (no English translation).
Feng, et al., "Applicatin of Neural Network in Image Processing", Information and Control, vol. 32, No. 4, Aug. 2003, 8 pages.
Sampson et al., Approximate Storage in Solid-State Memories, MICRO'46, Dec. 2013, Davis, CA, USA; ACM 978-I-4503-2638; 3 pages.
CN201110989575.4, Official Action dated Jan. 3, 2020, 11 pages. (No English translation).
XDUP269400, vol. 1, "Digital System Design Basics"; 8.2 Volatile Memory; May 2010, 9 pages.
EP 18 868 807.1—Communication pursuant to Article 94(3) EPC, dated Apr. 9, 2021, 7 pages.
EP 19 215 859.0—Communication pursuant to Article 94(3) EPC, dated Oct. 29, 2021, 7 pages.
EP 19 215 860.8—Communication pursuant to Article 94(3) EPC, dated Oct. 22, 2021, 12 pages.
Zhang Shijin et al; "Cambricon-X: An accelerator for sparse neural networks", 2016 49th Annual IEEE/ACM International Symposium On Microarchitecture (MICRO), IEEE, Oct. 15, 2016, 12 pages.
Li Da et al; "Evaluating the Energy Efficiency of Deep Convolutional Neural Networks on CPUs and GPUs", 2016 IEEE International Conferences On Big Data and Cloud Computing (BDCLOUD), IEEE, Oct. 8, 2016, 8 pages.
Kang Sanghoon et al; "A 0.53mW ultra-low-power 3D face frontalization processor for face recognition with human-level accuracy in wearable devices", 2017 IEEE International Symposium On Circuits and Systems (ISCAS), IEEE, May 28, 2020; 4 pages.
Razlighi Mohammad Samragh et al; "LookNN: Neural network with no multiplication", Design, Automation & Test in Europe Conference & Exhibition 2017, EDAA, Mar. 27, 2020; 6 pages.
EP19215829; European Search Report dated Apr. 20, 2020; 9 pages.
EP19215858; European Search Report dated May 15, 2020; 13 pages.
EP 19215858.2—Communication pursuant to Article 94(3) EPC, dated Apr. 21, 2022, 12 pages.
KR 1020197023878 Office Action, dated Feb. 9, 2022, 13 pages, (With English translation).
KR 1020197037566 Office Action, dated Feb. 11, 2022, 12 pages, (With English translation).
KR 1020197037574 Office Action, dated Feb. 21, 2022, 22 pages, (With English translation).
Zhang et al., "Cambricon-X: An Accelerator for Sparse Neural Networks," IEEE, 2016, 12 pages.

* cited by examiner

PROCESSING METHOD AND DEVICE

TECHNICAL FIELD

The disclosure relates to the field of data processing, and particularly to a processing method, a processing device, a computation method, and a computation device.

BACKGROUND

Neural networks have been successfully applied. However, lots of parameters and large-scale computation of a neural network become a huge challenge to neural network application. On one hand, lots of parameters make a very high requirement on a storage capacity, and also result in high memory access energy consumption. On the other hand, large-scale computation makes a very high requirement on design of a computation unit, and also results in high computation energy consumption. Therefore, how to reduce parameters and amount of computation in a neural network becomes a problem urgently to be solved.

SUMMARY

The application is intended to provide a processing method and device and a computation method and device, so as to solve at least one of the above-mentioned technical problems.

An aspect of the application may provide a processing method including:

quantifying weights and input neurons respectively, and a weight dictionary, a weight codebook, a neuron dictionary, and a neuron codebook are determined; and determining a computational codebook according to the weight codebook and the neuron codebook.

In one of embodiments of the application, quantifying the weights may include the following:

grouping the weights, adopting a clustering algorithm to perform a clustering operation on the weights of each group to divide the weights of each group into m types, in which m may indicate a positive integer and the weights of each type correspond to a weight index, and determining the weight dictionary, where the weight dictionary may include weight positions and weight indices, and the weight positions refer to positions of the weights in a neural network structure; and replacing all the weights of each type with a central weight, and determining the weight codebook, where the weight codebook may include the weight indices and the central weights.

An embodiment of the application, quantifying the input neurons may include the following:

dividing the input neurons into p segments, where each segment of the input neurons corresponds to a neuron range and a neuron index, and determining the neuron dictionary, where p is a positive integer; and coding the input neurons, replacing all the input neurons of each segment with a central neuron, and determining the neuron codebook.

An embodiment of the application, determining the computational codebook may include the following:

determining the corresponding weight indices in the weight codebook according to the weights, and determining the central weights corresponding to the weights through the weight indices;

determining the corresponding neuron indices in the neuron codebook according to the input neurons, and determining the central neurons corresponding to the input neurons through the neuron indices; and performing a computational operation on the central weights and the central neurons to obtain computational results, and combining the computational results into a matrix, such that the computational codebook is determined.

An embodiment of the application, the computational operation may include at least one of: addition, multiplication, and pooling, where pooling may include average pooling, maximum pooling, and median pooling.

An embodiment of the application, the method further may include the following: retraining the weights and the input neurons, and only retraining the weight codebook and the neuron codebook, keeping contents in the weight dictionary and the neuron dictionary unchanged, and adopting a back propagation algorithm for retraining.

An embodiment of the application, grouping the weights may include the following:

dividing into a group: dividing all the weights in a neural network into a group;

layer-type-based grouping: dividing the weights of all convolutional layers, the weights of all fully connected layers, and the weights of all long short-term memory (LSTM) network layers in the neural network each into a group respectively;

interlayer grouping: dividing the weights of one or more convolutional layers, the weights of one or more fully connected layers, and the weights of one or more LSTM network layers in the neural network into a group respectively; and intra-layer grouping: segmenting the weights in a layer of the neural network, and dividing each segmented part into a group.

An embodiment of the application, the clustering algorithm may include K-means, K-medoids, Clara, and/or Clarans.

An embodiment of the application, a selection method for the central weight corresponding to each type may include: determining a value of $W_0$ if a cost function $J(w, w_0)$ is minimum, in which the value of $W_0$ may be the central weight, where $$J(w, w_0) = \sum_{i=1}^{n} (w_i - w_0)^2,$$

$J(w, w_0)$ is the cost function, W refers to all the weights of the type, $W_0$ is the central weight, n is the count of all the weights of the type, W is the $i^{th}$ weight of the type, $1 \le i \le n$ and i is a positive integer.

Another aspect of the application disclosure provides a processing device including:

a memory configured to store an operation instruction; and a processor configured to perform the operation instruction stored in the memory, where the operation instruction is performed for operations according to the abovementioned processing method.

An embodiment of the application, the operation instruction is a binary number and may include an operation code and an address code, the operation code indicates an operation to be performed by the processor, and the address code indicates an address of data participating in the operation and read by the processor from the memory.

Another aspect of the application provides a computation device including:

an instruction control unit configured to decode a received instruction and generate lookup control information; and a lookup table unit configured to look output neurons up in a computational codebook according to the lookup control information, a weight dictionary, a neuron dictionary, weights, and input neurons.

An embodiment of the application, the weight dictionary may include weight positions and weight indices; the neuron dictionary may include the input neurons and neuron indices; the computational codebook may include the weight indices, the neuron indices, and computational results of the input neurons and the weights.

An embodiment of the application, the computation device may also include:

a preprocessing unit configured to preprocess input information which is externally input to obtain the weights, the input neurons, the instruction, the weight dictionary, the neuron dictionary, and the computational codebook;

a storage unit configured to store the input neurons, the weights, the weight dictionary, the neuron dictionary, the computational codebook, and the instruction and to receive the output neurons;

a cache unit configured to cache the instruction, the input neurons, the weights, the weight indices, the neuron indices, and the output neurons; and a direct memory access (DMA) configured to read and write data or instructions between the storage unit and the cache unit.

An embodiment of the application, the cache unit may include:

an instruction cache configured to cache the instruction and output the cached instruction to the instruction control unit;

a weight cache configured to cache the weights;

an input neuron cache configured to cache the input neurons; and an output neuron cache configured to cache the output neurons output by the lookup table unit.

An embodiment of the application, the cache unit may also include:

a weight index cache configured to cache the weight indices; and a neuron index cache configured to cache the neuron indices.

An embodiment of the application, if the input information which is externally input is preprocessed, the preprocessing unit may be configured for segmentation, Gaussian filtering, binarization, regularization, and/or normalization.

An embodiment of the application, the lookup table unit may include:

a multiplication lookup table configured to perform a table lookup operation mult_lookup, according to an input weight index in1 and an neuron index in2, through the multiplication lookup table to complete a multiplication operation over a central weight data1 corresponding to the weight index and a central neuron data2 corresponding to the neuron index, for example, the multiplication lookup table performs a table lookup operation out=mult_lookup (in1,in2) to realize a multiplication function out=data1*data2; and/or an addition lookup table configured to perform a table lookup operation add_lookup through a step-by-step addition lookup table according to an input index in to complete an addition operation over central data data corresponding to the index, where in and data are vectors with lengths of N and N is a positive integer, for example, the addition lookup table performs a table lookup operation out=add_lookup(in) to realize an addition function out=data[1]+data [2]+ . . . +data[N]; and/or to perform a table lookup operation on the input weight index in1 and the neuron index in2 through the addition lookup table to complete an addition operation over a central weight data1 corresponding to the weight index and a central neuron data2 corresponding to the neuron index, for example, the addition lookup table performs a table lookup operation out=add_lookup(in1,in2) to realize an addition function out=data1+data2; and/or a pooling lookup table configured to perform a pooling operation on the central data data corresponding to the input index in, for example, the pooling lookup table performs a table lookup operation out=pool lookup(in) to complete a pooling operation out=pool(data), where the pooling operation may include average pooling, maximum pooling, and median pooling.

An embodiment of the application, the instruction is a neural network-dedicated instruction, and the neural network-dedicated instruction may include:

a control instruction configured to control a neural network performing process;

a data transfer instruction configured to complete data transfer between different storage media, a data format including a matrix, a vector, and a scalar;

a operation instruction configured to complete arithmetic computation of the neural network and including a matrix operation instruction, a vector operation instruction, a scalar operation instruction, a convolutional neural network operation instruction, a fully connected neural network operation instruction, a pooling neural network operation instruction, a Restricted Boltzmann Machine (RBM) neural network operation instruction, a Local Response Normalization (LRN) neural network operation instruction, a Local Contrast Normalization (LCN) neural network operation instruction, an LSTM neural network operation instruction, a Recurrent Neural Networks (RNN) operation instruction, a rectified linear unit (ReLU) neural network operation instruction, a parametric rectified linear unit (PReLU) neural network operation instruction, a sigmoid neural network operation instruction, a tanh neural network operation instruction, and a maxout neural network operation instruction; and a logical instruction including a vector logical operation instruction and a scalar logical operation instruction configured to complete logical operation of the neural network.

An embodiment of the application, the neural network-dedicated instruction may include at least one Cambricon instruction which may include an operation code and an operand, and the Cambricon instruction may include:

a Cambricon control instruction configured to control the neural network performing process, the Cambricon control instruction including a jump instruction and a conditional branch instruction;

a Cambricon data transfer instruction configured to complete data transfer between different storage media, including a load instruction, a store instruction, and a move instruction, where the load instruction may be configured to load data from a main memory to a cache, the store instruction may be configured to store the data from the cache to the main memory, and the move instruction may be configured to move the data between the cache and another cache, the cache and a register, or the register and another register;

a Cambricon operation instruction configured to complete the arithmetic computation of the neural network, including a Cambricon matrix operation instruction, a Cambricon vector operation instruction, and a Cambricon scalar operation instruction, where the Cambricon matrix operation instruction may be configured to complete matrix computation in the neural network, including matrix multiply vector computation, vector multiply matrix computation, matrix multiply scalar computation, outer product computation, matrix add matrix computation, and matrix subtract matrix computation, the Cambricon vector operation instruction may be configured to complete vector computation in the neural network, including vector basic operations, vector transcendental functions computation, dot product computation, random vector generator computation, and computation of maximum/minimum of a vector, and the Cambricon scalar operation instruction may be configured to complete scalar computation in the neural network, including scalar basic operations, and scalar transcendental functions computation; and a Cambricon logical instruction configured for the logical operation of the neural network, including a Cambricon vector logical operation instruction and a Cambricon scalar logical operation instruction, where the Cambricon vector logical operation instruction may be configured for vector compare computation, vector logical operations, and vector greater than merge computation, in which the vector logical operations may include AND, OR, and NOT; and the Cambricon scalar logical operation instruction may be configured for scalar compare computation and scalar logical operations.

An embodiment of the application, the Cambricon data transfer instruction may support one or more of the following data organization manners: the matrix, the vector, and the scalar; the vector basic operations may include vector addition, subtraction, multiplication, and division; the vector transcendental functions refer to functions which do not meet any polynomial equations taking polynomials as coefficients, and include an exponential function, a logarithmic function, a trigonometric function, and an anti-trigonometric function; the scalar basic operations include scalar addition, subtraction, multiplication, and division; the scalar transcendental functions refer to functions which do not meet any polynomial equations taking polynomials as coefficients, and include an exponential function, a logarithmic function, a trigonometric function, and an anti-trigonometric function; the vector compare computation may include greater than, smaller than, equal to, more than or equal to, less than or equal to, and unequal to; the vector logical operations include AND, OR, and NOT; the scalar compare computation may include greater than, smaller than, equal to, more than or equal to, less than or equal to, and unequal to; the scalar logical operations include AND, OR, and NOT.

Another aspect of the application provides another computation method, which may include:

receiving weights, input neurons, an instruction, a weight dictionary, a neuron dictionary, and a computational codebook;

decoding the instruction, and determining lookup control information; and looking up output neurons in the computational codebook according to the lookup control information, the weights, the weight dictionary, the neuron dictionary, and the input neurons.

An embodiment of the application, the weight dictionary may include weight positions and weight indices; the neuron dictionary may include the input neurons and neuron indices; and the computational codebook may include the weight indices, the neuron indices, and computational results of the weights and the input neurons.

An embodiment of the application, looking up the output neurons in the computational codebook according to the lookup control information, the weights, the weight dictionary, the neuron dictionary, and the input neurons may include the following:

determining the neuron ranges, according to the weights, the input neurons, the weight dictionary, and the neuron dictionary, to determine the neuron indices in the neuron dictionary, and determining the weight positions to determine the weight indices in the weight dictionary; and looking up the computational results in the computational codebook according to the weight indices and the neuron indices to determine the output neurons.

An embodiment of the application, the computational results include a result of at least one of the following computational operations: addition, multiplication, and pooling, where pooling may include average pooling, maximum pooling, and median pooling.

An embodiment of the application, before receiving the weights, the input neurons, the instruction, the weight dictionary, the neuron dictionary, and the computational codebook, the method may also include the following: preprocessing an input information which is externally input to obtain the weights, the input neurons, the instruction, the weight dictionary, the neuron dictionary, and the computational codebook; and after receiving the weights, the input neurons, the instruction, the weight dictionary, the neuron dictionary, and the computational codebook, the method may also include the following: storing the weights, the input neurons, the instruction, the weight dictionary, the neuron dictionary, and the computational codebook, receiving the output neurons, and caching the instruction, the input neurons, the weights, and the output neurons.

An embodiment of the application, after receiving the weights, the input neurons, the instruction, the weight dictionary, the neuron dictionary, and the computational codebook, the method may further include the following: caching the weight indices and the neuron indices.

An embodiment of the application, preprocessing may include segmentation, Gaussian filtering, binarization, regularization, and/or normalization.

An embodiment of the application, the instruction is a neural network-dedicated instruction, and the neural network-dedicated instruction may include:

a control instruction configured to control a neural network performing process;

a data transfer instruction configured to complete data transfer between different storage media, in which the data format of data may include a matrix, a vector, and a scalar;

a operation instruction configured to complete arithmetic computation of the neural network and including a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a sigmoid neural network operation instruction, a tanh neural network operation instruction, and a maxout neural network operation instruction; and a logical instruction configured to complete logical operation of the neural network and including a vector logical operation instruction and a scalar logical operation instruction.

An embodiment of the application, the neural network-dedicated instruction may include at least one Cambricon instruction, the Cambricon instruction may include an operation code and an operand, and the Cambricon instruction may include:

a Cambricon control instruction configured to control the neural network performing process, the Cambricon control instruction including a jump instruction and a conditional branch instruction;

a Cambricon data transfer instruction configured to complete data transfer between different storage media and including a load instruction, a store instruction, and a move instruction, where the load instruction may be configured to load data from a main memory to a cache, the store instruction may be configured to store the data from the cache to the main memory, and the move instruction may be configured to move the data between the cache and another cache, the cache and a register, or the register and another register;

a Cambricon operation instruction configured to complete the arithmetic computation of the neural network and including a Cambricon matrix operation instruction, a Cambricon vector operation instruction, and a Cambricon scalar operation instruction, where the Cambricon matrix operation instruction may be configured to complete matrix computation in the neural network, including matrix multiply vector computation, vector multiply matrix computation, matrix multiply scalar computation, outer product computation, matrix add matrix computation and matrix subtract matrix computation, the Cambricon vector operation instruction may be configured to complete vector computation in the neural network, including vector basic operations, vector transcendental functions computation, dot product computation, random vector generator computation, and computation of maximum/minimum of a vector, and the Cambricon scalar operation instruction may be configured to complete scalar computation in the neural network, including scalar basic operations, and scalar transcendental functions; and a Cambricon logical instruction configured for the logical operation of the neural network, the Cambricon logical instruction including a Cambricon vector logical operation instruction and a Cambricon scalar logical operation instruction, where the Cambricon vector logical operation instruction may be configured for vector compare computation, vector logical operations, and vector greater than merge computation, in which the vector logical operations include AND, OR, and NOT, the Cambricon scalar logical operation instruction may be configured for scalar compare computation and scalar logical operations.

An embodiment of the application, the Cambricon data transfer instruction supports one or more of the following data organization manners: the matrix, the vector, and the scalar; the vector basic operations may include vector addition, subtraction, multiplication, and division; the vector transcendental functions refer to functions which do not meet any polynomial equations taking polynomials as coefficients, and include an exponential function, a logarithmic function, a trigonometric function, and an anti-trigonometric function; the scalar basic operations may include scalar addition, subtraction, multiplication, and division; the scalar transcendental functions refer to functions which do not meet any polynomial equations taking polynomials as coefficients, and include an exponential function, a logarithmic function, a trigonometric function, and an anti-trigonometric function; the vector compare computation may include greater than, smaller than, equal to, more than or equal to, less than or equal to, and unequal to; the vector logical operations include AND, OR, and NOT; the scalar compare computation may include greater than, smaller than, equal to, more than or equal to, less than or equal to, and unequal to; the scalar logical operations include AND, OR, and NOT.

Another aspect of the application provides another computation device, which may include:

an instruction control unit configured to decode a received instruction and generate lookup control information; and a lookup table unit configured to look output neurons up in a computational codebook according to the lookup control information and a received weight dictionary, neuron dictionary, computational codebook, weights, and input neurons.

An embodiment of the application, the weight dictionary may include weight positions and weight indices; the neuron dictionary may include the input neurons and neuron indices; and the computational codebook may include the weight indices, the neuron indices, and computational results of the input neurons and the weights.

An embodiment of the application, the computation device may further include:

a preprocessing unit configured to preprocess input information which is externally input to obtain the weights, the input neurons, the instruction, the weight dictionary, the neuron dictionary, and the computational codebook;

a storage unit configured to store the input neurons, the weights, the weight dictionary, the neuron dictionary, the computational codebook, and the instruction and to receive the output neurons;

a cache unit configured to cache the instruction, the input neurons, the weights, the weight indices, the neuron indices, and the output neurons; and a DMA configured to read and write data or instructions between the storage unit and the cache unit.

An embodiment of the application, the cache unit may include:

an instruction cache configured to cache the instruction and output the cached instruction to the instruction control unit;

a weight cache configured to cache the weights;

an input neuron cache unit configured to cache the input neurons; and an output neuron cache configured to cache the output neurons output by the lookup table unit.

An embodiment of the application, the cache unit may further include:

a weight index cache configured to cache the weight indices; and a neuron index cache configured to cache the neuron indices.

An embodiment of the application, the preprocessing unit preprocessing the input information which is externally input may include segmentation, Gaussian filtering, binarization, regularization, and/or normalization.

An embodiment of the application, the lookup table unit may include:

a multiplication lookup table configured to input a weight index in1 and a neuron index in2, and complete a multiplication operation on a central weight data1 corresponding to the weight index and a central neuron data2 corresponding to the neuron index through the table lookup operation mult_lookup, for example, the multiplication lookup table uses the table lookup operation out=mult_lookup(in1, in2) to complete the multiplication function out=data1*data2; and/or an addition lookup table configured to perform a table lookup operation add_lookup through a step-by-step addition lookup table according to an input index in to complete an addition operation on central data data corresponding to the index, where in and data are vectors with lengths of N and N is a positive integer, for example, the addition lookup table performs a table lookup operation out=add_lookup(in) to complete an addition function out=data[1]+data[2]+ . . . +data[N]; and/or perform a table lookup operation on the input weight index in1 and the neuron index in2 through the addition lookup table to complete an addition operation on a central weight data1 corresponding to the weight index and a central neuron data2 corresponding to the neuron index, for example, the addition lookup table performs a table lookup operation out=add_lookup(in1,in2) to complete an addition function out=data1+data2; and/or a pooling lookup table configured to perform a pooling operation on the central data data corresponding to the input index, for example, the pooling lookup table performs a table lookup operation out=pool lookup(in) to complete a pooling operation out=pool(data), where the pooling operation may include average pooling, maximum pooling, and median pooling.

An embodiment of the application, the instruction is a neural network-dedicated instruction, and the neural network-dedicated instruction may include:

a control instruction configured to control a neural network performing process;

a data transfer instruction configured to complete data transfer between different storage media, a data format including a matrix, a vector, and a scalar;

an operation instruction configured to complete arithmetic computation of a neural network and including a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a sigmoid neural network operation instruction, a tanh neural network operation instruction, and a maxout neural network operation instruction; and a logical instruction configured to complete logical operation of the neural network including a vector logical operation instruction and a scalar logical operation instruction.

An embodiment of the application, the neural network-dedicated instruction may include at least one Cambricon instruction, the Cambricon instruction may include an operation code and an operand, and the Cambricon instruction may include:

a Cambricon control instruction configured to control the performing process, the Cambricon control instruction including a jump instruction and a conditional branch instruction;

a Cambricon data transfer instruction configured to complete data transfer between different storage media, including a load instruction, a store instruction, and a move instruction, where the load instruction may be configured to load data from a main memory to a cache, the store instruction may be configured to store the data from the cache to the main memory, and the move instruction may be configured to move the data between the cache and another cache, the cache and a register, or the register and another register;

a Cambricon operation instructionoperation instruction configured to complete the arithmetic computation of the neural network and including a Cambricon matrix operation instruction, a Cambricon vector operation instruction, and a Cambricon scalar operation instruction, where the Cambricon matrix operation instruction may be configured to complete matrix computation in the neural network, including matrix multiply vector computation, vector multiply matrix computation, matrix multiply scalar computation, outer product computation, matrix add matrix computation, and matrix subtract matrix computation, the Cambricon vector operation instruction may be configured to complete vector computation in the neural network, including vector basic operations, vector transcendental functions computation, dot product computation, random vector generator computation, and computation of maximum/minimum of a vector, and the Cambricon scalar operation instruction may be configured to complete scalar computation in the neural network, including scalar basic operations, and scalar transcendental functions computation; and a Cambricon logical instruction configured for the logical operation of the neural network, the Cambricon logical instruction including a Cambricon vector logical operation instruction and a Cambricon scalar logical operation instruction, where the Cambricon vector logical operation instruction may be configured for vector compare computation, vector logical operations, and vector greater than merge computation, in which the vector logical operations include AND, OR, and NOT, the Cambricon scalar logical operation instruction may be configured for scalar compare computation and scalar logical operations.

An embodiment of the application, the Cambricon data transfer instruction supports one or more of the following data organization manners: the matrix, the vector, and the scalar; the vector basic operations may include vector addition, subtraction, multiplication, and division; the vector transcendental functions refer to functions which do not meet any polynomial equations taking polynomials as coefficients, and include an exponential function, a logarithmic function, a trigonometric function, and an anti-trigonometric function; the scalar basic operations may include scalar addition, subtraction, multiplication, and division; the scalar transcendental functions refer to functions which do not meet any polynomial equations taking polynomials as coefficients, and include an exponential function, a logarithmic function, a trigonometric function, and an anti-trigonometric function; the vector compare computation may include greater than, smaller than, equal to, more than or equal to, less than or equal to, and unequal to; the vector logical operations include AND, OR, and NOT; the scalar compare computation may include greater than, smaller than, equal to, more than or equal to, less than or equal to, and unequal to; the scalar logical operations include AND, OR, and NOT.

Another aspect of the application provides another processing method, which may include:

receiving weights, input neurons, an instruction, a weight dictionary, a neuron dictionary, and a computational codebook;

decoding the instruction, and determining lookup control information is; and looking up output neurons in the computational codebook according to the lookup control information, the weights, the weight dictionary, the neuron dictionary, and the input neurons.

An embodiment of the application, the weight dictionary may include weight positions and weight indices; the neuron dictionary may include the input neurons and neuron indices; and the computational codebook may include the weight indices, the neuron indices, and computational results of the weights and the input neurons.

An embodiment of the application, looking up the output neurons in the computational codebook according to the lookup control information, the weights, and the input neurons may include the following:

determining the neuron ranges, according to the weights, the input neurons, the weight dictionary, and the neuron dictionary, to determine the neuron indices in the neuron dictionary, and determining the weight positions to determine the weight indices in the weight dictionary; and looking up the computational results in the computational codebook according to the weight indices and the neuron indices to determine the output neurons.

An embodiment of the application, the computational results include a result of at least one of the following computational operations: addition, multiplication, and pooling, where pooling may include average pooling, maximum pooling, and median pooling.

An embodiment of the application, before receiving the weights, the input neurons, the instruction, the weight dictionary, the neuron dictionary, and the computational codebook, the method may further include the following: preprocessing input information which is externally input to obtain the weights, the input neurons, the instruction, the weight dictionary, the neuron dictionary, and the computational codebook; and after receiving the weights, the input neurons, the instruction, the weight dictionary, the neuron dictionary and the computational codebook, the method may further include the following: storing the weights, the input neurons, the instruction, the weight dictionary, the neuron dictionary, and the computational codebook, receiving the output neurons, and caching the instruction, the input neurons, the weights, and the output neurons.

An embodiment of the application, after receiving the weights, the input neurons, the instruction, the weight dictionary, the neuron dictionary, and the computational codebook, the method may further include the following: caching the weight indices and the neuron indices.

An embodiment of the application, preprocessing may include segmentation, Gaussian filtering, binarization, regularization, and/or normalization.

An embodiment of the application, the instruction is a neural network-dedicated instruction, and the neural network-dedicated instruction may include:

a control instruction configured to control a neural network performing process;

a data transfer instruction configured to complete data transfer between different storage media, a data format including a matrix, a vector, and a scalar;

an operation instruction configured to complete arithmetic computation of a neural network and including a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a sigmoid neural network operation instruction, a tanh neural network operation instruction, and a maxout neural network operation instruction; and a logical instruction configured to complete logical operation of the neural network and including a vector logical operation instruction and a scalar logical operation instruction.

An embodiment of the application, the neural network-dedicated instruction may include at least one Cambricon instruction, the Cambricon instruction may include an operation code and an operand, and the Cambricon instruction may include:

a Cambricon control instruction configured to control the performing process, the Cambricon control instruction including a jump instruction and a conditional branch instruction;

a Cambricon data transfer instruction configured to complete data transfer between different storage media and including a load instruction, a store instruction and a move instruction, where the load instruction may be configured to load data from a main memory to a cache, the store instruction may be configured to store the data from the cache to the main memory, and the move instruction may be configured to move the data between the cache and another cache or the cache and a register or the register and another register;

a Cambricon operation instruction configured to complete the arithmetic computation of the neural network and including a Cambricon matrix operation instruction, a Cambricon vector operation instruction, and a Cambricon scalar operation instruction, where the Cambricon matrix operation instruction may be configured to complete matrix computation in the neural network, including matrix multiply vector computation, vector multiply matrix computation, matrix multiply scalar computation, outer product computation, matrix add matrix computation, and matrix subtract matrix computation, the Cambricon vector operation instruction may be configured to complete vector computation in the neural network, including vector basic operations, vector transcendental functions computation, dot product computation, random vector generator computation, and computation of maximum/minimum of a vector, and the Cambricon scalar operation instruction may be configured to complete scalar computation in the neural network, including scalar basic operations and scalar transcendental functions computation; and a Cambricon logical instruction, configured for the logical operation of the neural network, the Cambricon logical instruction including a Cambricon vector logical operation instruction and a Cambricon scalar logical operation instruction, where the Cambricon vector logical operation instruction may be configured for vector compare computation, vector logical operations, and vector greater than merge computation, in which the vector logical operations include AND, OR, and NOT, the Cambricon scalar logical operation instruction may be configured for scalar compare computation and scalar logical operations.

operation instructionoperation instructionoperation instructionoperation instructionAn embodiment of the application, the Cambricon data transfer instruction supports one or more of the following data organization manners: the matrix, the vector, and the scalar; the vector basic operations may include vector addition, subtraction, multiplication, and division; the vector transcendental functions refer to functions which do not meet any polynomial equations taking polynomials as coefficients, and include an exponential function, a logarithmic function, a trigonometric function, and an anti-trigonometric function; the scalar basic operations may include scalar addition, subtraction, multiplication, and division; the scalar transcendental functions refer to functions which do not meet any polynomial equations taking polynomials as coefficients, and include an exponential function, a logarithmic function, a trigonometric function, and an anti-trigonometric function; the vector compare computation may include greater than, smaller than, equal to, more than or equal to, less than or equal to, and unequal to; the vector logical operations include AND, OR, and NOT; the scalar compare computation may include greater than, smaller than, equal to, more than or equal to, less than or equal to, and unequal to; the scalar logical operations include AND, OR, and NOT.

Neural networks have been successfully applied. However, large-scale neural network parameters make a very high requirement on storage. On one hand, the large-scale neural network parameters require a huge storage capacity. On the other hand, access to massive neural network data may result in huge memory access energy consumption.

At present, a memory storing neural network parameters is an error correcting code (ECC) memory. The ECC memory may correct an error occurring if data is read, but the ECC memory may also bring an additional storage capacity overhead and memory access power consumption overhead. A neural network algorithm has a certain fault-tolerant capability. Storing all parameters of a neural network in an ECC memory ignores fault tolerance of the neural network and results in an additional storage overhead, computation overhead, and memory access overhead. Therefore, how to select a memory suitable for neural network processing in combination with a fault-tolerant capability of a neural network is a problem urgent to be solved.

Another aspect of the application provides a storage device, which may include:

an accurate storage unit configured to store important bits of data; and an inaccurate storage unit configured to store unimportant bits of the data.

An embodiment of the application, the accurate storage unit adopts an ECC memory, and the inaccurate storage unit adopts a non-ECC memory.

An embodiment of the application, the data is a neural network parameter, including an input neuron, a weight, and an output neuron. The accurate storage unit may be configured to store important bits of the input neuron, important bits of the output neuron, and important bits of the weight; and the inaccurate storage unit may be configured to store unimportant bits of the input neuron, unimportant bits of the output neuron, and unimportant bits of the weight.

An embodiment of the application, the data may include floating-point type data and fixed-point type data. Sign bits and bits of an exponent part of the floating point type data are determined as the important bits, and bits of a base part are determined as the unimportant bits. Sign bits and first x bits of numerical part of the fixed point type data include the important bits, and left bits of the numerical part include the unimportant bits, where x is a positive integer more than or equal to zero and smaller than m, and m is the total number of bits of the data.

An embodiment of the application, the ECC memory may include an ECC check Dynamic Random Access Memory (DRAM) and an ECC check Static Random Access Memory (SRAM); and the ECC check SRAM adopts a 6T SRAM, a 4T SRAM, or a 3T SRAM.

An embodiment of the application, the non-ECC memory may include a non-ECC check DRAM and a non-ECC check SRAM; and the non-ECC check SRAM adopts a 6T SRAM, a 4T SRAM, or a 3T SRAM.

An embodiment of the application, a storage unit storing each bit in the 6T SRAM may include six Metal Oxide Semiconductor (MOS) transistors; a storage unit storing each bit in the 4T SRAM may include four MOS transistors; and a storage unit storing each bit in the 3T SRAM may include three MOS transistors.

An embodiment of the application, the four MOS transistors include a first MOS transistor, a second MOS transistor, a third MOS transistor, and a fourth MOS transistor. The first MOS transistor and the second MOS transistor are configured for gating, and the third MOS transistor and the fourth transistor are configured for storage, where a gate of the first MOS transistor is electrically connected with a word line (WL) and a source of the first MOS transistor is electrically connected with a bit line (BL); a gate of the second MOS transistor is electrically connected with the WL and a source of the second MOS transistor is electrically connected with another BL; a gate of the third MOS transistor is connected with a source of the fourth MOS transistor and a drain of the second MOS transistor and is connected with a working voltage source through a resistor R2, and a drain of the third MOS transistor is grounded; a gate of the fourth MOS transistor is connected with a source of the third MOS transistor and a drain of the first MOS transistor, and is connected with the working voltage source through a resistor R1, and a drain of the fourth MOS transistor is grounded; the WL may be configured to control gated access to the storage unit, and the BL may be configured to read and write the storage unit.

An embodiment of the application, the three MOS transistors include a first MOS transistor, a second MOS transistor, and a third MOS transistor. The first MOS transistor may be configured for gating, and the second MOS transistor and the third MOS transistor are configured for storage, where a gate of the first MOS transistor is electrically connected with a WL and a source of the first MOS transistor is electrically connected with a BL; a gate of the second MOS transistor is connected with a source of the third MOS transistor and is connected with the working voltage source through the resistor R2, and a drain of the second MOS transistor is grounded; a gate of the third MOS transistor is connected with a source of the second MOS transistor and a drain of the first MOS transistor and is connected with the working voltage source through the resistor R1, and a drain of the third MOS transistor is grounded; and the WL may be configured to control gated access to the storage unit, and the BL may be configured to read and write the storage unit.

Another aspect of the application provides a data processing device, which may include:

a computation unit, an instruction control unit, and the abovementioned storage device, where the storage device may be configured to receive an input instruction and a computational parameter, to store the instruction and important bits of the computational parameter in an accurate storage unit, and to store unimportant bits of the computational parameter in an inaccurate storage unit; the instruction control unit may be configured to receive the instruction stored in the storage device, to decode the instruction, and to generate control information; and the computation unit may be configured to receive the computational parameter stored in the storage device, to perform computation according to the control information, and to transfer a computational result to the storage device.

An embodiment of the application, the computation unit is a neural network processor.

An embodiment of the application, the computational parameter is a neural network parameter. The computation unit may be configured to receive an input neuron and a weight stored in the storage device, to complete neural network computation according to the control information so as to obtain an output neuron, and to transfer the output neuron to the storage device.

An embodiment of the application, the computation unit may be configured to receive important bits of an input neuron and important bits of a weight stored in the storage device for computation, or the computation unit may be configured to receive the important bits and the unimportant bits of the input neuron, as well as the important bits and the unimportant bits of the weight, and to splice the complete input neuron and weight for computation.

An embodiment of the application, the data processing device may further include: an instruction cache, arranged between the storage device and the instruction control unit and configured to store a dedicated instruction; an input neuron hierarchical cache, arranged between the storage device and the computation unit and configured to cache the input neuron, the input neuron hierarchical cache including an accurate input neuron cache and an inaccurate input neuron cache; a weight hierarchical cache, arranged between the storage device and the computation unit and configured to cache the weight, the weight hierarchical cache including an accurate weight cache and an inaccurate weight cache; and an output neuron hierarchical cache, arranged between the storage device and the computation unit and configured to cache the output neuron, the output neuron hierarchical cache including an accurate output neuron cache and an inaccurate output neuron cache.

An embodiment of the application, the data processing device may further include a DMA configured to read and write data or instructions from/into the storage device, the instruction cache, the weight hierarchical cache, the input neuron hierarchical cache, and the output neuron hierarchical cache.

An embodiment of the application, the instruction cache, the input neuron hierarchical cache, the weight hierarchical cache, and the output neuron hierarchical cache adopt 4T SRAMs or 3T SRAMs.

An embodiment of the application, the data processing device may further include a preprocessing module configured to preprocess input data and to transfer input data preprocessed to the storage device, and preprocessing may include segmentation, Gaussian filtering, binarization, regularization and normalization.

An embodiment of the application, the computation unit is a universal arithmetic processor.

Another aspect of the application provides an electronic device, which may include the abovementioned data processing device.

Another aspect of the application provides a storage method, which may include: accurately storing important bits of the data; and inaccurately storing unimportant bits of the data.

An embodiment of the application, accurately storing the important bits of the data may include: extracting the important bits of the data, and storing the important bits of the data in an ECC memory for accurate storage.

An embodiment of the application, inaccurately storing the unimportant bits in the data may include: extracting the unimportant bits of the data, and storing the unimportant bits of the data in a non-ECC memory for inaccurate storage.

An embodiment of the application, the data is a neural network parameter, including an input neuron, a weight, and an output neuron; important bits of the input neuron, important bits of the output neuron, and important bits of the weight are accurately stored; and unimportant bits of the input neuron, unimportant bits of the output neuron, and unimportant bits of the weight are inaccurately stored.

An embodiment of the application, the data may include floating point type data and fixed point type data; sign bits and bits of an exponent part of the floating point type data are determined as the important bits and bits of a base part are determined as the unimportant bits; sign bits and first x bits of numerical part of the fixed point type data include the important bits and left bits of the numerical part include the unimportant bits, where x is a positive integer more than or equal to zero and smaller than m, and m is the total number of bits of the parameter.

An embodiment of the application, the ECC memory may include an ECC check DRAM and an ECC check SRAM; and the ECC check SRAM adopts a 6T SRAM, a 4T SRAM, or a 3T SRAM.

An embodiment of the application, the non-ECC memory may include a non-ECC check DRAM and a non-ECC check SRAM; and the non-ECC check SRAM adopts a 6T SRAM, a 4T SRAM, or a 3T SRAM.

Another aspect of the application provides a data processing method, which may include:

receiving an instruction and a parameter, accurately storing the instruction and important bits of the parameter, and inaccurately storing unimportant bits of the parameter; receiving the instruction, decoding the instruction, and generating control information; and receiving the parameter, performing computation according to the control information, and storing a computational.

An embodiment of the application, the computation is neural network computation, and the parameter is a neural network parameter.

An embodiment of the application, receiving the parameter, performing the computation according to the control information, and storing the computational result may include: receiving an input neuron and a weight, completing the neural network computation according to the control information to obtain an output neuron, and storing or outputting the output neuron.

An embodiment of the application, receiving the input neuron and the weight, and completing the neural network computation according to the control information to obtain the output neuron may include: receiving important bits of the input neuron and important bits of the weight for computation; or receiving the important bits and unimportant bits of the input neuron, as well as the important bits and unimportant bits of the weight, and splicing the complete input neuron and weight for computation.

An embodiment of the application, the data processing method may further include: caching a dedicated instruction; accurately caching and inaccurately caching the input neuron; accurately caching and inaccurately caching the weight data; and accurately caching and inaccurately caching the output neuron.

An embodiment of the application, the computation is universal computation.

An embodiment of the application, before receiving the instruction and the parameter, the instruction and the important bits of the parameter are stored for accurate storage and the unimportant bits of the parameter are inaccurately stored; the data processing method may further include: preprocessing and storing input data, where preprocessing includes segmentation, Gaussian filtering, binarization, regularization, and normalization.

Another aspect of the application provides a storage unit, which is a 4T SRAM or a 3T SRAM, and may be configured to store neural network parameters.

An embodiment of the application, a storage unit storing each bit in the 4T SRAM may include four MOS transistors; and a storage unit storing each bit in the 3T SRAM may include three MOS transistors.

An embodiment of the application, the four MOS transistors include a first MOS transistor, a second MOS transistor, a third MOS transistor, and a fourth MOS transistor. The first MOS transistor and the second MOS transistor are configured for gating, and the third MOS transistor and the fourth transistor are configured for storage, where a gate of the first MOS transistor is electrically connected with a WL, and a source is electrically connected with a BL; a gate of the second MOS transistor is electrically connected with the WL and a source is electrically connected with another BL; a gate of the third MOS transistor is connected with a source of the fourth MOS transistor and a drain of the second MOS transistor and is connected with a working voltage source through a resistor R2, and a drain of the third MOS transistor is grounded; a gate of the fourth MOS transistor is connected with a source of the third MOS transistor and a drain of the first MOS transistor and is connected with the working voltage source through a resistor R1, and a drain of the fourth MOS transistor is grounded; the WL may be configured to control gated access to the storage unit, and the BL may be configured to read and write the storage unit.

An embodiment of the application, the three MOS transistors include a first MOS transistor, a second MOS transistor, and a third MOS transistor. The first MOS transistor may be configured for gating, and the second MOS transistor and the third MOS transistor are configured for storage, where a gate of the first MOS transistor is electrically connected with the WL and a source is electrically connected with the BL; a gate of the second MOS transistor is connected with a source of the third MOS transistor and is connected with the working voltage source through the resistor R2, and a drain of the second MOS transistor is grounded; a gate of the third MOS transistor is connected with a source of the second MOS transistor and a drain of the first MOS transistor and is connected with the working voltage source through the resistor R1, and a drain of the third MOS transistor is grounded. The WL may be configured to control gated access of the storage unit, and the BL may be configured to read and write the storage unit.

An embodiment of the application, the neural network parameter may include the input neuron, the weight, and the output neuron.

Along with increase of a working frequency and constant development of a semiconductor process, a problem about power consumption of a chip has become an important factor considered for a deep sub-nanometer integrated circuit. Dynamic voltage frequency scaling (DVFS) is a DVFS technology which is widely adopted for the field of semiconductors at present. The DVFS technology dynamically scales a running frequency and voltage of a chip (for the same chip, if the frequency is higher, a higher voltage is required), thereby achieving a purpose of saving energy. However, in related arts, there are no DVFS methods and corresponding device designs applied to intelligent chips, and it is impossible to complete advanced scaling over a voltage and a frequency of a chip by use of application scenario information.

Another aspect of the application provides a DVFS device, which may include:

an information acquisition unit configured to acquire working state information or application scenario information of a chip connected with the DVFS device in real time, in which the application scenario information may be information obtained by the chip through neural network computation or acquired by a sensor connected with the chip; and a voltage frequency scaling unit configured to send voltage frequency scaling information to the chip according to the working state information or the application scenario information of the chip, in which the voltage frequency scaling information may be configured to instruct the chip to scale its working voltage or working frequency.

An embodiment of the application, the working state information of the chip may include an operating speed of the chip, the voltage frequency scaling information may include first voltage frequency scaling information, and the voltage frequency scaling unit may be configured to:

if the operating speed of the chip is greater than a target speed, send the first voltage frequency scaling information to the chip, in which the first voltage frequency scaling information may be configured to instruct the chip to decrease its working frequency or working voltage, and the target speed may be an operating speed of the chip if a user requirement is met.

An embodiment of the application, the chip may include at least a first unit and a second unit. Output data of the first unit is input data of the second unit. The working state information of the chip may include an operating speed of the first unit and an operating speed of the second unit. The voltage frequency scaling information may include second voltage frequency scaling information. The voltage frequency scaling unit may be further configured to:

in response to determining, according to the operating speed of the first unit and the operating speed of the second unit, that a running time of the first unit exceeds a running time of the second unit, send the second voltage frequency scaling information to the second unit, in which the second voltage frequency scaling information may be configured to instruct the second unit to decrease its working frequency or working voltage.

An embodiment of the application, the voltage frequency scaling information may include third voltage frequency scaling information, and the voltage frequency scaling unit is further configured to:

in response to determining, according to the operating speed of the first unit and the operating speed of the second unit, that the running time of the second unit exceeds the running time of the first unit, send the third voltage frequency scaling information to the first unit, in which the third voltage frequency scaling information may be configured to instruct the first unit to decrease its working frequency or working voltage.

An embodiment of the application, the chip may include at least N units. The working state information of the chip may include working state information of at least S units in the at least N units, in which N may be an integer larger than one and S may be an integer less than or equal to N. The voltage frequency scaling information may include fourth voltage frequency scaling information, and the voltage frequency scaling unit may be configured to:

in response to determining, according to the working state information of a unit A, that the unit A is in an idle state, send the fourth voltage frequency scaling information to the unit A, in which the fourth voltage frequency scaling information may be configured to instruct the unit A to decrease its working frequency or working voltage, where the unit A is any one of the at least S units.

An embodiment of the application, the voltage frequency scaling information may include fifth voltage frequency scaling information, and the voltage frequency scaling unit may be configured to:

in response to determining, according to the working state information of the unit A, that the unit A returns to a working state, send the fifth voltage frequency scaling information to the unit A, in which the fifth voltage frequency scaling information may be configured to instruct the unit A to increase its working voltage or working frequency.

An embodiment of the application, an application scenario of the chip is image recognition, the application scenario information may include the count of objects in an image to be recognized, the voltage frequency scaling information may include sixth voltage frequency scaling information, and the voltage frequency scaling unit may be configured to:

in response to determining that the count of the objects in the image to be recognized is smaller than a first threshold value, send the sixth voltage frequency scaling information to the chip, in which the sixth voltage frequency scaling information may be configured to instruct the chip to decrease its working voltage or working frequency.

An embodiment of the application, the application scenario information is object tag information, the voltage frequency scaling information may include seventh voltage frequency scaling information, and the voltage frequency scaling unit may be configured to:

in response to determining that the object tag information belongs to a preset object tag set, send the seventh voltage frequency scaling information to the chip, in which the seventh voltage frequency scaling information may be configured to instruct the chip to increase its working voltage or working frequency.

An embodiment of the application, the chip is applied to voice recognition, the application scenario information is a voice input rate, the voltage frequency scaling information may include eighth voltage frequency scaling information, and the voltage frequency scaling unit may be configured to:

if the voice input rate is lower than a second threshold value, send the eighth voltage frequency scaling information to the chip, in which the eighth voltage frequency scaling information may be configured to instruct the chip to decrease its working voltage or working frequency.

An embodiment of the application, the application scenario information is a keyword obtained by voice recognition performed by the chip, the voltage frequency scaling information may include ninth voltage frequency scaling information, and the voltage frequency scaling unit may be configured to:

if the keyword belongs to a preset keyword set, send the ninth voltage frequency scaling information to the chip, in which the ninth voltage frequency scaling information may be configured to instruct the chip to increase its working voltage or working frequency.

An embodiment of the application, the chip is applied to machine translation, the application scenario information may include a character input speed or a number of characters in an image to be translated, the voltage frequency scaling information may include tenth voltage frequency scaling information, and the voltage frequency scaling unit may be configured to:

if the character input speed is lower than a third threshold value or the count of the characters in the image to be translated is smaller than a fourth threshold value, send the tenth voltage frequency scaling information to the chip, in which the tenth voltage frequency scaling information may be configured to instruct the chip to decrease its working voltage or working frequency.

An embodiment of the application, the application scenario information is an external light intensity, the voltage frequency scaling information may include eleventh voltage frequency scaling information, and the voltage frequency scaling unit may be configured to:

if the external light intensity is lower than a fifth threshold value, send the eleventh voltage frequency scaling information to the chip, in which the eleventh voltage frequency scaling information may be configured to instruct the chip to decrease its working voltage or working frequency.

An embodiment of the application, the chip is applied to image retouching, the voltage frequency scaling information may include twelfth voltage frequency scaling information and thirteenth voltage frequency scaling information, and the voltage frequency scaling unit may be configured to:

if the application scenario information is a face image, send the twelfth voltage frequency scaling information to the chip, in which the twelfth voltage frequency scaling information may be configured to instruct the chip to decrease its working voltage, and if the application scenario information is not a face image, send the thirteenth voltage frequency scaling information to the chip, in which the thirteenth voltage frequency scaling information may be configured to instruct the chip to decrease its working voltage or working frequency.

Another aspect of the application provides a DVFS method, which may include that:

acquiring working state information or application scenario information of a chip connected with a DVFS device in real time, in which the application scenario information may be information obtained by the chip through neural network computation or acquired by a sensor connected with the chip; and sending voltage frequency scaling information to the chip according to the working state information or the application scenario information of the chip, in which the voltage frequency scaling information may be configured to instruct the chip to scale its working voltage or working frequency.

An embodiment of the application, the working state information of the chip may include an operating speed of the chip, the voltage frequency scaling information may include first voltage frequency scaling information, and sending the voltage frequency scaling information to the chip according to the working state information or the application scenario information of the chip may include that:

if the operating speed of the chip is greater than a target speed, sending the first voltage frequency scaling information to the chip, in which the first voltage frequency scaling information may be configured to instruct the chip to decrease its working frequency or working voltage and the target speed may be an operating speed of the chip if a user requirement is met.

An embodiment of the application, the chip may include at least a first unit and a second unit. Output data of the first unit is input data of the second unit. The working state information of the chip may include an operating speed of the first unit and an operating speed of the second unit. The voltage frequency scaling information may include second voltage frequency scaling information. The sending the voltage frequency scaling information to the chip according to the working state information or the application scenario information of the chip may further include:

if a running time of the first unit exceeds a running time of the second unit according to a running speed of the first unit and a running speed of the second unit, sending the second voltage frequency scaling information to the second unit, in which the second voltage frequency scaling information may be configured to instruct the second unit to decrease its working frequency or working voltage.

An embodiment of the application, the voltage frequency scaling information may include third voltage frequency scaling information, and sending the voltage frequency scaling information to the chip according to the working state information or the application scenario information of the chip may further include:

if a running time of the second unit exceeds a running time of the first unit according to a running speed of the first unit and a running speed of the second unit, sending the third voltage frequency scaling information to the first unit, in which the third voltage frequency scaling information may be configured to instruct the first unit to decrease its working frequency or working voltage.

An embodiment of the application, the chip may include at least N units, the working state information of the chip may include working state information of at least S units in the at least N units, in which N may be an integer larger than 1 and S may be an integer less than or equal to N. The voltage frequency scaling information may include fourth voltage frequency scaling information, and sending the voltage frequency scaling information to the chip according to the working state information or the application scenario information of the chip may further include:

according to the working state information of a unit A, in response to the unit A being determined to be in an idle state, sending the fourth voltage frequency scaling information to the unit A, in which the fourth voltage frequency scaling information may be configured to instruct the unit A to decrease its working frequency or working voltage, where the unit A is any one of the at least S units.

An embodiment of the application, the voltage frequency scaling information may include fifth voltage frequency scaling information, and sending the voltage frequency scaling information to the chip according to the working state information or the application scenario information of the chip may further include that:

according to the working state information of the unit A, in response to the unit A being determined to return to a working state, sending the fifth voltage frequency scaling information to the unit A, in which the fifth voltage frequency scaling information may be configured to instruct the unit A to increase its working voltage or working frequency.

An embodiment of the application, an application scenario of the chip is image recognition, the application scenario information is the count of objects in an image to be recognized, the voltage frequency scaling information may include sixth voltage frequency scaling information, and sending the voltage frequency scaling information to the chip according to the working state information or the application scenario information of the chip may further include:

in response to the count of the objects in the image to be recognized being determined to be smaller than a first threshold value, sending the sixth voltage frequency scaling information to the chip, in which the sixth voltage frequency scaling information may be configured to instruct the chip to decrease its working voltage or working frequency.

An embodiment of the application, the application scenario information is object tag information, the voltage frequency scaling information may include seventh voltage frequency scaling information, and sending the voltage frequency scaling information to the chip according to the working state information or the application scenario information of the chip may further include:

in response to the object tag information being determined to belong to a preset object tag set, sending the seventh voltage frequency scaling information to the chip, in which the seventh voltage frequency scaling information may be configured to instruct the chip to increase its working voltage or working frequency.

An embodiment of the application, the chip is applied to voice recognition, the application scenario information is a voice input rate, the voltage frequency scaling information may include eighth voltage frequency scaling information, and sending the voltage frequency scaling information to the chip according to the working state information or the application scenario information of the chip may further include:

if the voice input rate is lower than a second threshold value, sending the eighth voltage frequency scaling information to the chip, in which the eighth voltage frequency scaling information may be configured to instruct the chip to decrease its working voltage or working frequency.

An embodiment of the application, the application scenario information is a keyword obtained by voice recognition performed by the chip, the voltage frequency scaling information may include ninth voltage frequency scaling information, and sending the voltage frequency scaling information to the chip according to the working state information or the application scenario information of the chip may further include:

if the keyword belongs to a preset keyword set, sending the ninth voltage frequency scaling information to the chip, in which the ninth voltage frequency scaling information may be configured to instruct the chip to increase its working voltage or working frequency.

An embodiment of the application, the chip is applied to machine translation, the application scenario information is a character input speed or a number of characters in an image to be translated, the voltage frequency scaling information may include tenth voltage frequency scaling information, and sending the voltage frequency scaling information to the chip according to the working state information or the application scenario information of the chip may further include:

if the character input speed is lower than a third threshold value or the count of the characters in the image to be translated is smaller than a fourth threshold value, sending the tenth voltage frequency scaling information to the chip, in which the tenth voltage frequency scaling information may be configured to instruct the chip to decrease its working voltage or working frequency.

An embodiment of the application, the application scenario information is an external light intensity, the voltage frequency scaling information may include eleventh voltage frequency scaling information, and sending the voltage frequency scaling information to the chip according to the working state information or the application scenario information of the chip may further include:

if the external light intensity is lower than a fifth threshold value, sending the eleventh voltage frequency scaling information to the chip, in which the eleventh voltage frequency scaling information may be configured to instruct the chip to decrease its working voltage or working frequency.

An embodiment of the application, the chip is applied to image retouching, the voltage frequency scaling information may include twelfth voltage frequency scaling information and thirteenth voltage frequency scaling information, and sending the voltage frequency scaling information to the chip according to the working state information or the application scenario information of the chip may further include:

if the application scenario information is a face image, sending the twelfth voltage frequency scaling information to the chip, in which the twelfth voltage frequency scaling information may be configured to instruct the chip to decrease its working voltage, and if the application scenario information is not a face image, sending the thirteenth voltage frequency scaling information to the chip, in which the thirteenth voltage frequency scaling information may be configured to instruct the chip to decrease its working voltage or working frequency.

Along with increase of a working frequency and constant development of a semiconductor process, a problem about power consumption of a chip has become an important factor considered for a deep sub-nanometer integrated circuit. DVFS is a DVFS technology which is widely adopted for the field of semiconductors at present. Specifically, the DVFS technology dynamically scales a running frequency and voltage of a chip (for the same chip, if the frequency is higher, a higher voltage is required), thereby achieving a purpose of saving energy. However, in related arts, there are no DVFS methods and corresponding device designs applied to intelligent chips such as a convolutional operation device.

Another aspect of the application provides a convolutional operation device, which may include a DVFS device, an instruction storage unit, a control unit, a data access unit, an interconnection module, a primary computation module and N secondary computation modules, in which N may be an integer larger than 1.

The instruction storage unit may be configured to store an instruction read in by the data access unit.

The control unit may be configured to read the instruction from the instruction storage unit and decode the instruction into a control signal for controlling an operation of other modules, and the other modules may include the data access unit, the primary computation module, and the N secondary computation modules.

The data access unit may be configured to perform data or instruction read/write operation between an external address space and the convolutional operation device.

The N secondary computation modules are configured to implement convolutional operation of input data and convolution kernels in a convolutional neural network algorithm;

The interconnection module may be configured for data transfer between the primary computation module and the secondary computation modules.

The primary computation module may be configured to splice intermediate vectors of all the input data into an intermediate result and perform subsequent computation on the intermediate result.

The DVFS device may be configured to acquire working state information of the convolutional operation device and send voltage frequency scaling information to the convolutional operation device according to the working state information of the convolutional operation device, in which the voltage frequency scaling information may be configured to instruct the convolutional operation device to scale its working voltage or working frequency.

An embodiment of the application, the primary computation module may be further configured to add the intermediate result and offset data, and perform an activation operation.

An embodiment of the application, the N secondary computation modules are configured to use the same input data and their respective convolutional kernels to concurrently compute respective output scalars.

An embodiment of the application, an active function active used by the primary computation module is any nonlinear function including sigmoid, tanh, relu, and softmax.

An embodiment of the application, the interconnection module forms a data path of continuous or discrete data between the primary computation module and the N secondary computation modules, and the interconnection module is any structure in a tree structure, a ring structure, a grid structure, a hierarchical interconnection structure, and a bus structure.

An embodiment of the application, the primary computation module may include:

a first storage unit configured to cache the input data and output data used by the primary computation module in a computation process;

a first computation unit configured to complete various computational functions of the primary computation module; and a first data dependency relationship judgment unit, configured as a port through which the first computation unit reads and writes the first storage unit to ensure data read/write consistency of the first storage unit; and configured to read an input neuron vector from the first storage unit, to send the input neuron vector to the N secondary computation modules through the interconnection module, and to send an intermediate result vector from the interconnection module to the first computation unit.

An embodiment of the application, each secondary computation module of the N secondary computation modules may include:

a second computation unit configured to receive the control signal sent by the control unit and perform arithmetic logical operation;

a second data dependency relationship judgment unit configured to perform a read/write operation on a second storage unit and a third storage unit in a computation process to ensure read/write consistency of the second storage unit and the third storage unit;

the second storage unit configured to cache the input data and the output scalar obtained by computation of the each secondary computation module; and the third storage unit configured to cache the convolutional kernel required by the each secondary computation module in the computation process.

An embodiment of the application, the first data dependency relationship judgment unit and the second data dependency relationship judgment unit ensure the read/write consistency in a manner of:

judging whether a dependency relationship is formed between data of a control signal which has yet not been performed and a control signal which is under performing, if a dependency relationship is not formed between data of a control signal which has yet not been performed and a control signal which is under performing, allowing the control signal to be sent immediately, otherwise allowing the control signal to be sent only after all control signals the control signal depends on are performed.

An embodiment of the application, the data access unit reads in at least one of the input data, the offset data, and the convolutional kernels from the external address space.

An embodiment of the application, the DVFS device may include:

an information acquisition unit configured to acquire the working state information of the convolutional operation device in real time; and a voltage frequency scaling unit configured to send the voltage frequency scaling information to the convolutional operation device according to the working state information of the convolutional operation device, in which the voltage frequency scaling information may be configured to instruct the convolutional operation device to scale its working voltage or working frequency.

An embodiment of the application, the working state information of the convolutional operation device may include an operating speed of the convolutional operation device, the voltage frequency scaling information may include first voltage frequency scaling information, and the voltage frequency scaling unit may be configured to:

if the operating speed of the convolutional operation device is greater than a target speed, send the first voltage frequency scaling information to the convolutional operation device, in which the first voltage frequency scaling information may be configured to instruct the convolutional operation device to decrease its working frequency or working voltage, where the target speed is an operating speed of the convolutional operation device if a user requirement is met.

An embodiment of the application, the working state information of the convolutional operation device may include an operating speed of the data access unit and an operating speed of the primary computation module, the voltage frequency scaling information may include second voltage frequency scaling information, and the voltage frequency scaling unit may be further configured to:

in response to determining, according to the operating speed of the data access unit and the operating speed of the primary computation module, that a running time of the data access unit exceeds a running time of the primary computation module, send the second voltage frequency scaling information to the primary computation module, in which the second voltage frequency scaling information may be configured to instruct the primary computation module to decrease its working frequency or working voltage.

An embodiment of the application, the voltage frequency scaling information may include third voltage frequency scaling information, and the voltage frequency scaling unit may be further configured to:

in response to determining, according to the operating speed of the data access unit and the operating speed of the primary computation module, that the running time of the primary computation module exceeds the running time of the data access unit, send the third voltage frequency scaling information to the data access unit, in which the third voltage frequency scaling information may be configured to instruct the data access unit to decrease its working frequency or working voltage.

An embodiment of the application, the working state information of the convolutional operation device may include working state information of at least S units/modules in the instruction storage unit, the control unit, the data access unit, the interconnection module, the primary computation module, and the N secondary computation modules, in which S may be an integer larger than one and less than or equal to N+5, the voltage frequency scaling information may include fourth voltage frequency scaling information, and the voltage frequency scaling unit may be configured to:

in response to determining, according to the working state information of a unit A, that the unit A is in an idle state, send the fourth voltage frequency scaling information to the unit A, in which the fourth voltage frequency scaling information may be configured to instruct the unit A to decrease its working frequency or working voltage, wherein the unit A is any one of the at least S units/modules.

An embodiment of the application, the voltage frequency scaling information may include fifth voltage frequency scaling information, and the voltage frequency scaling unit may be further configured to:

in response to determining, according to the working state information of the unit A, that the unit A returns to a working state, send the fifth voltage frequency scaling information to the unit A, in which the fifth voltage frequency scaling information may be configured to instruct the unit A to increase its working voltage or working frequency.

Another aspect of the application provides a neural network processor, which may include the abovementioned convolutional operation device.

Another aspect of the application provides an electronic device, which may include the abovementioned neural network processor.

Another aspect of the application provides a method for performing a single-layer convolutional neural network forward computation, which is applied to the abovementioned convolutional operation device and may include the follows:

pre-storing an input/output (IO) instruction at a starting address of an instruction storage unit;

if the computation is started, a control unit reading the IO instruction from the starting address of the instruction storage unit, and a data access unit reading, according to a control signal decoded from the IO instruction, all corresponding convolutional neural network operation instructions from an external address space and caching all the instructions in the instruction storage unit;

the control unit reading in a next IO instruction from the instruction storage unit, and the data access unit reading all data required by a primary computation module from the external address space to a first storage unit of the primary computation module according to a control signal decoded from the next IO instruction;

the control unit reading in another IO instruction from the instruction storage unit, and the data access unit reading convolutional kernel data required by secondary computation modules from the external address space according to a control signal decoded from the another IO instruction;

the control unit reading in a next CONFIG instruction from the instruction storage unit, and the convolutional operation device configuring various constants required by computation of a present layer of a neural network according to a control signal decoded from the next CONFIG instruction;

the control unit reading in a next COMPUTE instruction from the instruction storage unit, and the primary computation module sending input data in a convolutional window to the N secondary computation modules through an interconnection module according to a control signal decoded from the next COMPUTE instruction, storing the input data in second storage units of the N secondary computation modules, and moving the convolutional window according to the instruction;

computation units of the N secondary computation modules reading convolutional kernels from third storage units according to the control signal decoded from the COMPUTE instruction, reading the input data from the second storage units, completing convolutional operation of the input data and the convolutional kernels, and returning obtained output scalars through the interconnection module;

splicing the output scalars returned by the N secondary computation modules into complete intermediate vectors step by step in the interconnection module;

the primary computation module obtaining the intermediate vectors returned by the interconnection module, moving the convolutional window to traverse all the input data, splicing all the returned intermediate vectors into an intermediate result, reading offset data from the first storage unit according to the control signal decoded from the COMPUTE instruction, and adding the offset data and the intermediate result together to obtain an offset result through a vector addition unit, an activation unit activating the offset result and writing final output data back into the first storage unit;

the control unit reading in yet another IO instruction from the instruction storage unit, and the data access unit storing the output data of the first storage unit to a specified address of the external address space according to a control signal decoded from the next IO instruction.

The computation is ended.

An embodiment of the application, the method may further include the follows:

acquiring working state information of the convolutional operation device in real time;

sending voltage frequency scaling information to the convolutional operation device according to the working state information of the convolutional operation device, in which the voltage frequency scaling information may be configured to instruct the convolutional operation device to scale its working voltage or working frequency.

An embodiment of the application, the working state information of the convolutional operation device may include an operating speed of the convolutional operation device, the voltage frequency scaling information may include first voltage frequency scaling information, and sending the voltage frequency scaling information to the convolutional operation device according to the working state information of the convolutional operation device may include:

if the operating speed of the convolutional operation device is greater than a target speed, sending the first voltage frequency scaling information to the convolutional operation device, in which the first voltage frequency scaling information may be configured to instruct the convolutional operation device to decrease its working frequency or working voltage, and the target speed may be an operating speed of the convolutional operation device if a user requirement is met.

An embodiment of the application, the working state information of the convolutional operation device may include an operating speed of the data access unit and an operating speed of the primary computation module, the voltage frequency scaling information may include second voltage frequency scaling information, and sending the voltage frequency scaling information to the convolutional operation device according to the working state information of the convolutional operation device further may include:

in response to determining, according to the operating speed of the data access unit and the operating speed of the primary computation unit, that the running time of the primary computation unit exceeds the running time of the data access unit, sending the second voltage frequency scaling information to the primary computation module, in which the second voltage frequency scaling information may be configured to instruct the primary computation module to decrease its working frequency or working voltage.

An embodiment of the application, the voltage frequency scaling information may include third voltage frequency scaling information, and sending the voltage frequency scaling information to the convolutional operation device according to the working state information of the convolutional operation device may further include:

in response to determining, according to the operating speed of the data access unit and the operating speed of the primary computation unit, that the running time of the primary computation unit exceeds the running time of the data access unit, sending the third voltage frequency scaling information to the data access unit, in which the third voltage frequency scaling information may be configured to instruct the data access unit to decrease its working frequency or working voltage.

An embodiment of the application, the working state information of the convolutional operation device may include working state information of at least S units/modules in the instruction storage unit, the control unit, the data access unit, the interconnection module, the primary computation module, and the N secondary computation modules, in which S may be an integer larger than one and less than or equal to N+5, the voltage frequency scaling information may include fourth voltage frequency scaling information, and sending the voltage frequency scaling information to the convolutional operation device according to the working state information of the convolutional operation device may further include:

in response to determining, according to the working state information of a unit A, that the unit A is in an idle state, sending the fourth voltage frequency scaling information to the unit A, in which the fourth voltage frequency scaling information may be configured to instruct the unit A to decrease its working frequency or working voltage, where the unit A is any one of the at least S units/modules.

An embodiment of the application, the voltage frequency scaling information may include fifth voltage frequency scaling information, and sending the voltage frequency scaling information to the convolutional operation device according to the working state information of the convolutional operation device may further include:

in response to determining, according to the working state information of the unit A, that the unit A returns to a working state, sending the fifth voltage frequency scaling information to the unit A, in which the fifth voltage frequency scaling information may be configured to instruct the unit A to increase its working voltage or working frequency.

Another aspect of the application provides a method for performing multilayer convolutional neural network forward computation, which may include:

performing the abovementioned method for single-layer convolutional neural network forward computation on each layer of the multilayer convolutional neural network, after performing for a previous layer of the multilayer convolutional neural network, a operation instruction of a present layer taking an output data address, stored in a primary computation module, of the previous layer as an input data address of the present layer, and changing convolutional kernel address and offset data address in the operation instruction into corresponding addresses of the present layer.

Along with arrival of the big data era, data keeps growing explosively. Massive data containing information is transferred between users. Image, as a vision foundation for perception of the world by the human beings, is an important means for the human beings to acquire information, express information, and transfer information.

In related arts, image compression can effectively reduce a data volume and increase an image transfer rate. However, after an image is compressed, it is unlikely to reserve all information of the original image. Therefore, how to perform image compression is still a technical problem to be solved by those skilled in the art.

Another aspect of the application provides an image compression method, which may include:

acquiring an original image with a first resolution, in which the original image may be any training image in a compression training image set of a compression neural network and tag information of the original image may be determined as target tag information;

compressing the original image on the basis of a target model to obtain a compressed image with a second resolution, in which the second resolution may be lower than the first resolution and the target model may be a present compression neural network model of the compression neural network;

recognizing the compressed image on the basis of a recognition neural network model to obtain reference tag information, in which the recognition neural network model may be a corresponding recognition neural network model if training of a recognition neural network is completed;

acquiring a loss function according to the target tag information and the reference tag information;

if the loss function is convergent to a first threshold value or the present number of training times of the compression neural network is more than or equal to a second threshold value, acquiring a target original image with the first resolution, and determining the target model as a corresponding compression neural network model if training of the compression neural network is completed; and compressing the target original image on the basis of the compression neural network model to obtain a target compressed image with the second resolution.

An embodiment of the application, the image compression method may further include:

if the loss function is not convergent to the first threshold value or the present number of training times of the compression neural network is smaller than the second threshold value, upgrading the target model according to the loss function to obtain an updated model, where the updated model may be determined as the target model, a next training image may be determined as the original image, and acquiring the original image with the first resolution is performed.

An embodiment of the application, recognizing the compressed image on the basis of the recognition neural network model to obtain the reference tag information may include:

preprocessing the compressed image to obtain an image to be recognized; and recognizing the image to be recognized on the basis of the recognition neural network model to obtain the reference tag information.

An embodiment of the application, preprocessing may include size processing, and preprocessing the compressed image to obtain the image to be recognized may include:

if an image size of the compressed image is smaller than a basic image size of the recognition neural network, filling the compressed image with pixels according to the basic image size to obtain the image to be recognized.

An embodiment of the application, the compression training image set may include at least a recognition training image set, and the image compression method may further include:

adopting the recognition training image set to train the recognition neural network to obtain the recognition neural network model, and each training image in the recognition training image set including at least tag information consistent with a type of the target tag information.

An embodiment of the application, after compressing the target original image on the basis of the compression neural network model to obtain the target compressed image with the second resolution, the method may further include:

compressing the target compressed image on the basis of the recognition neural network model to obtain tag information of the target original image, and storing the tag information of the target original image.

An embodiment of the application, the compression training image set may include multiple dimensions, and compressing the original image on the basis of the target model to obtain the compressed image with the second resolution may include:

recognizing the original image on the basis of the target model to obtain multiple pieces of image information, in which each dimension may correspond to a piece of the image information; and compressing the original image on the basis of the target model and the multiple pieces of the image information to obtain the compressed image.

Another aspect of the application provides an image compression device, which may include a processor and a memory connected with the processor.

The memory may be configured to store a first threshold value, a second threshold value, a present neural network model and training times of a compression neural network, a compression training image set of the compression neural network, tag information of each training image in the compression training image set, a recognition neural network model, and a compression neural network model. The present neural network model of the compression neural network is determined as a target model, the compression neural network model is a corresponding target model if training of the compression neural network is completed, and the recognition neural network model is a corresponding neural network model if training of a recognition neural network is completed.

The processor may be configured to acquire an original image with a first resolution, in which the original image may be any training image in the compression training image set and tag information of the original image may be determined as target tag information. The processor may be further configured to compress the original image on the basis of the target model to obtain a compressed image with a second resolution, in which the second resolution may be lower than the first resolution. The processor may be further configured to recognize the compressed image on the basis of the recognition neural network model to obtain reference tag information. The processor may be further configured to acquire a loss function according to the target tag information and the reference tag information. If the loss function is convergent to the first threshold value or the count of training times is more than or equal to the second threshold value, the processor may be configured to acquire a target original image with the first resolution, to determine the target model as the compression neural network model, and to compress the target original image on the basis of the compression neural network model, so as to obtain a target compressed image with the second resolution.

An embodiment of the application, the processor may be further configured to, if the loss function is not convergent to the first threshold value or the count of training times is smaller than the second threshold value, update the target model according to the loss function to obtain an updated model, to determine the updated model as the target model, to determine a next training image as the original image, and to perform the operation of acquiring the original image with the first resolution.

An embodiment of the application, the processor may be configured to preprocess the compressed image to obtain an image to be recognized, and to recognize the image to be recognized on the basis of the recognition neural network model to obtain the reference tag information.

An embodiment of the application, preprocessing may include size processing. The memory may be further configured to store a basic image size of the recognition neural network. The processor may be further configured to, if an image size of the compressed image is smaller than the basic image size, fill the compressed image with pixels according to the basic image size to obtain the image to be recognized.

An embodiment of the application, the compression training image set may include at least a recognition training image set, and the processor may be further configured to adopt the recognition training image set to train the recognition neural network to obtain the recognition neural network model, in which each training image in the recognition training image set may include at least tag information consistent with a type of the target tag information.

An embodiment of the application, the processor may be further configured to recognize the target compressed image on the basis of the recognition neural network model to obtain tag information of the target original image; and the memory may be further configured to store the tag information of the target original image.

An embodiment of the application, the compression training image set may include multiple dimensions, and the processor may be further configured to recognize the original image on the basis of the target model to obtain multiple pieces of image information, in which each dimension may correspond to a piece of the image information, and to compress the original image on the basis of the target model and the multiple pieces of the image information, so as to obtain the compressed image.

Another aspect of the application provides another electronic device, which may include a processor, a memory, a communication interface, and one or more programs, where the one or more programs are stored in the memory and are configured to be performed by the processor, and the programs include instructions configured for part or all of the operations described in the abovementioned image compression method.

Another aspect of the application provides a computer-readable storage medium, which stores a computer program, where the computer program may include a program instruction, and the program instruction is performed by a processor to enable the processor to perform the abovementioned image compression method.

Compared with the related arts, the processing method and device as well as the computation method and device provided by the application at least have the following advantages.

1. A quantization method is adopted to quantize the neurons and the weights of the neural network, the weight dictionary and the weight codebook are adopted to represent the quantized weights, the neuron dictionary and the neuron codebook are adopted to represent the quantized neurons, and then the computation in the neural network is converted into the table lookup operation. Therefore, the count of stored parameters of the neural network is reduced, and memory access energy consumption and computation energy consumption are reduced. A lookup-table-based computation method is integrated in the neural network processor, so that the table lookup operation is optimized, the structure is simplified, the memory access energy consumption and computation energy consumption of the neural network are reduced, and meanwhile, computational diversity may also be achieved.

2. The neural network may be retrained, and during retraining, only the codebooks are required to be trained and the weight dictionary is not required to be trained, so that a retraining operation is simplified.

3. The neural network-dedicated instruction for locally quantized multilayer artificial neural network computation and the flexible computation units are adopted, so that the problems of poor computational performance of a Central Processing Unit (CPU) and a Graphics Processing Unit (GPU) and high front-end decoding overhead are solved, and support to a multilayer artificial neural network computation algorithm is effectively improved.

4. A dedicated on-chip cache for the multilayer artificial neural network computation algorithm is adopted, so that reusability of the input neurons and the weight data is fully mined, repeated reading of these data from the memory is avoided, a memory access bandwidth is reduced, and performance bottleneck problems brought by a memory bandwidth to multilayer artificial neural network computation and a training algorithm of the multilayer artificial neural network computation are solved.

BRIEF DESCRIPTION OF THE DRAWINGS

FIG. A1 is a schematic flowchart of a processing method according to an embodiment of the application.

FIG. A2 is a schematic diagram of a process of quantifying weights according to an embodiment of the application.

Figure 1:
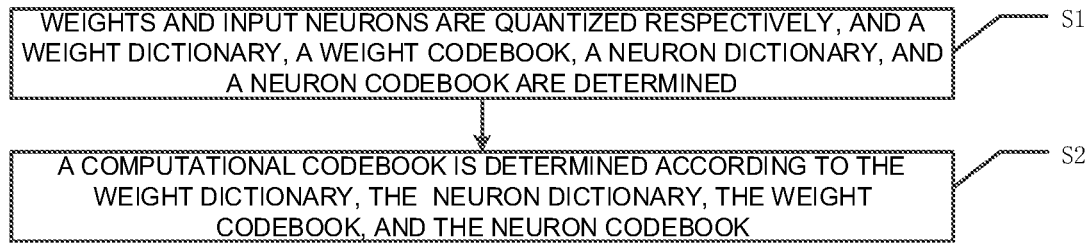
Figure 2:
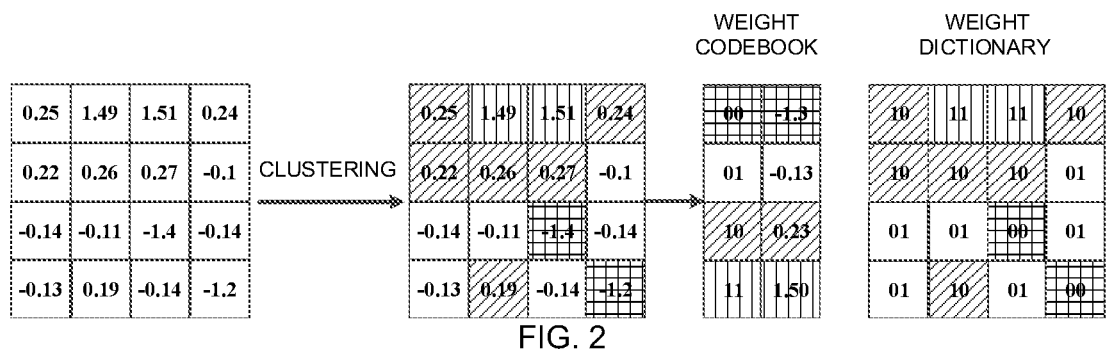
Figure 3:
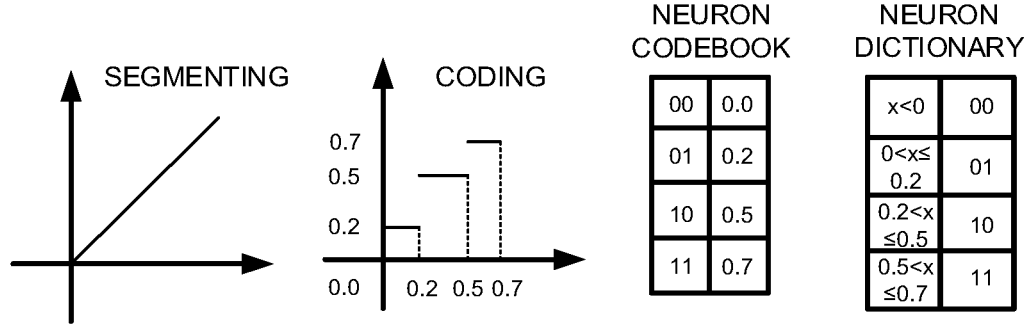
Figure 4:
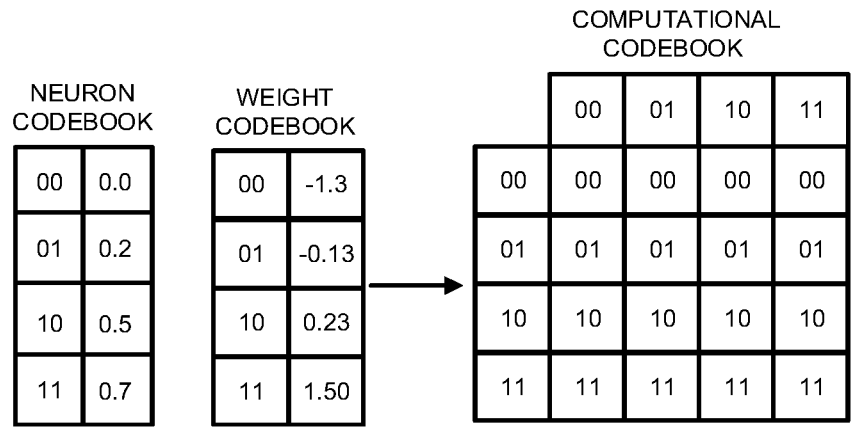
Figure 5:
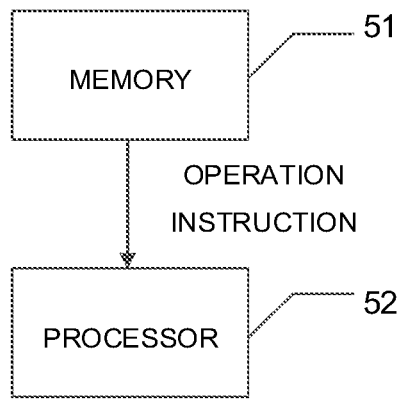
Figure 6:
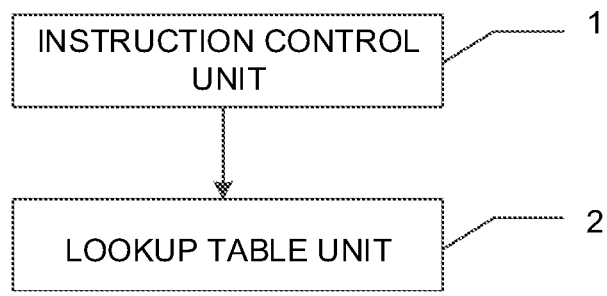
Figure 7:
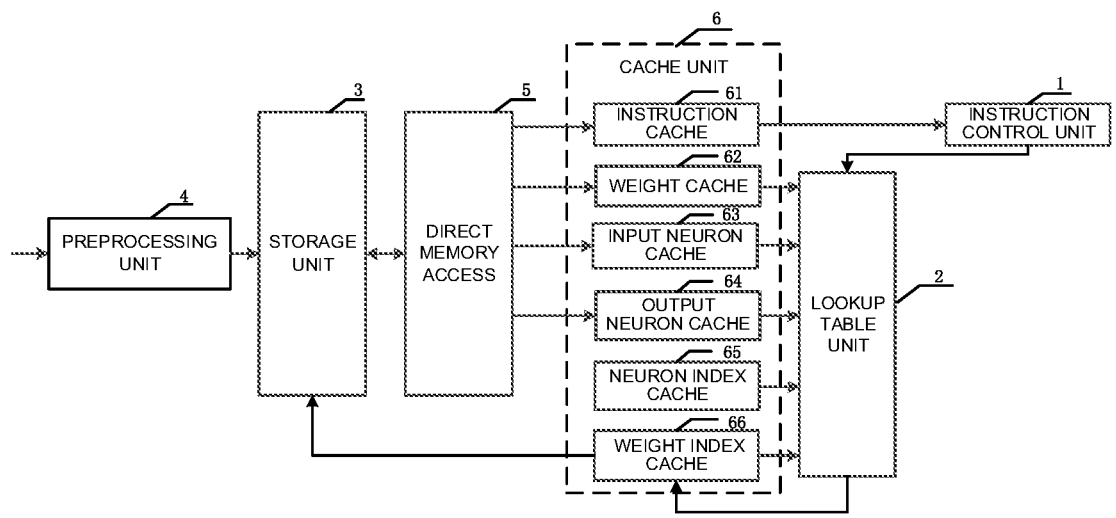
Figure 8:
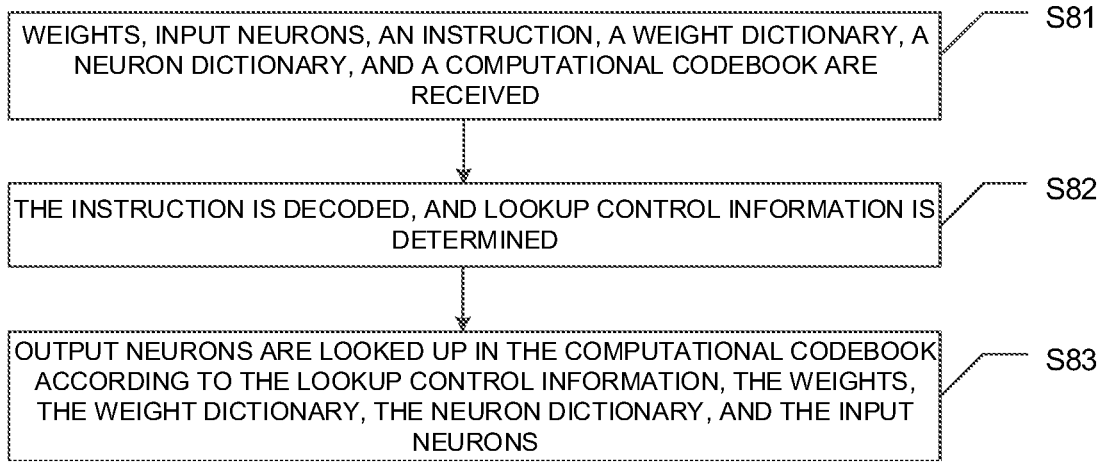
Figure 9:
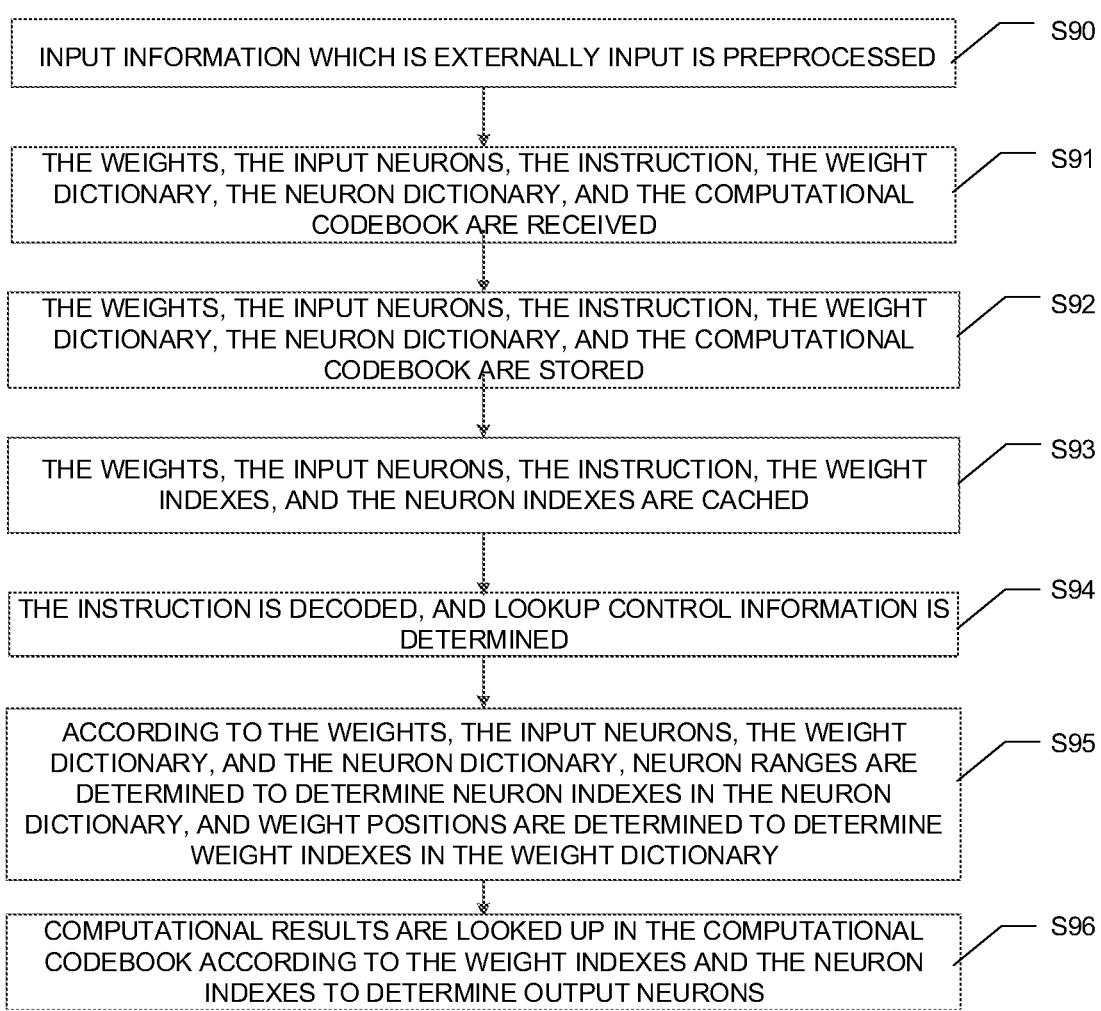
Figure 10:
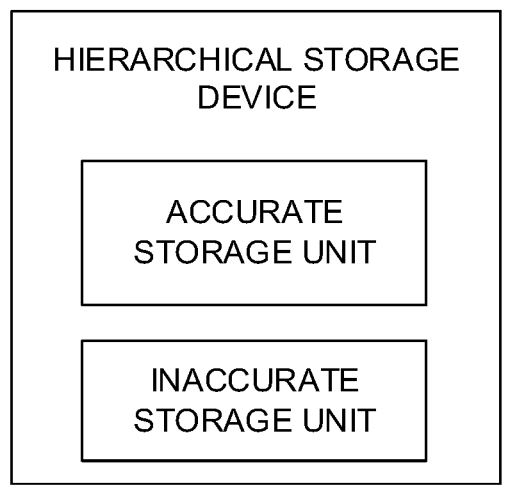
Figure 11:
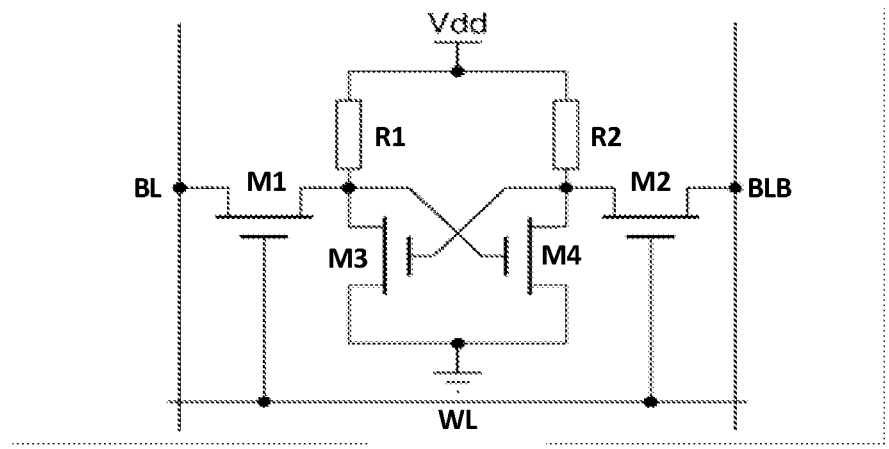
Figure 12:
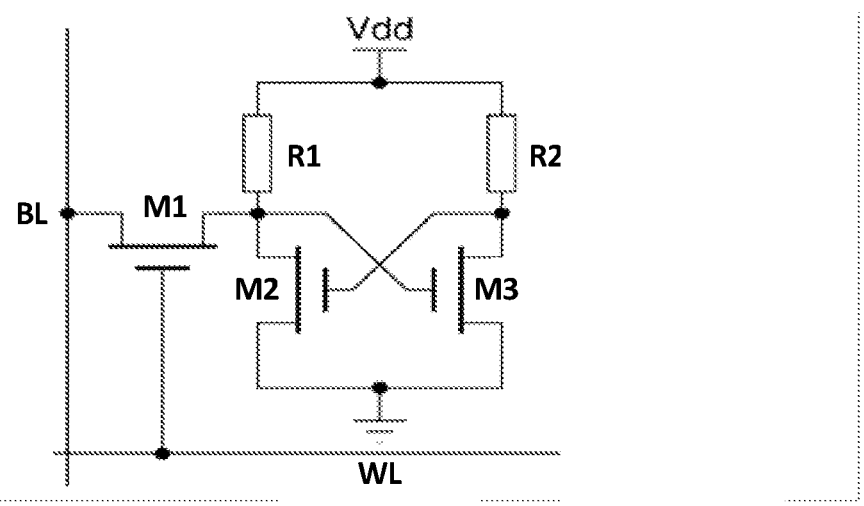
Figure 13:
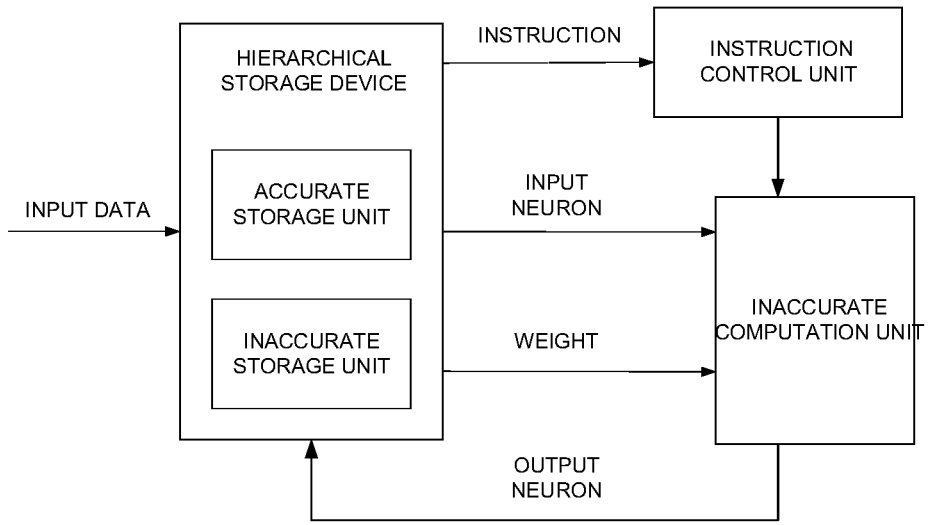
Figure 14:
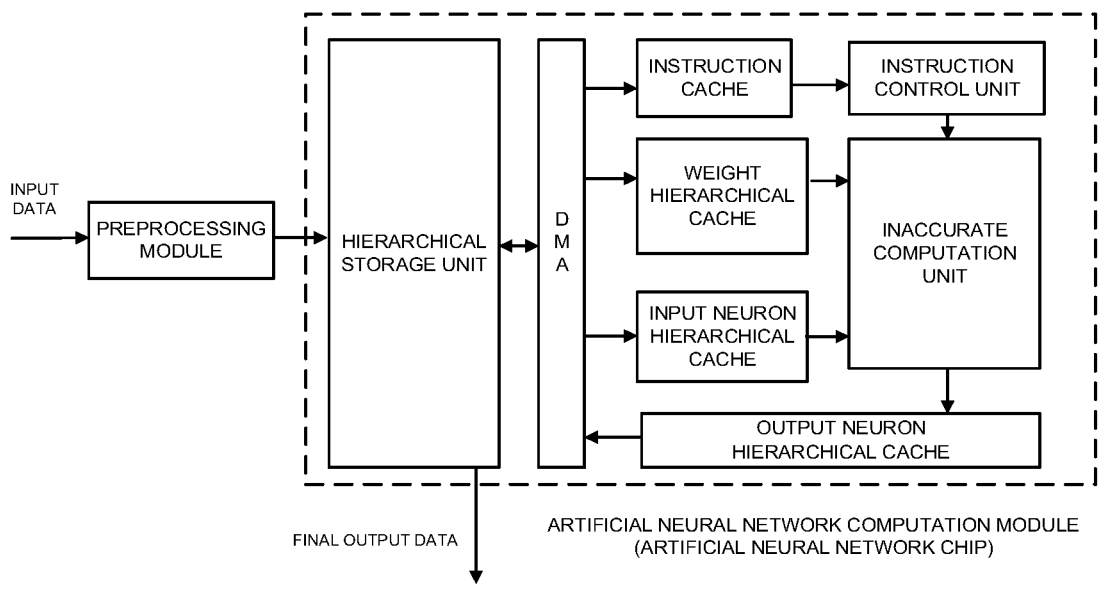
Figure 15:
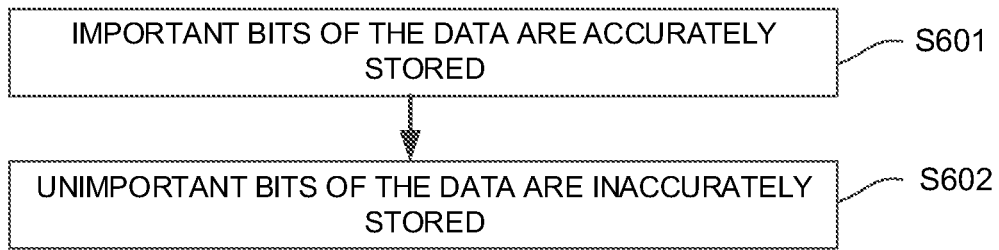
Figure 16:
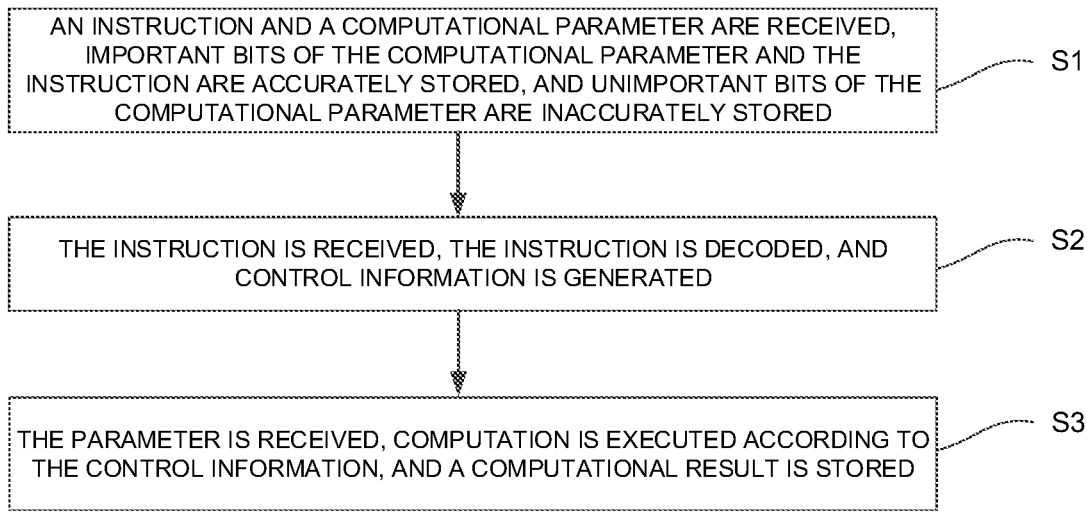
Figure 17:
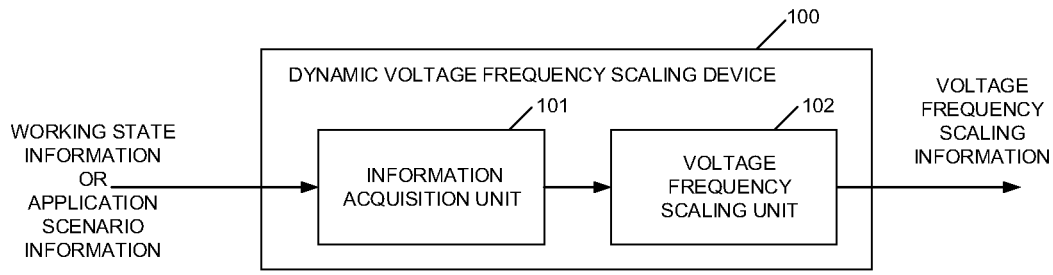
Figure 18:
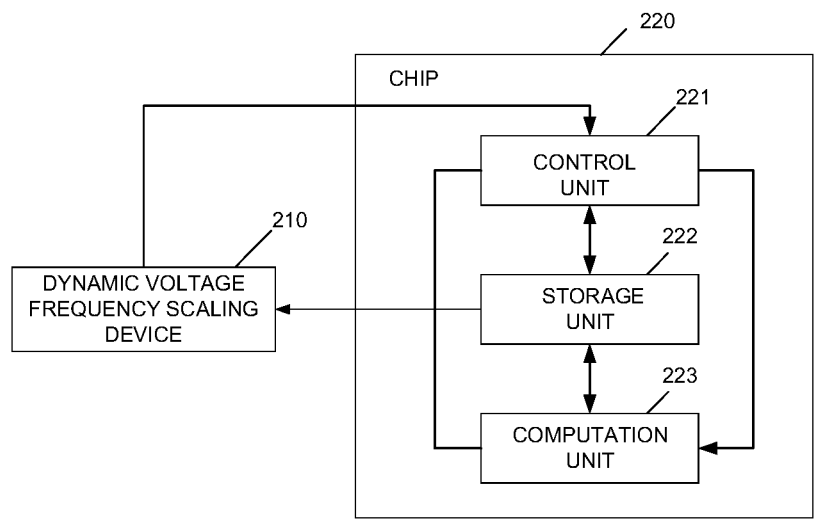
Figure 19:
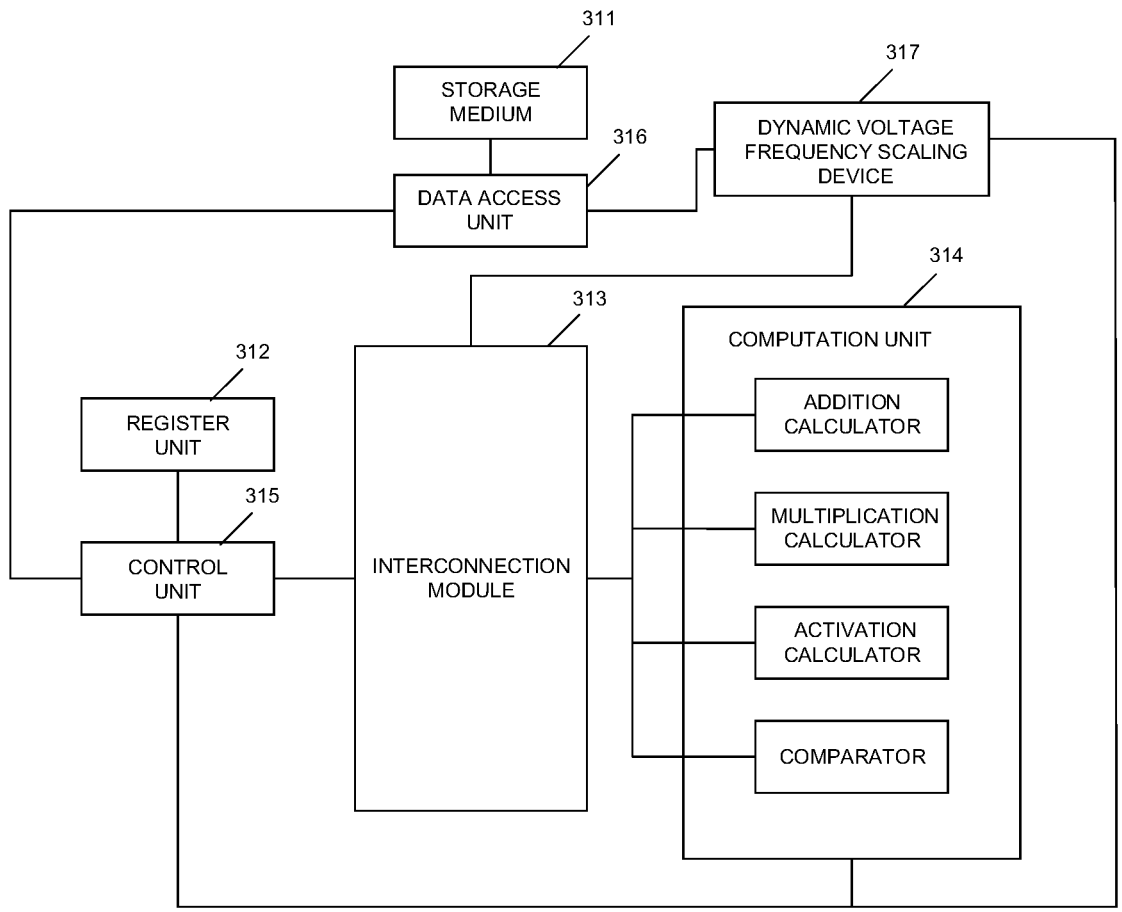
Figure 20:
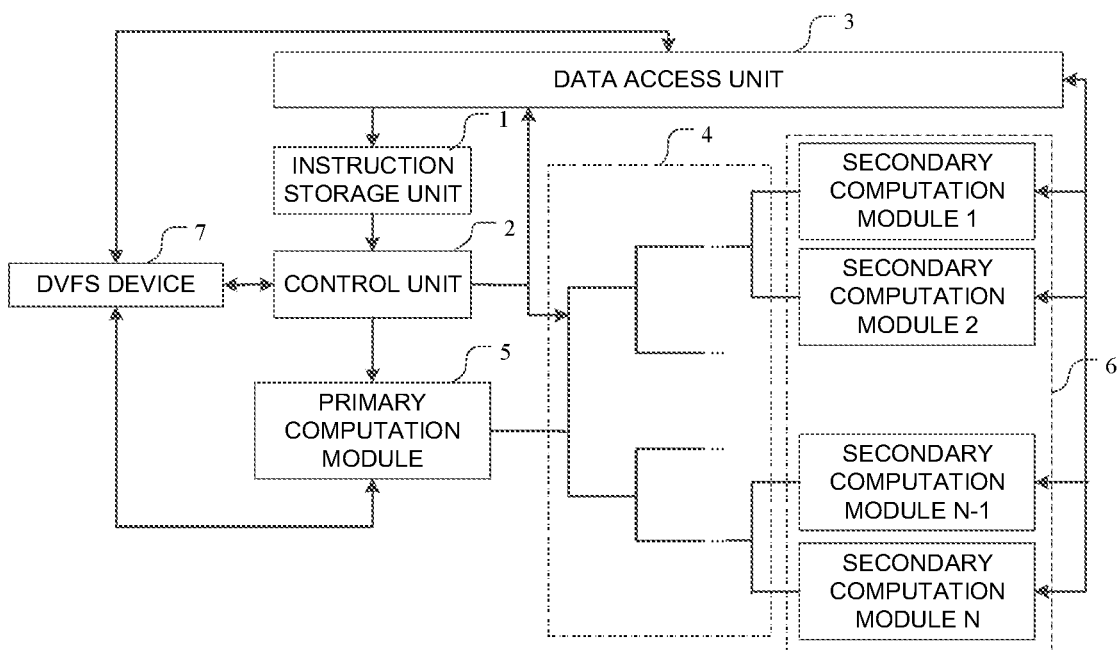
Figure 21:
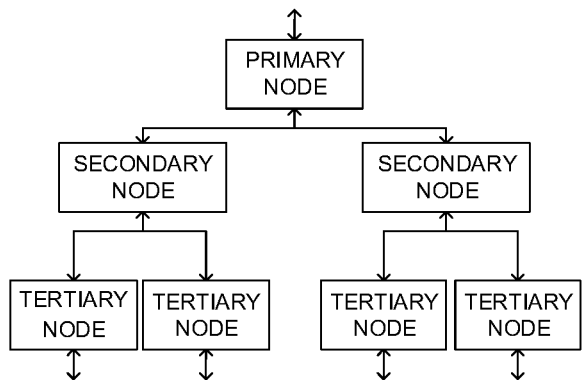
Figure 22:
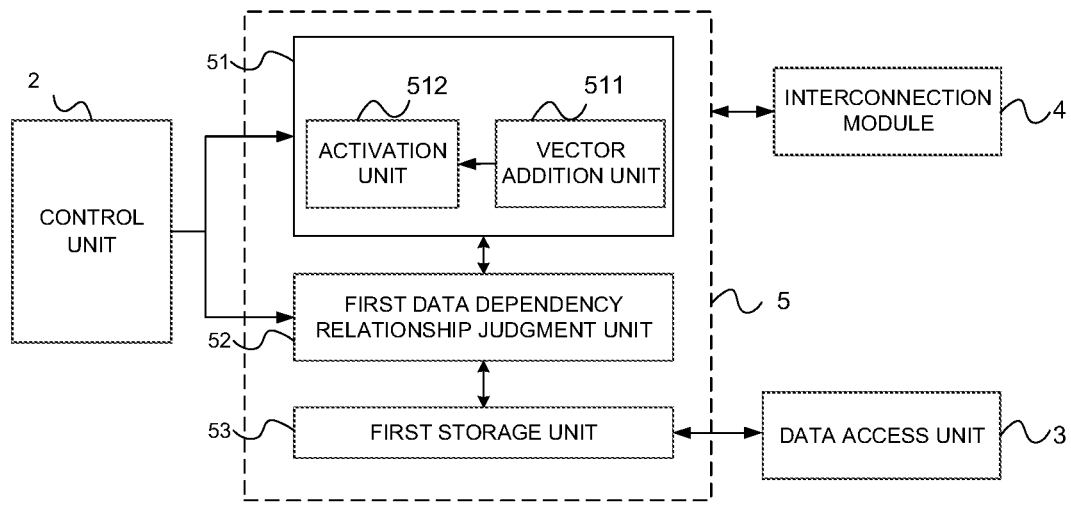
Figure 23:
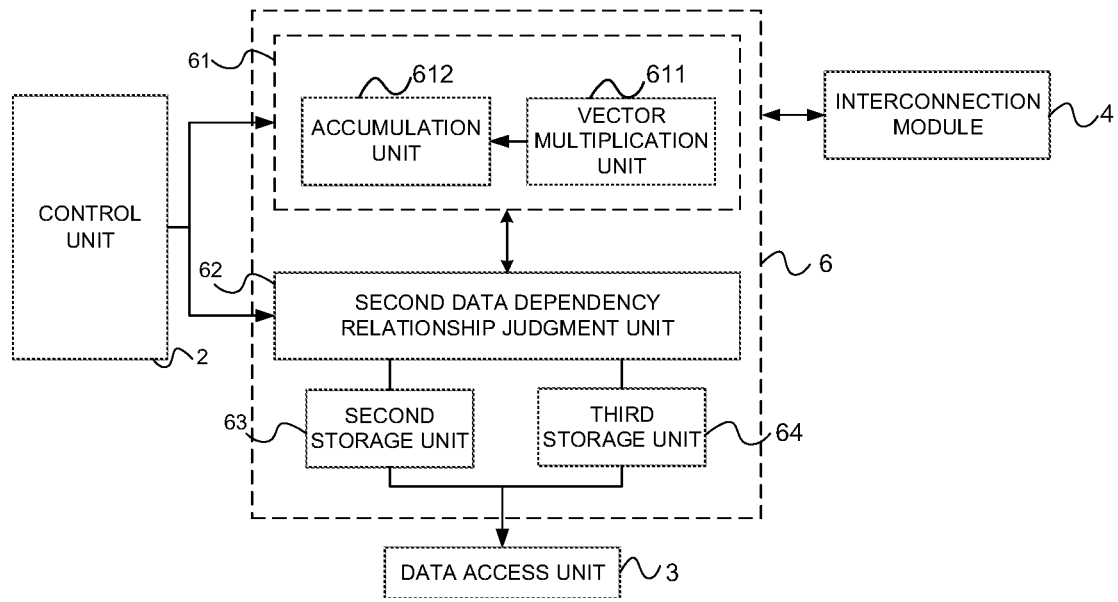
Figure 24:
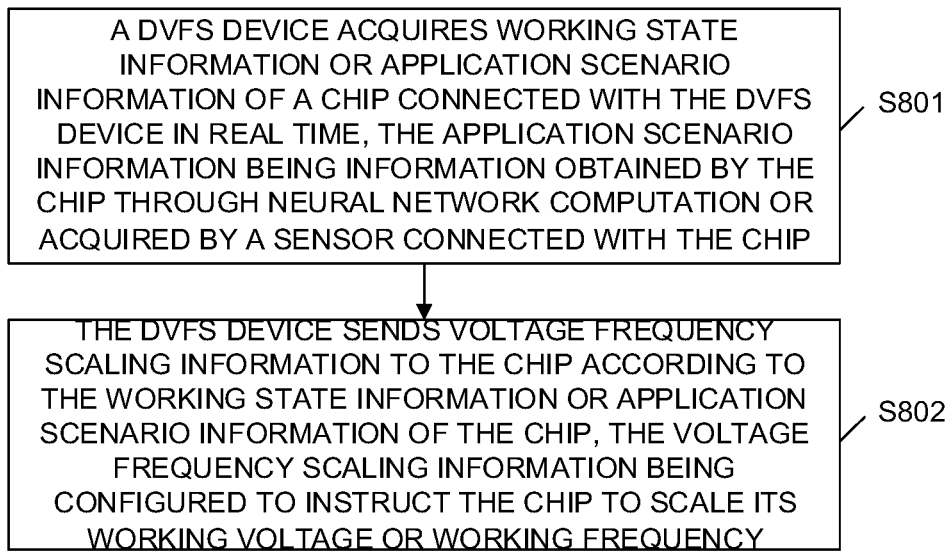
Figure 25:
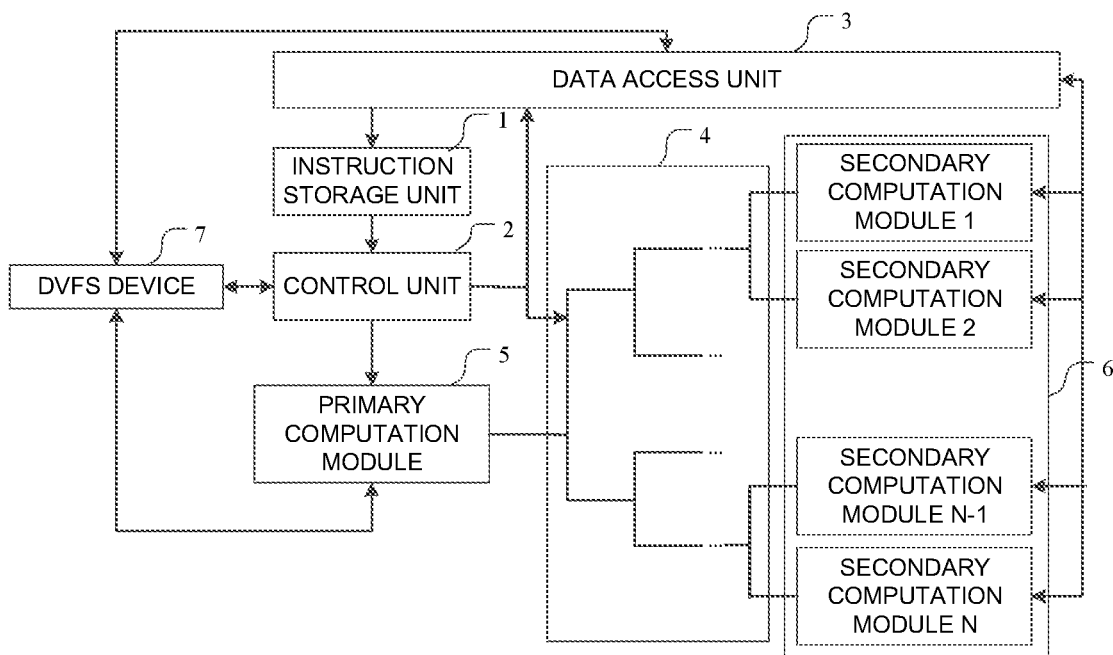
Figure 26:
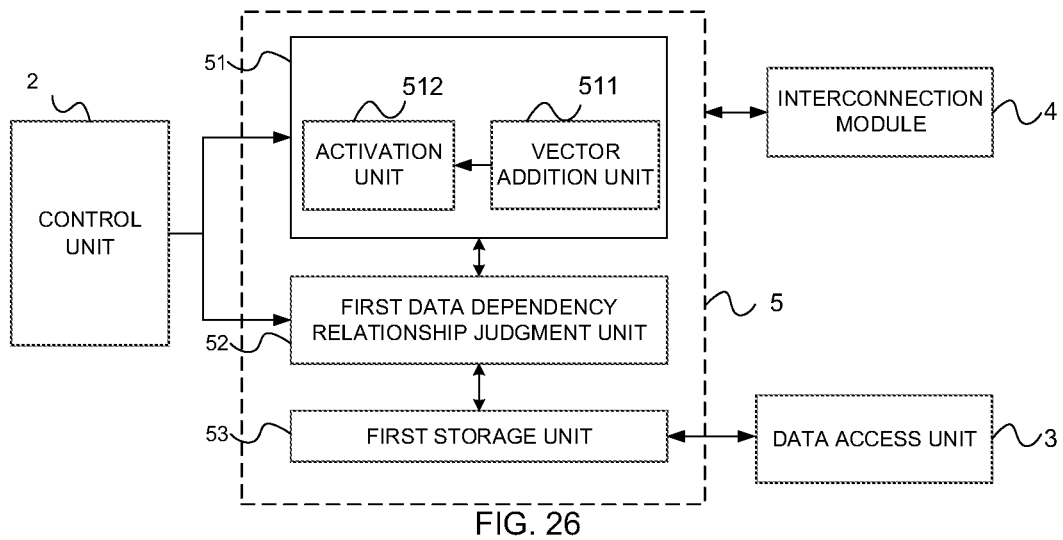
Figure 27:
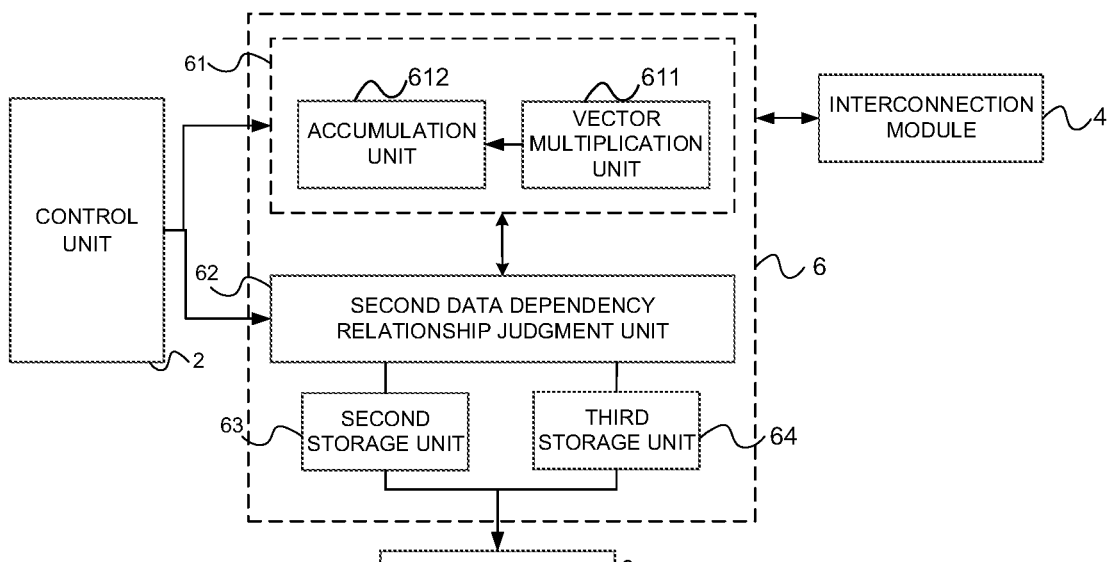
Figure 28:
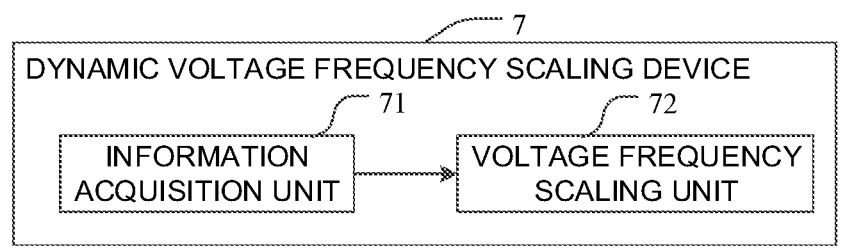
Figure 29:
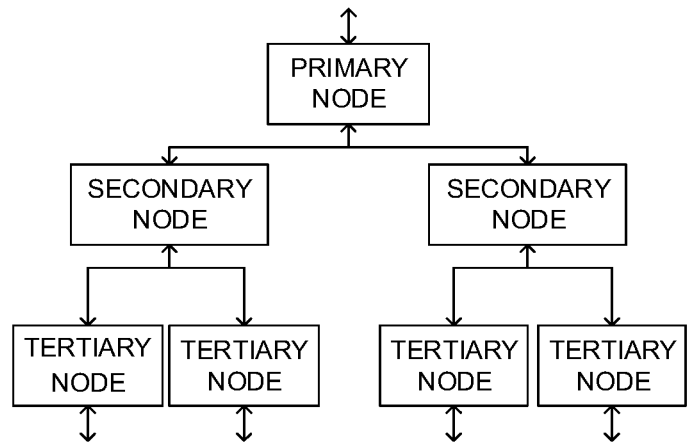
Figure 30:
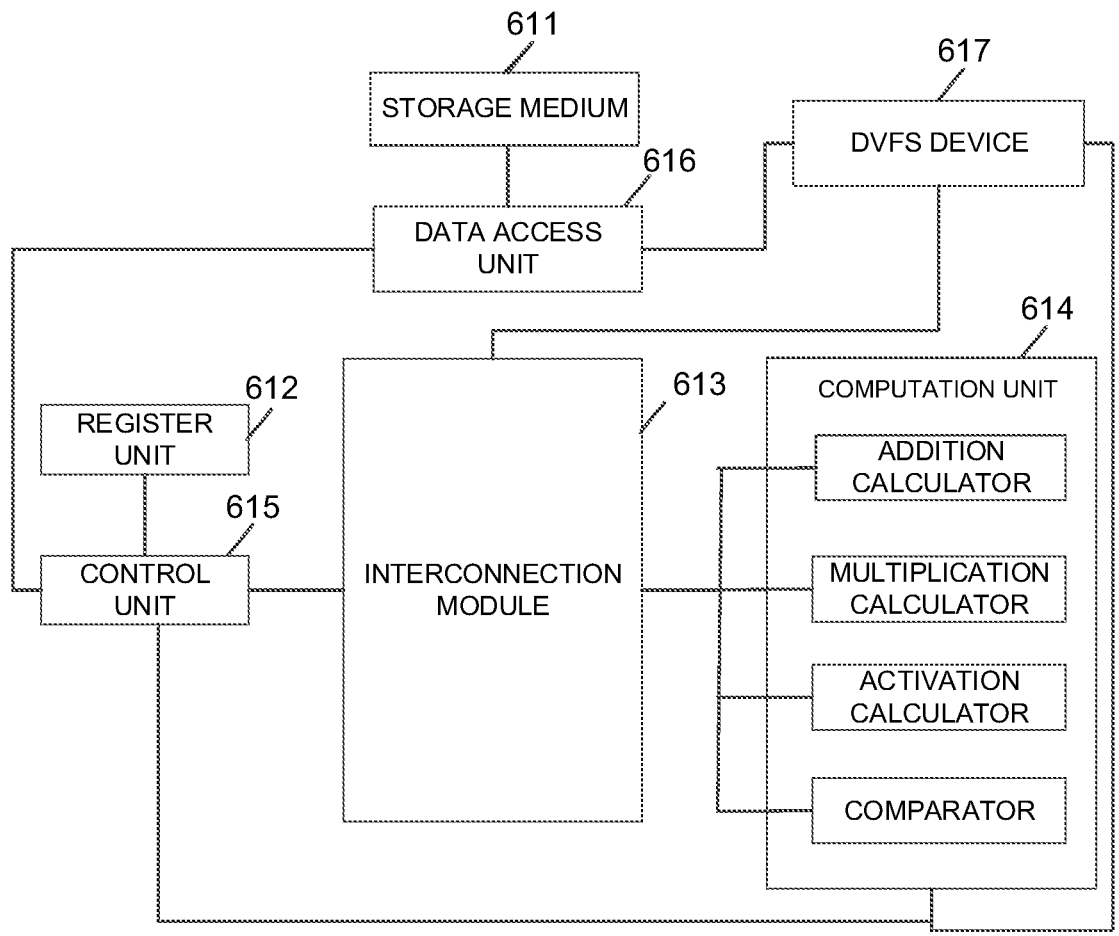
Figure 31:
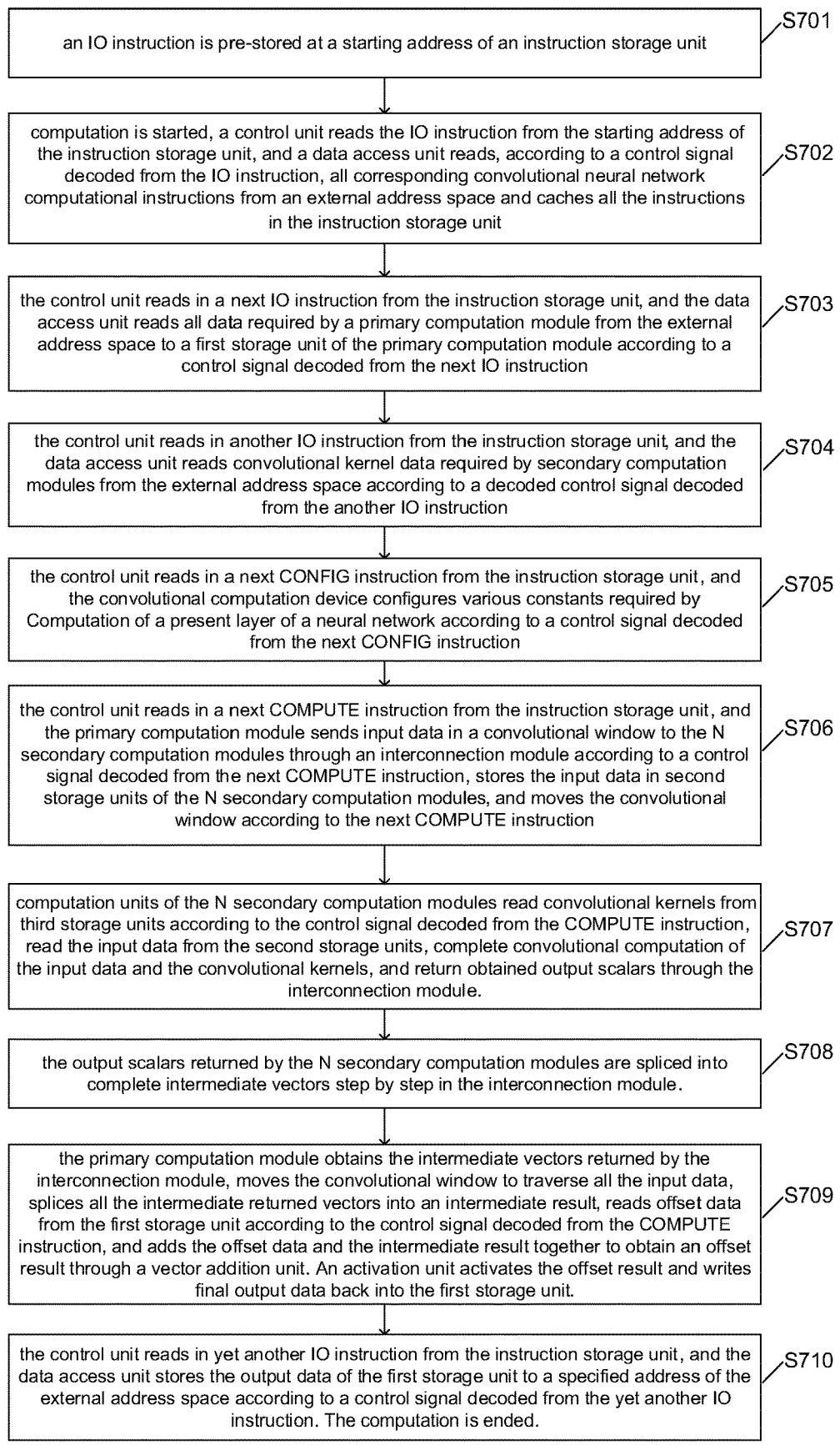
Figure 32:
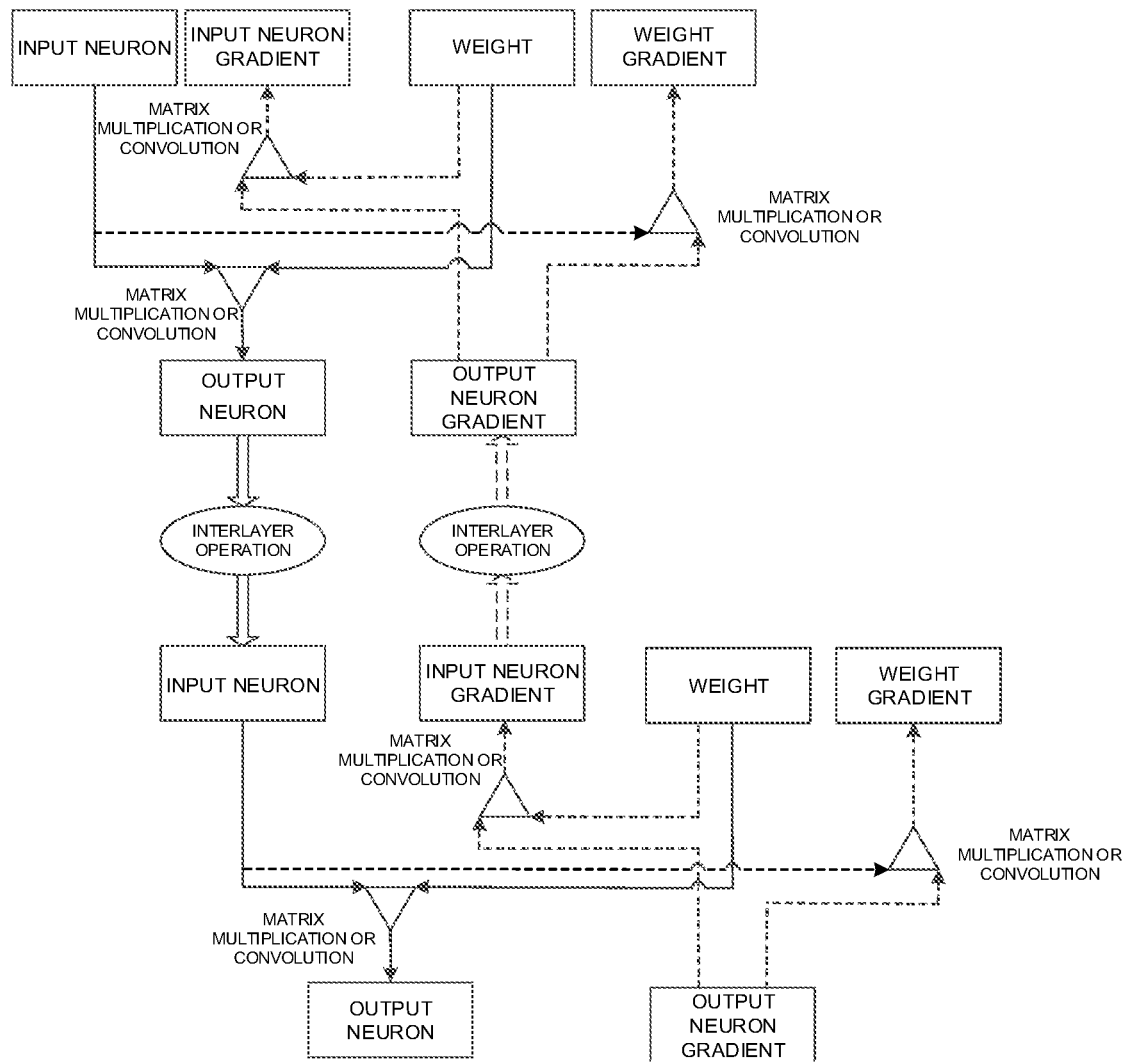
Figure 33:
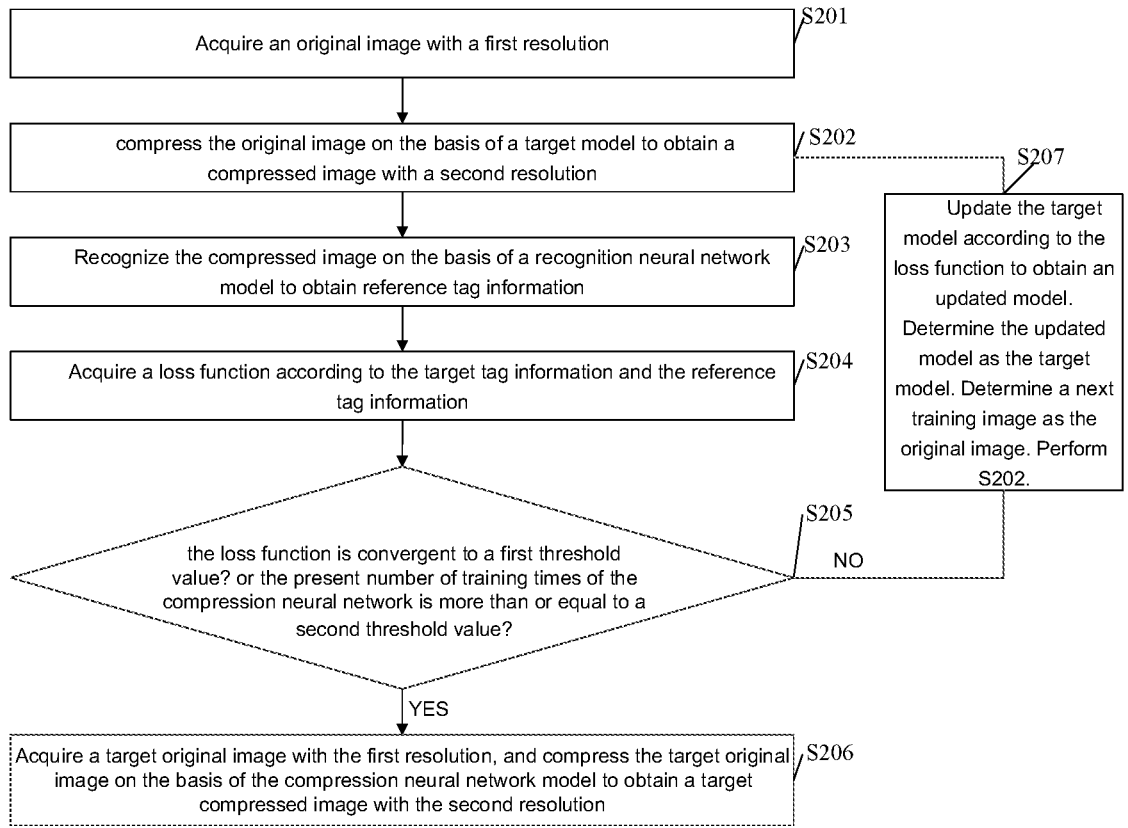
Figure 34:
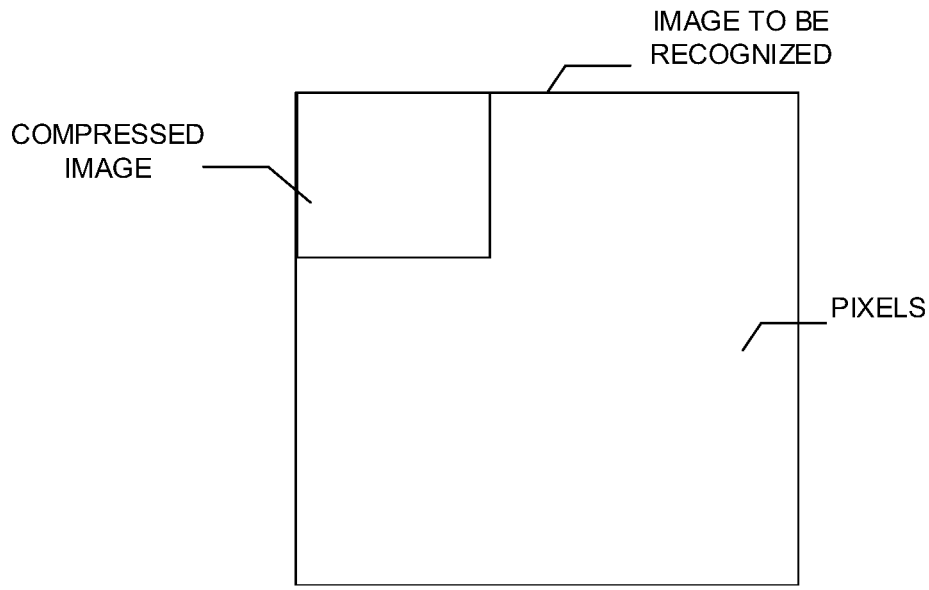
Figure 35:
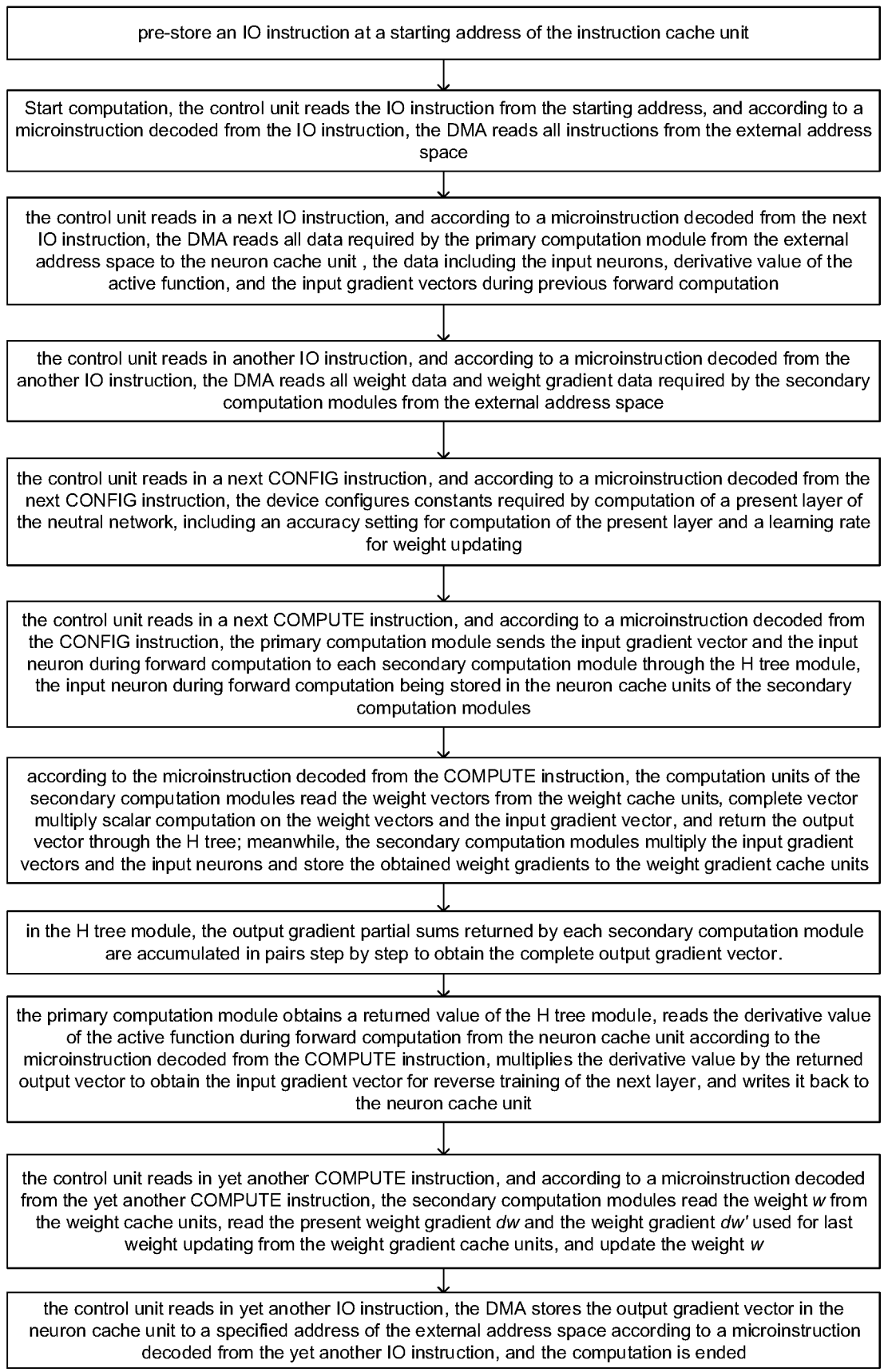
Figure 36:
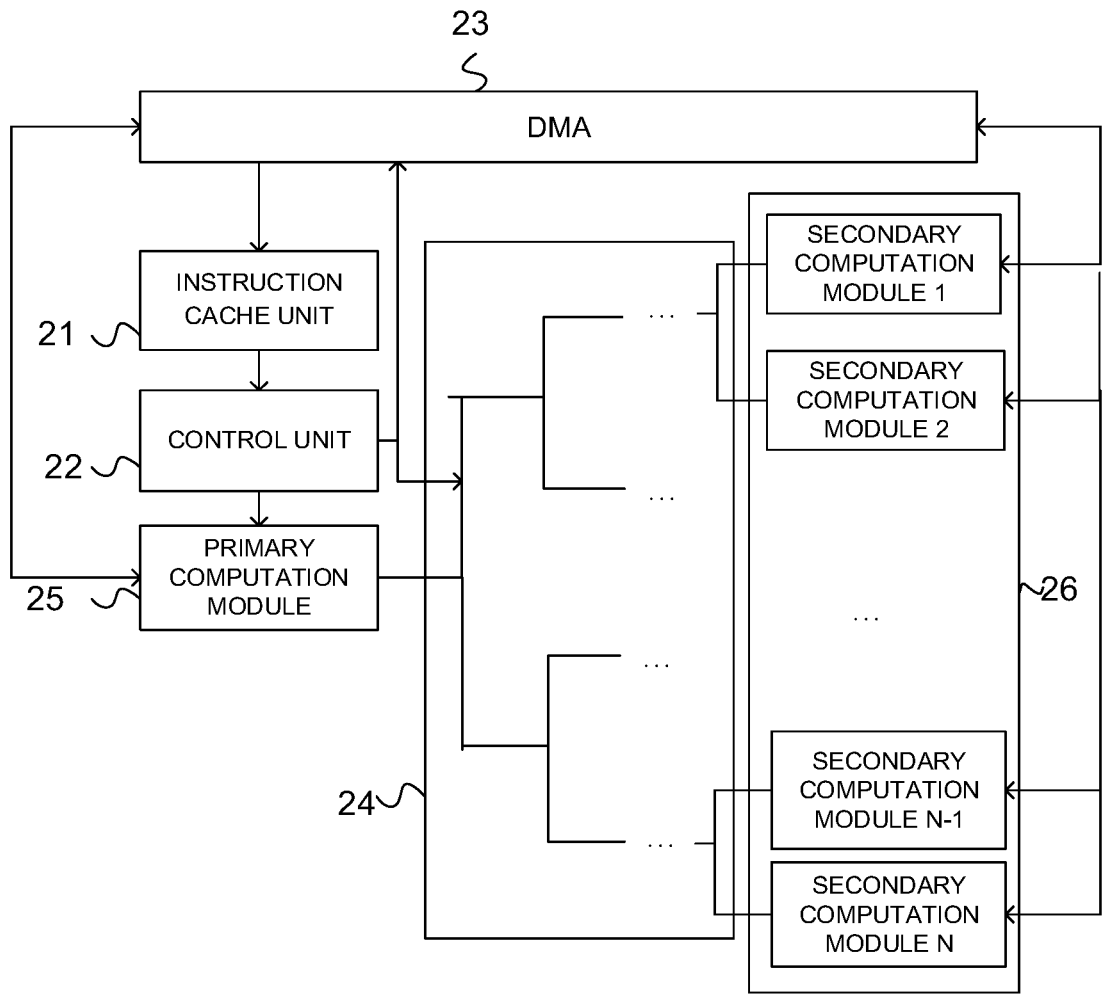
Figure 37:
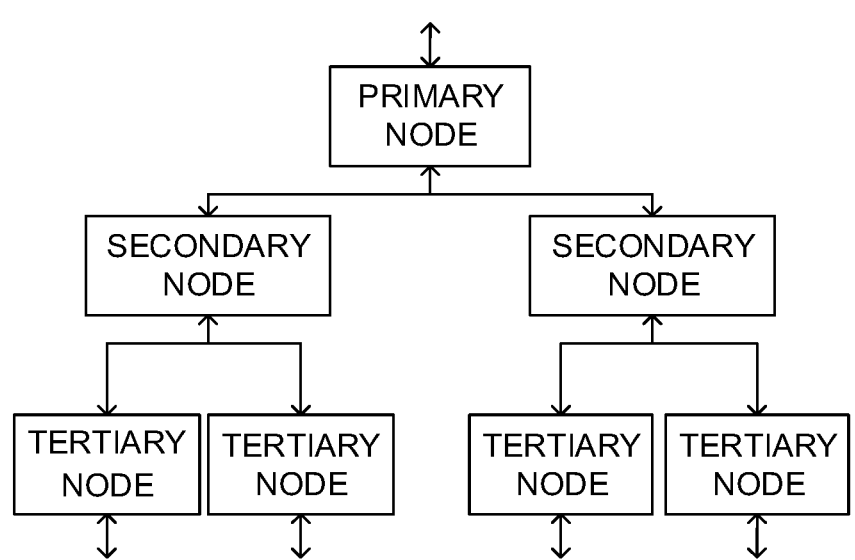
Figure 38:
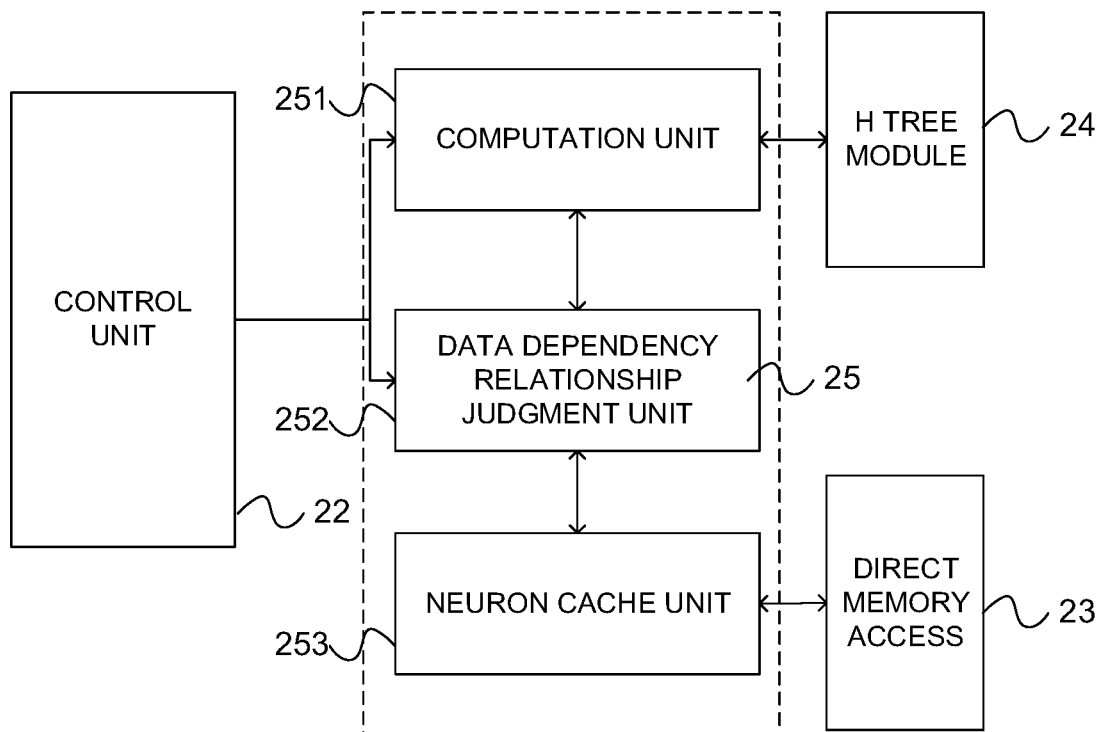
Figure 39:
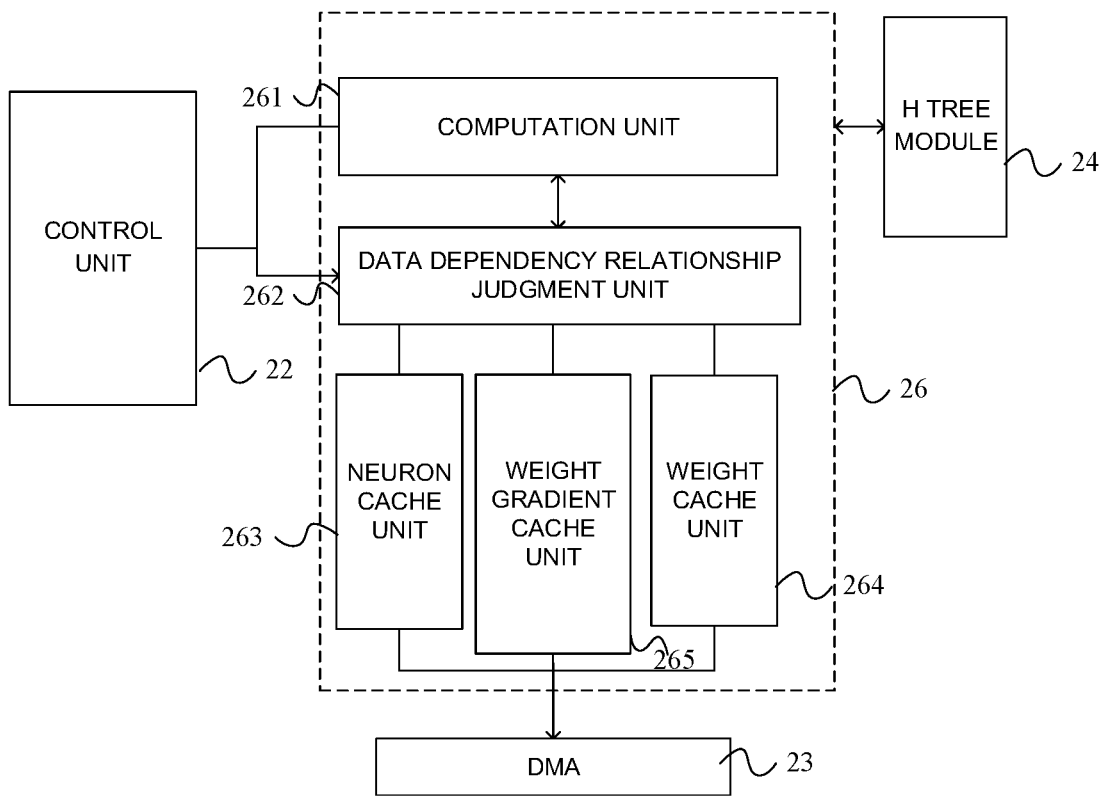
Figure 40:
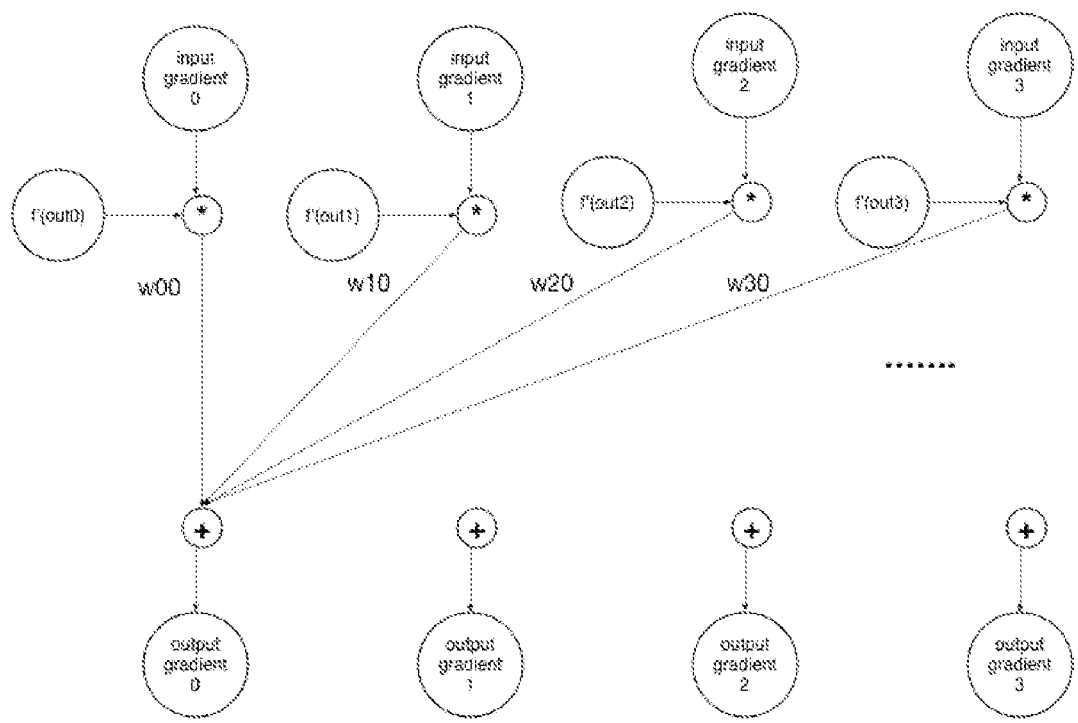
Figure 41:
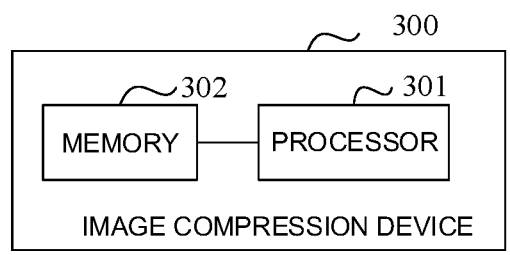
Figure 42:
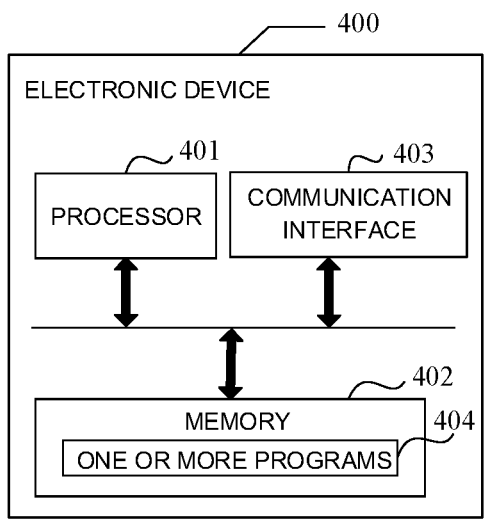

FIG. A3 is a schematic diagram of a process of quantifying input neurons according to an embodiment of the application.

FIG. A4 is a schematic diagram of a process of determining a computational codebook according to an embodiment of the application.

FIG. A5 is a schematic structure diagram of a processing device according to an embodiment of the application.

FIG. A6 is a schematic structure diagram of a computation device according to an embodiment of the application.

FIG. A7 is a schematic structure diagram of a computation device according to another embodiment of the application.

FIG. A8 is a schematic flowchart of a computation method according to an embodiment of the application.

FIG. A9 is a schematic flowchart of another computation method according to an embodiment of the application.

FIG. B1 is a schematic structure diagram of a hierarchical storage device according to an embodiment of the application.

FIG. B2 is a schematic structure diagram of a storage unit of a 4T SRAM according to an embodiment of the application.

FIG. B3 is a schematic structure diagram of a storage unit of a 3T SRAM according to an embodiment of the application.

FIG. B4 is a schematic structure diagram of a data processing device according to an embodiment of the application.

FIG. B5 is a schematic structure diagram of another data processing device according to an embodiment of the application.

FIG. B6 is a flowchart of a data storage method according to an embodiment of the application.

FIG. B7 is a flowchart of a data processing method according to an embodiment of the application.

FIG. C1 is a schematic structure diagram of a DVFS device according to an embodiment of the application.

FIG. C2 is a schematic diagram of a DVFS application scenario according to an embodiment of the application.

FIG. C3 is a schematic diagram of another DVFS application scenario according to an embodiment of the application.

FIG. C4 is a schematic diagram of yet another DVFS application scenario according to an embodiment of the application.

FIG. C5 is a schematic diagram of an implementation mode of an interconnection module 4 according to an embodiment of the application.

FIG. C6 is an exemplary structure block diagram of a primary computation module 5 in a device for performing convolutional neural network forward computation according to an embodiment of the application.

FIG. C7 is an exemplary structure block diagram of a secondary computation module 6 in a device for performing convolutional neural network forward computation according to an embodiment of the application.

FIG. C8 is a schematic flowchart of a DVFS method according to an embodiment of the application.

FIG. D1 is a schematic structure diagram of a convolutional operation device according to an embodiment of the application.

FIG. D2 is an exemplary structure block diagram of a primary computation module in a convolutional operation device according to an embodiment of the application.

FIG. D3 is an exemplary structure block diagram of a secondary computation module in a convolutional operation device according to an embodiment of the application.

FIG. D4 is an exemplary structure block diagram of a DVFS device in a convolution operation device according to an embodiment of the application.

FIG. D5 is a schematic diagram of an implementation mode of an interconnection module 4 according to an embodiment of the application.

FIG. D6 is a structure diagram of another convolutional operation device according to an embodiment of the application.

FIG. D7 is a schematic flowchart of a method for performing single-layer convolutional neural network forward computation according to an embodiment of the application.

FIG. E1 is a schematic diagram of computation of a neural network according to an embodiment of the application.

FIG. E2 is a schematic flowchart of an image compression method according to an embodiment of the application.

FIG. E3 is a schematic diagram of a scenario of a size processing method according to an embodiment of the application.

FIG. E4 is a schematic flowchart of a single-layer neural network computation method according to an embodiment of the application.

FIG. E5 is a schematic structure diagram of a device for performing compression neural network reverse training according to an embodiment of the application.

FIG. E6 is a schematic structure diagram of an H tree module according to an embodiment of the application.

FIG. E7 is a schematic structure diagram of a primary computation module according to an embodiment of the application.

FIG. E8 is a schematic structure diagram of a computation module according to an embodiment of the application.

FIG. E9 is an exemplary block diagram of compression neural network reverse training according to an embodiment of the application.

FIG. E10 is a schematic flowchart of an image compression method according to an embodiment of the application.

FIG. E11 is a schematic structure diagram of an electronic device according to an embodiment of the application.

DETAILED DESCRIPTION OF THE EMBODIMENTS

For the technical defect in related arts that a huge amount of computation for data processing of a neural network may hinder application of the neural network, the application provides a processing method and device and a computation method and device. By the processing method and device, two types of data, for example, input neurons and weights, are quantized to mine similarities between interlayer data and inter-segment data and local similarities between intralayer data and intra-segment data respectively, so as to mine distribution characteristics of the two types of data, and low-bit quantization is performed to reduce the count of bits configured to represent each piece of data. Therefore, a data storage overhead and a memory access overhead are reduced. According to the processing method and device, a table lookup operation is performed to implement a computational operation over the quantized neurons and weights, so that memory access energy consumption and computation energy consumption of a neural network are reduced.

Input neurons and output neurons mentioned in the application do not refer to neurons in an input layer and neurons in an output layer in the whole neural network. For any two adjacent layers in the network, neurons in a lower layer for feedforward computation of the network are input neurons and neurons in an upper layer for the feedforward computation of the network are output neurons. For example, for a convolutional neural network, assume that the convolutional neural network has L layers, and K=1, 2, . . . , L−1 For the $K^{th}$ layer and the $(K+1)^{th}$ layer, the $K^{th}$ layer may be an input layer in which neurons are input neurons, and the $(K+1)^{th}$ layer may be an output layer in which neurons are output neurons. In other words, except a top layer, each layer may be determined as an input layer, and a layer below it may be a corresponding output layer.

In order to make the purpose, technical solutions, and advantages of the application clearer, the application will further be described below in combination with specific embodiments and with reference to the drawings in detail.

FIG. A1 is a schematic flowchart of a processing method according to an embodiment of the application. As shown in FIG. A1, the processing method may include the following.

In S1, weights and input neurons are quantized respectively, and a weight dictionary, a weight codebook, a neuron dictionary, and a neuron codebook are determined.

A process of quantifying the weights may include the following:

grouping the weights, adopting a clustering algorithm to perform a clustering operation on the weights of each group to divide the weights of each group into m types, in which m may be a positive integer and the weights of each type corresponding to a weight index, and determining the weight dictionary, where the weight dictionary may include weight positions and weight indices, and the weight positions refer to positions of the weights in a neural network structure;

replacing all the weights of each type with a central weight, and determining the weight codebook, where the weight codebook may include the weight indices and the central weights.

FIG. A2 is a schematic diagram of a process of quantifying weights according to an embodiment of the application. As shown in FIG. A2, the weights are grouped according to a preset grouping strategy to obtain a weight matrix which is arranged in order. Then, intra-group sampling and the clustering operation are performed on the weight matrix obtained by grouping. The weights with approximate numerical values are divided into the same types. Central weights 1.50, −0.13, −1.3, and 0.23 under four types are computed according to a loss function, and correspond to the weights of the four types respectively. In a known weight codebook, a weight index of the type with the central weight −1.3 is 00, a weight index of the type with the central weight −0.13 is 01, a weight index of the type with the central weight 0.23 is 10, and a weight index of the type with the central weight 1.50 is 11. In addition, the four weight indices (00, 01, 10, and 11) corresponding to the four central weights are adopted to represent the weights in the corresponding types respectively, such that a weight dictionary is obtained. It is to be noted that the weight dictionary further may include weight positions, for example, the positions of the weights in the neural network structure. In the weight dictionary, a weight position refers to a coordinate, for example, (p, q), of the $p^{th}$ row and the $q^{th}$ column. In the embodiment, $1 \leq p \leq 4$ and $1 \leq q \leq 4$.

Thus, it can be seen that, by the quantization process, similarities between interlayer weights and local similarities between intra-layer weights in the neural network are fully mined to obtain a distribution characteristic of the weights of the neural network, and low-bit quantization may be performed to reduce the count of bits configured to represent each weight. Therefore, a weight storage overhead and a memory access overhead are reduced.

In some implementations, the preset grouping strategy may include, but is not limited to, the following strategies: dividing into a group: all the weights in a neural network are divided into a group; layer-type-based grouping: weights of all convolutional layers, weights of all fully connected layers, and weights of all LSTM network layers in the neural network are divided into a group respectively; interlayer grouping: weights of one or more convolutional layers, weights of one or more fully connected layers, and weights of one or more LSTM network layers in the neural network are divided into a group respectively; and intra-layer grouping: weights in a layer of the neural network are segmented, and each segmented part is divided into a group.

The clustering algorithm may include K-means, K-medoids, Clara, and/or Clarans. A selection method for the central weight corresponding to each type may include that: a value of $W_0$ corresponding to a minimum cost function j(w, $w_0$) is determined as the central weight. The cost function may be a squared distance function:

$$J(w, w_0) = \sum_{i=1}^{n} (w_i - w_0)^2,$$

where J is the cost function, W refers to all the weights of the type, $W_0$ is the central weight, n is the count of all the weights of the type, W is the $i^{th}$ weight of the type, $1 \leq j \leq n$ and n is a positive integer.

Furthermore, describing quantization of the input neurons may include the following:

dividing the input neurons divided into p segments, in which the input neurons of each segment may correspond to a neuron range and a neuron index, and determining the neuron dictionary, in which p may be a positive integer;

coding the input neurons, replacing all the input neurons of each segment with a central neuron, and determining the neuron codebook.

FIG. A3 is a schematic diagram of a process of quantifying input neurons according to an embodiment of the application. As shown in FIG. A3, specific descriptions will be made in the embodiment with quantization of neurons of a ReLU activation layer as an example. A ReLU function is segmented into totally four segments. Central neurons of the four segments are represented by 0.0, 0.2, 0.5, and 0.7 respectively, and neuron indices are represented by 00, 01, 10, and 11. A neuron codebook and a neuron dictionary are finally generated, where the neuron codebook may include the neuron indices and the central neurons, and the neuron dictionary may include neuron ranges and the neuron indices. The neuron ranges and the neuron indices are correspondingly stored and x (shown in FIG. A3) represents a value of a neuron if the neuron is not quantized. By the quantization process of the input neurons, the input neurons may be divided into multiple segments according to a practical requirement, an index of each segment is obtained, and then the neuron dictionary is formed. Then, the input neurons in each segment are replaced with the central neurons in the neuron codebook according to the neuron indices. Similarities between the input neurons may be fully mined to obtain a distribution characteristic of the input neurons, and low-bit quantization is performed to reduce the count of bits representing each input neuron, so that an input neuron storage overhead and a memory access overhead are reduced.

In S2, determining a computational codebook according to the weight codebook and the neuron codebook may include the following:

in S21, determining the corresponding weight indices in the weight codebook according to the weights, and determining the central weights corresponding to the weights through the weight indices;

in S22, determining the corresponding neuron indices in the neuron codebook according to the input neurons, and determining the central neurons corresponding to the input neurons through the neuron indices; and in S23, performing a computational operation on the central weights and the central neurons to obtain computational results, and forming the computational results to a matrix so as to determine the computational codebook.

FIG. A4 is a schematic diagram of a process of determining a computational codebook according to an embodiment of the application. As shown in FIG. A4, a multiplication codebook is taken as an example in the embodiment. In other embodiments, the computational codebook may also be an addition codebook, a pooling codebook, and the like, which is not limited herein. According to a weight dictionary, weight indices corresponding to weights are determined, and central weights corresponding to the weight indices are determined. According to a neuron codebook, neuron indices corresponding to input neurons are determined, and central neurons corresponding to the neuron indices are determined. The neuron indices and the weight indices are taken as row indices and column indices of the computational codebook, multiplication computation is performed on the central neurons and the central weights, and a matrix is formed to obtain the multiplication codebook.

After S2, the method may further include the following. In S3, the weights and the input neurons are retrained. During retraining, only the weight codebook and the neuron codebook are trained, and contents in the weight dictionary and the neuron dictionary are kept unchanged, so that a retraining operation is simplified, and a workload is reduced. Preferably, a back propagation algorithm is adopted for retraining.

FIG. A5 is a schematic structure diagram of a processing device according to an embodiment of the application. As shown in FIG. A5, the processing device may include a memory 51 and a processor 52.

The memory 51 may be configured to store an operation instruction.

The processor 52 may be configured to perform the operation instruction stored in the memory, in which the operation instruction may be performed for operations according to the abovementioned processing method. The operation instruction may be a binary number including an operation code and an address code. The operation code indicates an operation to be performed by the processor 52. The address code instructs the processor 52 to read data participating in the operation from an address in the memory 51.

According to the data processing device of the application, the processor 52 can perform the operations of the abovementioned data processing method by performing the operation instruction in the memory 51. Disordered weights and input neurons may be quantized to obtain low-bit and normalized central weights and central neurons. Local similarities between the weights and the input neurons can be mined to obtain distribution characteristics of the weights and the input neurons, and low-bit quantization can be performed according to the distribution characteristics to reduce the count of bit representing each weight and input neuron. Therefore, a storage overhead and a memory access overhead of the weights and the input neurons are reduced.

FIG. A6 is a schematic structure diagram of a computation device according to an embodiment of the application. As shown in FIG. A6, the computation device may include an instruction control unit 1 and a lookup table unit 2.

The instruction control unit 1 may be configured to decode a received instruction and generate lookup control information.

The lookup table unit 2 may be configured to look output neurons up in a computational codebook according to the lookup control information generated by the instruction control unit 1 and a received weight dictionary, neuron dictionary, computational codebook, weights, and input neurons. The weight dictionary may include weight positions (for example, positions of the weights in a neural network structure, for example, represented by (p, q), which representing a position in the $p^{th}$ row and the $q^{th}$ column in the weight dictionary) and weight indices. The neuron dictionary may include the input neurons and neuron indices. The computational codebook may include the weight indices, the neuron indices, and computational results of the input neurons and the weights.

A specific working process of the lookup table unit is as follows: determining the corresponding weight position of the weight in the weight dictionary according to the weights, determining the weight indices, determining the neuron indices according to corresponding neuron ranges of the input neurons in the neuron dictionary, determining the weight indices and the neuron indices as column indices and row indices of the computational codebook, looking up numerical values corresponding to the columns and rows (the computational results) in the computational codebook, where the numerical values are the output neurons.

As illustrated in FIG. A2 to FIG. A4, during a lookup operation, if a neuron index of a certain neuron is 01 and a weight index of a certain weight is 10, if computation is performed on the neuron and the weight, a corresponding numerical value 0.046 in the second row and the third column in the multiplication codebook is looked up. The corresponding numerical value is an output neuron. Similarly, addition and pooling operations are similar to a multiplication operation and will not be elaborated herein. It can be understood that pooling may include, but is not limited to, average pooling, maximum pooling, and median pooling.

In one implementation, according to different computational operations, a lookup table may include at least one of a multiplication lookup table, an addition lookup table, and a pooling lookup table.

The multiplication lookup table may be configured to perform a table lookup operation mult_lookup, according to an input weight index in1 input and an neuron index in2, through the multiplication lookup table to complete a multiplication operation over a central weight data1 corresponding to the weight index and a central neuron data2 corresponding to the neuron index, for example, performing a table lookup operation out=mult_lookup(in1,in2) to realize a multiplication function out=data1*data2.

The addition lookup table may be configured to perform a table lookup operation add_lookup through a step-by-step addition lookup table according to an input index in to complete an addition operation over central data data corresponding to the index, where in and data are vectors with lengths of N and N is a positive integer, for example, performing a table lookup operation out=add_lookup(in) to realize an addition function out=data[1]+data[2]+ . . . +data[N]; and/or to perform a table lookup operation on the input weight index in1 and the neuron index in2 through the addition lookup table to complete an addition operation over a central weight data1 corresponding to the weight index and a central neuron data2 corresponding to the neuron index, for example, performing a table lookup operation out=add_lookup(in1,in2) to realize an addition function out=data1+data2.

The pooling lookup table may be configured to perform a pooling operation on the central data data corresponding to the input index, for example, performing a table lookup operation out=pool lookup(in) to complete a pooling operation out=pool(data), the pooling operation including average pooling, maximum pooling, and median pooling.

FIG. A7 is a schematic structure diagram of another computation device according to an embodiment of the application. As shown in FIG. A7, compared with the computation device in FIG. A6, the computation device of the embodiment further may include a preprocessing unit 4, a storage unit 3, a cache unit 6, and a DMA 5. A processing process of the application may be optimized, and data may be processed in a more ordered manner.

The preprocessing unit 4 may be configured to preprocess input information which is externally input to obtain the weights, the input neurons, the instruction, the weight dictionary, the neuron dictionary, and the computational codebook. Preprocessing may include, but is not limited to, segmentation, Gaussian filtering, binarization, regularization, and/or normalization.

The storage unit 3 may be configured to store the input neurons, the weights, the weight dictionary, the neuron dictionary, the computational codebook, and the instruction and to receive the output neurons.

The cache unit 6 may be configured to cache the instruction, the weight indices, the neuron indices, and the output neurons. The cache unit 6 may include an instruction cache 61, a weight cache 62, an input neuron cache 63, an output neuron cache 64, a neuron index cache 65, and a weight index cache 66.

The instruction cache 61 may be configured to cache the instruction and to output the cached instruction to the instruction control unit 1.

The weight cache 62 may be configured to cache the weights and to output the cached weights to the lookup table unit 2.

The input neuron cache 63 may be configured to cache the input neurons and to output the cached input neurons to the lookup table unit 2.

The output neuron cache 64 may be configured to cache the output neurons output by the lookup table unit 2 and to output the cached output neurons to the lookup table unit 2.

The neuron index cache 65 may be configured to determine the corresponding neuron indices according to the input neurons, to cache the neuron indices, and to output the cached neuron indices to the lookup table unit 2.

The weight index cache 66 may be configured to determine the corresponding weight indices according to the weights, to cache the weight indices, and to output the cached weight indices to the lookup table unit 2.

The DMA 5 may be configured to read and write data or instructions between the storage unit 3 and the cache unit 6.

In one implementation, regarding the instruction, the instruction may be a neural network-dedicated instruction, including all instructions dedicated to completion of artificial neural network computations. The neural network-dedicated instruction may include, but is not limited to, a control instruction, a data transfer instruction, a operation instruction, and a logical instruction. The control instruction controls a neural network performing process. The data transfer instruction completes data transfer between different storage media, and a data format may include, but is not limited to, a matrix, a vector, and a scalar. The operation instruction completes arithmetic computation of the neural network, and may include, but is not limited to, a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, a recurrent neural network (RNN) operation instruction, an ReLU neural network operation instruction, a PReLU neural network operation instruction, a sigmoid neural network operation instruction, a tanh neural network operation instruction, and a maxout neural network operation instruction. The logical instruction may be configured to complete logical operation of the neural network, and may include, but is not limited to, a vector logical operation instruction and a scalar logical operation instruction.

The RBM neural network operation instruction may be configured to implement RBM neural network computation.

The LRN neural network operation instruction may be configured to implement LRN neural network computation.

The LSTM neural network operation instruction may be configured to implement LSTM neural network computation.

The RNN operation instruction may be configured to implement RNN computation.

The ReLU neural network operation instruction may be configured to implement ReLU neural network computation.

The PReLU neural network operation instruction may be configured to implement PReLU neural network computation.

The sigmoid neural network operation instruction may be configured to implement sigmoid growth curve (sigmoid) neural network computation.

The tanh neural network operation instruction may be configured to implement hyperbolic tangent function (tanh) neural network computation.

The maxout neural network operation instruction may be configured to implement maxout neural network computation.

Furthermore, the neural network-dedicated instruction may include a Cambricon instruction set. The Cambricon instruction set may include at least one Cambricon instruction, with a length of the Cambricon instruction being 64 bit, including an operation code and an operand. The Cambricon instruction set may include four types of instructions, for example, Cambricon control instructions, Cambricon data transfer instructions, Cambricon operation instructions, and Cambricon logical instructions respectively.

In one implementation, the Cambricon control instruction may be configured to control a performing process including a jump instruction and a conditional branch instruction.

In one implementation, the Cambricon data transfer instruction may be configured to complete data transfer between different storage media including a load instruction, a store instruction, and a move instruction. The load instruction may be configured to load data from a main memory to a cache. The store instruction may be configured to store the data from the cache to the main memory. The move instruction may be configured to move the data between the cache and another cache, the cache and a register, or the register and another register. The data transfer instruction supports three different data organization manners, including the matrix, the vector, and the scalar.

In one implementation, the Cambricon operation instruction may be configured to complete the arithmetic computation of the neural network. The Cambricon operation instruction may include a Cambricon matrix operation instruction, a Cambricon vector operation instruction, and a Cambricon scalar operation instruction.

In one implementation, the Cambricon matrix operation instruction may be configured to complete matrix computation in the neural network, including matrix multiply vector, vector multiply matrix, matrix multiply scalar, outer product, matrix add matrix, and matrix subtract matrix.

In one implementation, the Cambricon vector operation instruction may be configured to complete vector computation in the neural network, including vector basic operations, vector transcendental functions, dot product, random vector generator, and maximum/minimum of a vector. The vector basic operations include vector addition, subtraction, multiplication, and division. The vector transcendental functions refer to those functions which do not meet any polynomial equations taking polynomials as coefficients, and include, but are not limited to, an exponential function, a logarithmic function, a trigonometric function, and an anti-trigonometric function.

In one implementation, the Cambricon scalar operation instruction may be configured to complete scalar computation in the neural network, including scalar basic operations and scalar transcendental functions. The scalar basic operations include scalar addition, subtraction, multiplication, and division. The scalar transcendental functions refer to those functions which do not meet any polynomial equations taking polynomials as coefficients, and include, but are not limited to, an exponential function, a logarithmic function, a trigonometric function, and an anti-trigonometric function.

In one implementation, the Cambricon logical instruction may be configured to complete the logical operation of the neural network. The Cambricon logical instruction may include the Cambricon vector logical operation instruction and the Cambricon scalar logical operation instruction. The Cambricon vector logical operation instruction may be configured to complete vector compare computation, vector logical operations, and vector greater than merge computation. The vector compare computation may include, but is not limited to, greater than, smaller than, equal to, more than or equal to, less than or equal to, and unequal to. The vector logical operations include AND, OR, and NOT.

In one implementation, the Cambricon scalar logical operation instruction may be configured to complete scalar compare computation and scalar logical operations. The scalar compare computation may include, but is not limited to, greater than, smaller than, equal to, more than or equal to, less than or equal to, and unequal to. The scalar logical operations include AND, OR, and NOT.

FIG. A8 is a schematic flowchart of another computation method according to an embodiment of the application. As shown in FIG. A8, the computation method may include the following:

in S81, receiving weights, input neurons, an instruction, a weight dictionary, a neuron dictionary, and a computational codebook, where the weight dictionary may include weight positions and weight indices, the neuron dictionary may include the input neurons and neuron indices, the computational codebook may include the weight indices, the neuron indices, and computational results of the input neurons and the weights;

in S82, decoding the instruction, and determining lookup control information;

in S83, looking up output neurons in the computational codebook according to the lookup control information, the weights, the weight dictionary, the neuron dictionary, and the input neurons.

S83 is similar to the specific working process of the lookup table unit and may include the following:

in S831, according to the weights, the input neurons, the weight dictionary, and the neuron dictionary, determining neuron ranges to determine the neuron indices in the neuron dictionary, and determining the weight positions to determine the weight indices in the weight dictionary;

in S832, looking up the computational results in the computational codebook according to the weight indices and the neuron indices to determine the output neurons.

For optimizing the computation method of the application and ensuring more convenient and ordered processing, an embodiment of the application provides another computation method. FIG. A9 is a schematic flowchart of another computation method according to an embodiment of the application. The computation method may include the following.

In S90, input information which is externally input is preprocessed.

In one implementation, preprocessing the input information which is externally input may include: obtaining weights, input neurons, instruction, weight dictionary, neuron dictionary, and computational codebook corresponding to the input information are obtained. Preprocessing may include segmentation, Gaussian filtering, binarization, regularization, and/or normalization.

In S91, the weights, the input neurons, the instruction, the weight dictionary, the neuron dictionary, and the computational codebook are received.

In S92, the weights, the input neurons, the instruction, the weight dictionary, the neuron dictionary, and the computational codebook are stored.

In S93, the weights, the input neurons, the instruction, the weight indices, and the neuron indices are cached.

In S94, the instruction is decoded, and lookup control information is determined.

In S95, according to the weights, the input neurons, the weight dictionary, and the neuron dictionary, neuron ranges are determined to determine neuron indices in the neuron dictionary, and weight positions are determined to determine weight indices in the weight dictionary.

In S96, computational results are looked up in the computational codebook according to the weight indices and the neuron indices to determine output neurons.

FIG. B1 is a schematic structure diagram of a hierarchical storage device according to an embodiment of the application. As shown in FIG. B1, the device may include an accurate storage unit and an inaccurate storage unit. The accurate storage unit may be configured to store important bits of data. The inaccurate storage unit may be configured to store unimportant bits of the data.

The accurate storage unit adopts an ECC memory. The inaccurate storage unit adopts a non-ECC memory.

Furthermore, the data stored in the hierarchical storage device is a neural network parameter, including an input neuron, a weight, and an output neuron. The accurate storage unit stores important bits of the input neuron, the output neuron, and the weight. The inaccurate storage unit stores unimportant bits of the input neuron, the output neuron, and the weight.

Furthermore, the data stored in the hierarchical storage device may include floating point type data and fixed point type data. Sign bits and bits of an exponent part of the floating point type data are specified as the important bits, and bits of a base part is specified as the unimportant bits. Sign bits and first x bits of numerical part in the fixed point type data are specified as the important bits, and left bits of the numerical part are specified as the unimportant bits, where x is a positive integer more than or equal to zero and smaller than m, and m is the total number of bits of the fixed point type data. The important bits are stored in the ECC memory for accurate storage. The unimportant bits are stored in the non-ECC memory for inaccurate storage.

Furthermore, the ECC memory may include an ECC check DRAM and an ECC check SRAM. The ECC check SRAM adopts a 6T SRAM, and may also adopt a 4T SRAM or a 3T SRAM in another embodiment of the application.

Furthermore, the non-ECC memory may include a non-ECC check DRAM and a non-ECC check SRAM. The non-ECC check SRAM adopts a 6T SRAM, and may also adopt a 4T SRAM or a 3T SRAM in another embodiment of the application.

A unit storing each bit in the 6T SRAM consists of six MOS transistors. A unit storing each bit in the 4T SRAM consists of four MOS transistors. A unit storing each bit in the 3T SRAM consists of three MOS transistors.

An SRAM storing weights of a neural network usually adopts a 6T SRAM. The 6T SRAM is high in stability, but large in occupied area and high in read/write power consumption. A neural network algorithm has a certain fault-tolerant capability, but the 6T SRAM may not use the fault-tolerant capability of the neural network. Therefore, for fully mining the fault-tolerant capability of the neural network in the embodiment, a 4T SRAM or 3T SRAM storage technology is adopted instead of the 6T SRAM, so as to increase a storage density of the SRAM, reduce memory access power consumption of the SRAM, and hide the defect of poor anti-noise capability of the 4T SRAM by use of the fault tolerance of the neural network algorithm.

FIG. B2 is a schematic structure diagram of a storage unit of a 4T SRAM according to an embodiment of the application. As shown in FIG. B2, the storage unit of the 4T SRAM consists of four MOS transistors, for example, M1 (first MOS transistor), M2 (second MOS transistor), M3 (third MOS transistor), and M4 (fourth MOS transistor) respectively. M1 and M2 are configured for gating. M3 and M4 are configured for storage.

A gate of M1 is electrically connected with a word line WL and a source is electrically connected with a bit line BL. A gate of M2 is electrically connected with the WL and a source is electrically connected with another bit line BLB. A gate of M3 is connected with a source of M4 and a drain of M2, and is connected with a working voltage source Vdd through a resistor R2, and a drain of M3 is grounded. A gate of M4 is connected with a source of M3 and a drain of M1, and is connected with the working voltage source Vdd through a resistor R1, and a drain of M4 is grounded. The WL may be configured to control gated access of the storage unit. The BLs are configured to read and write the storage unit. During a read operation, the WL is pulled up and a bit is read from the BL. During a write operation, the WL is pulled up, and the BL is pulled up or pulled down. Since a driving capability of the BL is higher than the storage unit, an original state of the storage unit may be forcibly covered.

FIG. B3 is a schematic structure diagram of a storage unit of a 3T SRAM according to an embodiment of the application. As shown in FIG. B3, the storage unit of the 3T SRAM consists of three MOS transistors, for example, M1 (first MOS transistor), M2 (second MOS transistor), and M3 (third MOS transistor) respectively. M1 may be configured for gating. M2 and M3 are configured for storage.

A gate of M1 is electrically connected with a WL and a source is electrically connected with a BL. A gate of M2 is connected with a source of M3 and is connected with the working voltage source Vdd through the resistor R2, and a drain of M2 is grounded. A gate of M3 is connected with a source of M2 and a drain of M1, and is connected with the working voltage source Vdd through the resistor R1, and a drain of M3 is grounded. The WL may be configured to control gated access of the storage unit. The BL may be configured to read and write the storage unit. During a read operation, the WL is pulled up and a bit is read from the BL. During a write operation, the WL is pulled up, and the BL is pulled up or pulled down. Since the driving capability of the BL is higher than the storage unit, an original state of the storage unit may be forcibly covered.

The storage device of the application adopts an approximation storage technology, which may fully mine the fault-tolerant capability of the neural network. The storage device may perform approximation storage on neural parameters, in other words, the storage device may adopt accurate storage for important bits of the parameters and adopt inaccurate storage for unimportant bits. Therefore, a storage overhead and a memory access energy consumption overhead are reduced.

An embodiment of the application provides a data processing device. The device is an acceleration device corresponding to the approximation storage technology. FIG. B4 is a schematic structure diagram of a data processing device according to an embodiment of the application. The data processing device may include an inaccurate computation unit, an instruction control unit, and the abovementioned hierarchical storage device.

The hierarchical storage device may be configured to receive an instruction and a computational parameter, to store important bits of the computational parameter and the instruction in an accurate storage unit, and to store unimportant bits of the computational parameter in an inaccurate storage unit.

The instruction control unit may be configured to receive the instruction in the hierarchical storage device, to decode the instruction, and to generate control information to control the inaccurate computation unit for a computational operation.

The inaccurate computation unit may be configured to receive the computational parameter in the hierarchical storage device, to perform computation according to the control information, and to transfer a computational result to the hierarchical storage device for storage or output.

Furthermore, the inaccurate computation unit may be a neural network processor. Furthermore, the computational parameter may be a neural network parameter. The hierarchical storage device may be configured to store a neuron, weight, and instruction of a neural network, to store important bits of the neuron, important bits of the weight, and the instruction in the accurate storage unit, and to store unimportant bits of the neuron and unimportant bits of the weight in the inaccurate storage unit. The inaccurate computation unit may be configured to receive the input neuron and weight in the hierarchical storage device, to complete neural network computation according to the control information to obtain an output neuron, and to retransfer the output neuron to the hierarchical storage device for storage or output.

Furthermore, the inaccurate computation unit may adopt two computation modes. (1) The inaccurate computation unit directly receives the important bits of the input neuron and the important bits of the weight from the accurate storage unit of the hierarchical storage device for computation. (2) The inaccurate computation unit receives the important bits and the unimportant bits and splices the complete input neuron and weight for computation. The important bits and unimportant bits of the input neuron and the weight are spliced if being read from the storage unit.

Furthermore, as shown in FIG. B5, the data processing device further may include a preprocessing module configured to preprocess input of original data and to transfer it to the storage device. Preprocessing may include segmentation, Gaussian filtering, binarization, regularization, normalization, and the like.

Furthermore, the data processing device further may include an instruction cache, an input neuron hierarchical cache, a weight hierarchical cache, and an output neuron hierarchical cache. The instruction cache is arranged between the hierarchical storage device and the instruction control unit, configured to store a dedicated instruction. The input neuron hierarchical cache is arranged between the storage device and the inaccurate computation unit, configured to cache the input neuron. The input neuron hierarchical cache may include an accurate input neuron cache and an inaccurate input neuron cache which cache the important bits and unimportant bits of the input neuron respectively. The weight hierarchical cache is arranged between the storage device and the inaccurate computation unit, configured to cache weight data. The weight hierarchical cache may include an accurate weight cache and an inaccurate weight cache which cache the important bits and unimportant bits of the cache respectively. The output neuron hierarchical cache is arranged between the storage device and the inaccurate computation unit, configured to cache the output neuron. The output neuron hierarchical cache may include an accurate output neuron cache and an inaccurate output neuron cache which cache important bits and unimportant bits of the output neuron respectively.

Furthermore, the data processing device further may include a DMA configured to read and write data or instructions from/into the storage device, the instruction cache, the weight hierarchical cache, the input neuron hierarchical cache, and the output neuron hierarchical cache.

Furthermore, the instruction cache, the input neuron hierarchical cache, the weight hierarchical cache, and the output neuron hierarchical cache all adopt 4T SRAMs or 3T SRAMs.

Furthermore, the inaccurate computation unit may include, but is not limited to, three parts. A first part may be a multiplier, a second part may be an adder tree, and a third part may be an active function unit. The first part multiplies input data 1 (in1) and input data 2 (in2) to obtain a multiplied output (out), and a process is illustrated by out=in1×in2. The second part adds the input data in1 step by step through the adder tree to obtain the output data (out), in which in1 may be a vector with a length N and N may be larger than 1, and a process is illustrated by out=in1[1]+in1[2]+ . . . +in1[N]. Or, the input data (in1) is accumulated through the adder tree and then is added with the input data (in2) to obtain the output data (out), and a process is illustrated by out=in1[1]+in1[2]+ . . . +in1[N]+in2. Or, the input data (in1) and the input data (in2) are added to obtain the output data (out), and a process is illustrated by out=in1+in2. The third part performs computation on the input data (in) through an active function to obtain active output data (out), a process is illustrated by out=active(in), where the active function may be sigmoid, tanh, relu, softmax, and the like. Besides an activation operation, the third part may perform computation (f) on the input data (in) through another nonlinear function to obtain the output data (out), and a process is illustrated by out=f(in).

The inaccurate computation unit may further include a pooling unit. The pooling unit may be configured to perform pooling computation on the input data (in) to obtain output data (out), and a process is illustrated by out=pool(in), where pool is the pooling computation. The pooling computation may include, but is not limited to, average pooling, maximum pooling, and median pooling. The input data in is data in a pooling core related to output out.

The computation performed by the inaccurate computation unit may include a few parts. The first part multiplies the input data 1 and the input data 2 to obtain multiplied data. The second part performs the adder tree computation, and may be configured to add the input data 1 through the adder tree step by step, or to add the input data 1 which is added through the adder tree step by step and the input data 2 to obtain output data. The third part performs the active function computation on the input data through the active function to obtain the output data. The computation of the abovementioned parts may be freely combined, so that computation of various functions can be implemented.

The data processing device of the application may fully use the approximation storage technology, fully mine a fault-tolerant capability of a neural network, and reduce a computation amount of the neural network and memory access of the neural network, thereby reducing computation energy consumption and memory access energy consumption. A dedicated single instruction multiple data (SIMD) instruction for a multilayer artificial neural network computation and a customized computation unit are adopted, so that the problems of poor computational performance of a CPU and a GPU and high front-end decoding overhead are solved, and support to a multilayer artificial neural network computation algorithm is effectively improved. A dedicated inaccurate storage on-chip cache for the multilayer artificial neural network computation algorithm is adopted, so that importance of input neurons and weight data is fully mined, repeated reading of these data from the memory is avoided, a memory access bandwidth is reduced, and performance bottleneck problems brought by a memory bandwidth to the multilayer artificial neural network computation and a training algorithm of the multilayer artificial neural network computation are solved.

The above is only exemplary description and not intended to limit the application. The data processing device may include a non-neural network processor, for example, a universal arithmetic processor. A corresponding universal operation instruction and data are involved in a universal computation, for example, scalar arithmetic computation and scalar logical operation. The universal arithmetic processor may include, but is not limited to, for example, one or more multipliers and one or more adders and performs basic operations such as addition and multiplication.

Another embodiment of the application provides a data storage method. An approximation storage manner is adopted for hierarchical storage of data. FIG. B6 is a flowchart of a data storage method according to an embodiment of the application. The method may include the following:

in S601, accurately storing important bits of the data;

in S602, inaccurately storing unimportant bits of the data.

In one implementation, the data storage method may include the following:

extracting the important bits and unimportant bits of the data;

accurately storing the important bits of the data are in an ECC memory;

inaccurately storing the unimportant bits of the data in a non-ECC memory.

In the embodiment, the stored data is a neural network parameter. Bits representing the neural network parameter are divided into important bits and unimportant bits. For example, a parameter of a neural network may include totally m bits, where n of the m bits are important bits and (m-n) of the m bits are unimportant bits, in which m may be an integer larger than zero and n may be an integer larger than zero and less than or equal to m.

The neural network parameter may include an input neuron, a weight, and an output neuron. Important bits of the input neuron, important bits of the output neuron, and important bits of the weight are accurately stored. Unimportant bits of the input neuron, unimportant bits of the output neuron, and unimportant bits of the weight are inaccurately stored.

The data may include floating point type data and fixed point type data. Sign bits and bits of an exponent part in the floating point type data are determined as the important bits and bits of a base part are determined as the unimportant bits. Sign bits and first x bits of numerical part in the fixed point type data are determined as the important bits and left bits of the numerical part are determined as the unimportant bits, in which x may be a positive integer more than or equal to zero and smaller than m and m may be the total number of bits of the parameter.

The ECC memory may include an ECC check SRAM and an ECC check DRAM. The non-ECC memory may include a non-ECC check SRAM and a non-ECC check DRAM. The ECC check SRAM and the non-ECC check SRAM adopt 6T SRAMs, and may also adopt 4T SRAMs or 3T SRAMs in another embodiment of the application.

Another embodiment of the application provides a data processing method. FIG. B7 is a flowchart of a data processing method according to an embodiment of the application. As shown in FIG. B7, the method may include the following:

in S1, receiving an instruction and a computational parameter, accurately storing important bits of the computational parameter and the instruction, inaccurately storing and unimportant bits of the computational parameter;

in S2, receiving the instruction, decoding the instruction, and generating control information;

in S3, receiving the parameter, performing computation according to the control information, and storing a computational result.

The computation is neural network computation. The parameter is a neural network parameter including an input neuron, a weight, and an output neuron.

S3 further may include: receiving the input neuron and the weight, completing the neural network computation according to the control information to obtain the output neuron, and storing or outputting the output neuron.

Furthermore, receiving the input neuron and the weight and completing the neural network computation according to the control information to obtain the output neuron may include: receiving important bits of the input neuron and important bits of the weight for computation; or receiving the important bits and the unimportant bits of the input neuron, as well as the important bits and unimportant bits of the weight, and splicing the complete input neuron and weight for computation.

Furthermore, the method may further include the following: caching a dedicated instruction; accurately caching and inaccurately caching the input neuron; accurately caching and inaccurately caching weight data; and accurately caching and inaccurately caching the output neuron.

Furthermore, before S1, the method may further include: preprocessing the parameter.

Another embodiment of the application provides a storage unit. The storage unit may be configured as a 4T SRAM or a 3T SRAM, to store a neural network parameter. A specific structure of the 4T SRAM refers to the structure shown in FIG. B2. A specific structure of the 3T SRAM refers to the structure shown in FIG. B3. No more descriptions will be made herein.

FIG. C1 is a schematic structure diagram of a DVFS device 100 according to an embodiment of the application. As shown in FIG. C1, the DVFS device 100 may include an information acquisition unit 101 and a voltage frequency scaling unit 102.

The information acquisition unit 101 may be configured to acquire working state information or application scenario information of a chip connected with the DVFS device in real time, in which the application scenario information may be information obtained by the chip through neural network computation or acquired by a sensor connected with the chip.

The voltage frequency scaling unit 102 may be configured to send voltage frequency scaling information to the chip according to the working state information or application scenario information of the chip, in which the voltage frequency scaling information may be configured to instruct the chip to scale its working voltage or working frequency.

An embodiment of the application, the working state information of the chip may include an operating speed of the chip, and the voltage frequency scaling information may include first voltage frequency scaling information. The voltage frequency scaling unit 102 may be configured to:

if the operating speed of the chip is greater than a target speed, send the first voltage frequency scaling information to the chip, in which the first voltage frequency scaling information may be configured to instruct the chip to decrease its working frequency or working voltage and the target speed may be an operating speed of the chip if a user requirement is met.

In one implementation, the information acquisition unit 101 may be configured to acquire the operating speed of the chip connected thereto in real time. The operating speed of the chip may be different types of speeds according to different tasks performed by the chip. If an operation performed by the chip is video image processing, the operating speed of the chip may be a frame rate for video image processing of the chip. If the operation performed by the chip is voice recognition, the operating speed of the chip is a speed for voice recognition of the chip. In response to determining that the operating speed of the chip is greater than the target speed, in other words, the operating speed of the chip reaches the operating speed of the chip if the user requirement is met, the voltage frequency scaling unit 102 sends the first voltage frequency scaling information to the chip to instruct the chip to decrease its working voltage or working frequency to reduce power consumption of the chip.

For example, assume that the operation performed by the chip is video image processing and the target speed is 24 frames/second. The information acquisition unit acquires the frame rate for video image processing of the chip in real time. A present frame rate for video image processing of the chip is 54 frames/seconds. In response to determining that the present frame rate for video image processing of the chip is higher than the target speed, the voltage frequency scaling unit sends the first voltage frequency scaling information to the chip to instruct the chip to decrease its working voltage or working frequency to reduce the power consumption of the chip.

An embodiment of the application, the chip may include at least a first unit and a second unit. Output data of the first unit is input data of the second unit. The working state information of the chip may include an operating speed of the first unit and an operating speed of the second unit. The voltage frequency scaling information may include second voltage frequency scaling information. The voltage frequency scaling unit 102 is further configured to:

in response to determining, according to the operating speed of the first unit and the operating speed of the second unit, that a running time of the first unit exceeds a running time of the second unit, send the second voltage frequency scaling information to the second unit, in which the second voltage frequency scaling information may be configured to instruct the second unit to decrease its working frequency or working voltage.

In one implementation, the abovementioned task performing of the chip requires cooperation of the first unit and the second unit. The output data of the first unit is the input data of the second unit. The information acquisition unit 101 acquires the operating speeds of the first unit and the second unit in real time. In response to determining that the operating speed of the first unit is lower than the operating speed of the second unit, in other words, the running time of the first unit exceeds the running time of the second unit, the voltage frequency scaling unit 102 sends the second voltage frequency scaling information to the second unit to instruct the second unit to decrease its working voltage or working frequency to reduce the overall power consumption of the chip on the premise of no influence on the overall operating speed of the chip.

An embodiment of the application, the voltage frequency scaling information may include third voltage frequency scaling information, and the voltage frequency scaling unit 102 is further configured to:

in response to determining, according to the operating speed of the first unit and the operating speed of the second unit, that the running time of the second unit exceeds the running time of the first unit, send the third voltage frequency scaling information to the first unit, in which the third voltage frequency scaling information may be configured to instruct the first unit to decrease its working frequency or working voltage.

An embodiment of the application, the chip may include at least N units, the working state information of the chip may include working state information of at least S units in the at least N units, in which N may be an integer larger than one and S may be an integer less than or equal to N, and the voltage frequency scaling information may include fourth voltage frequency scaling information. The voltage frequency scaling unit 102 may be configured to:

in response to determining, according to the working state information of a unit A, that the unit A is in an idle state, send the fourth voltage frequency scaling information to the unit A, in which the fourth voltage frequency scaling information may be configured to instruct the unit A to decrease its working frequency or working voltage.

The unit A is any one of the at least S units.

An embodiment of the application, the voltage frequency scaling information may include fifth voltage frequency scaling information, and the voltage frequency scaling unit 102 is further configured to:

in response to determining, according to the working state information of the unit A, that the unit A returns to a working state, send the fifth voltage frequency scaling information to the unit A, in which the fifth voltage frequency scaling information may be configured to instruct the unit A to increase its working voltage or working frequency.

In one implementation, in a working process of the chip, the information acquisition unit 101 acquires the working state information of the at least S units in the chip in real time. In response to determining, according to the working state information of the unit A, that the unit A is in the idle state, the voltage frequency scaling unit 102 sends the fourth voltage frequency scaling information to the unit A to instruct the unit A to decrease its working frequency or working voltage to reduce power consumption of the unit A. In response to determining, according to the working state information of the unit A, that the unit A returns to the working state, the voltage frequency scaling unit 102 sends the fifth voltage frequency scaling information to the unit A to instruct the unit A to increase its working frequency or working voltage, so as to enable an operating speed of the unit A to meet a working requirement.

An embodiment of the application, an application scenario of the chip may be image recognition. The application scenario information may include the count of objects in an image to be recognized, the voltage frequency scaling information may include sixth voltage frequency scaling information, and the voltage frequency scaling unit 102 is further configured to:

in response to determining that the count of the objects in the image to be recognized is smaller than a first threshold value, send the sixth voltage frequency scaling information to the chip, in which the sixth voltage frequency scaling information may be configured to instruct the chip to decrease its working voltage or working frequency.

In one implementation, the chip is applied to image recognition. The count of the objects in the image to be recognized is obtained by the chip through a neural network algorithm. After the information acquisition unit 101 acquires the count of the objects in the image to be recognized (for example, the application scenario information) from the chip, in response to determining, by the voltage frequency scaling unit 102, that the count of the objects in the image to be recognized is smaller than the first threshold value, the voltage frequency scaling unit 102 sends the sixth voltage frequency scaling information to the chip to instruct the chip to decrease its working voltage or working frequency. In response to determining that the count of the objects in the image to be recognized is larger than the first threshold value, the voltage frequency scaling unit 102 sends the voltage frequency scaling information configured to instruct the chip to increase its working voltage or working frequency to the chip.

An embodiment of the application, the application scenario information may be object tag information. The voltage frequency scaling information may include seventh voltage frequency scaling information, and the voltage frequency scaling unit 102 is further configured to:

in response to determining that the object tag information belongs to a preset object tag set, send the seventh voltage frequency scaling information to the chip, in which the seventh voltage frequency scaling information may be configured to instruct the chip to increase its working voltage or working frequency.

For example, the preset object tag set may include multiple object tags. The object tag may be "human", "dog", "tree", and "flower". If the chip determines, through the neural network algorithm, that a present application scenario may include a dog, the chip transfers object tag information including the "dog" to the information acquisition unit 101; the voltage frequency scaling unit 102, in response to determining that the object tag information may include the "dog", sends the seventh voltage frequency scaling information to the chip to instruct the chip to increase its working voltage or working frequency. In response to determining that the object tag information does not belong to the preset object tag set, the voltage frequency scaling unit 102 sends voltage frequency scaling information configured to instruct the chip to decrease its working voltage or working frequency to the chip.

An embodiment of the application, the chip is applied to voice recognition. The application scenario information may be a voice input rate, the voltage frequency scaling information may include eighth voltage frequency scaling information, and the voltage frequency scaling unit is further configured to:

if the voice input rate is lower than a second threshold value, send the eighth voltage frequency scaling information to the chip, in which the eighth voltage frequency scaling information may be configured to instruct the chip to decrease its working voltage or working frequency.

In one implementation, the application scenario of the chip is voice recognition and an input unit of the chip inputs a voice to the chip at a certain rate. The information acquisition unit 101 acquires the voice input rate in real time and transfers voice input rate information to the voltage frequency scaling unit 102. In response to determining that the voice input rate is lower than the second threshold value, the voltage frequency scaling unit 102 sends the eighth voltage frequency scaling information to the chip to instruct the chip to decrease its working voltage or working frequency. In response to determining that the voice input rate is higher than the second threshold value, the voltage frequency scaling unit 102 sends the voltage frequency scaling information configured to instruct the chip to increase its working voltage or working frequency to the chip.

An embodiment of the application, the application scenario information may be a keyword obtained by voice recognition performed by the chip, the voltage frequency scaling information may include ninth voltage frequency scaling information, and the voltage frequency scaling unit is further configured to:

if the keyword belongs to a preset keyword set, send the ninth voltage frequency scaling information to the chip, in which the ninth voltage frequency scaling information may be configured to instruct the chip to increase its working voltage or working frequency.

Furthermore, if the keyword does not belong to the keyword set, the voltage frequency scaling unit 102 sends voltage frequency scaling information configured to instruct the chip to decrease its working voltage or working frequency to the chip.

For example, the application scenario of the chip is voice recognition. The preset keyword set may include keywords such as "image retouching", "neural network algorithm", "image processing", "Alipay", and the like. If the application scenario information is "image retouching", the voltage frequency scaling unit 102 sends the ninth voltage frequency scaling information to instruct the chip to increase its working voltage or working frequency. If the application scenario information is "photographing", the voltage frequency scaling unit 102 sends voltage frequency scaling information configured to indicate the chip to decrease its working voltage or working frequency to the chip.

An embodiment of the application, the chip is applied to machine translation, the application scenario information may include a character input speed or the count of characters in an image to be translated, the voltage frequency scaling information may include tenth voltage frequency scaling information, and the voltage frequency scaling unit is further configured to:

if the character input speed is lower than a third threshold value or the count of the characters in the image to be translated is smaller than a fourth threshold value, send the tenth voltage frequency scaling information to the chip, in which the tenth voltage frequency scaling information may be configured to instruct the chip to decrease its working voltage or working frequency.

In one implementation, the chip is applied to machine translation. The application scenario information acquired by the information acquisition unit 101 is the character input speed or the count of the characters in the image to be translated, and the application scenario information is transferred to the voltage frequency scaling unit 102. In response to determining that the character input speed is lower than the third threshold value or the count of the characters in the image to be translated is smaller than the fourth threshold value, the voltage frequency scaling unit 102 sends the tenth voltage frequency scaling information to the chip to instruct the chip to decrease its working voltage. In response to determining that the character input speed is greater than the third threshold value or the count of the characters in the image to be translated is larger than the fourth threshold value, the voltage frequency scaling unit 102 sends voltage frequency scaling information configured to instruct the chip to increase its working voltage to the chip.

An embodiment of the application, the application scenario information is an external light intensity, the voltage frequency scaling information may include eleventh voltage frequency scaling information, and the voltage frequency scaling unit is further configured to:

if the external light intensity is lower than a fifth threshold value, send the eleventh voltage frequency scaling information to the chip, in which the eleventh voltage frequency scaling information may be configured to instruct the chip to decrease its working voltage or working frequency.

In one implementation, the external light intensity is acquired by a light sensor connected with the chip. After acquiring the light intensity, the information acquisition unit 101 transfers the light intensity to the voltage frequency scaling unit 102. In response to determining that the light intensity is lower than the fifth threshold value, the voltage frequency scaling unit 102 sends the eleventh voltage frequency scaling information to the chip to instruct the chip to decrease its working voltage. In response to determining that the light intensity is higher than the fifth threshold value, the voltage frequency scaling unit 102 sends the voltage frequency scaling information configured to instruct the chip to increase its working voltage or working frequency to the chip.

An embodiment of the application, the chip is applied to image retouching, the voltage frequency scaling information may include twelfth voltage frequency scaling information and thirteenth voltage frequency scaling information, and the voltage frequency scaling unit is further configured to:

if the application scenario information is a face image, send the twelfth voltage frequency scaling information to the chip, in which the twelfth voltage frequency scaling information may be configured to instruct the chip to increase its working voltage or working frequency, and if the application scenario information is not a face image, send the thirteenth voltage frequency scaling information to the chip, in which the thirteenth voltage frequency scaling information may be configured to instruct the chip to decrease its working voltage or working frequency.

An embodiment of the application, the chip is applied to voice recognition and the application scenario information is a voice intensity. If the voice intensity is higher than a sixth threshold value, the voltage frequency scaling unit 102 sends voltage frequency scaling information configured to instruct the chip to decrease its working voltage or working frequency to the chip. If the voice intensity is lower than the sixth threshold value, the voltage frequency scaling unit 102 sends voltage frequency scaling information configured to instruct the chip to increase its working voltage or working frequency to the chip.

It is to be noted that the scenario information may be external scenario information, for example, the light intensity and the voice intensity, acquired by a sensor. The application scenario information may also be information computed according to an artificial intelligence algorithm. For example, in an object recognition task, real-time computation result information of the chip is fed back to the information acquisition unit. The information may include information such as the count of objects, a face image, and an object tag keyword in a scenario.

In one implementation, the artificial intelligence algorithm may include, but is not limited to, a neural network algorithm.

It can be seen that, according to the embodiments of the application, the DVFS device acquires the working state information of the chip connected thereto and each unit in the chip or the application scenario information of the chip in real time, and scales the working frequency or working voltage of the chip or each unit therein according to the working state information of the chip and each unit therein or the application scenario information of the chip, so as to reduce the overall running power consumption of the chip.

FIG. C2 is a schematic diagram of a DVFS application scenario according to an embodiment of the application. As shown in FIG. C2, a convolutional operation device may include a DVFS device 210 and a chip 220 connected with the DVFS device.

The chip 220 may include a control unit 221, a storage unit 222, and a computation unit 223. The chip 220 may be configured for tasks of image processing, voice processing, and the like.

The DVFS device 210 acquires working state information of the chip 220 in real time. The working state information of the chip 220 may include an operating speed of the chip 220, an operating speed of the control unit 221, an operating speed of the storage unit 222, and an operating speed of the computation unit 223.

An embodiment of the application, if the chip 220 performs a task, if the DVFS device 210 determines, according to the operating speed of the storage unit 222 and the operating speed of the computation unit 223, that a running time of the storage unit 222 exceeds a running time of the computation unit 223, the DVFS device 210 may determine that the storage unit 222 becomes a bottleneck in this task performing process. After the computation unit 223 completes performing a present computational operation, the computation unit 223 may perform a computational operation according to data transferred by the storage unit 222 this time only after the storage unit 222 completes performing a reading task and transfers the read data to the computation unit 223. The DVFS device 210 sends first voltage frequency scaling information to the computation unit 223, in which the first voltage frequency scaling information may be configured to instruct the computation unit 223 to decrease its working voltage or working frequency, so as to reduce the operating speed of the computation unit 223, thereby reducing overall running power consumption of the chip 220 under the condition of no influence on a completion time of the task.

An embodiment of the application, if the chip 220 performs a task, if the DVFS device 210 determines, according to the operating speed of the storage unit 222 and the operating speed of the computation unit 223, that the running time of the storage unit 222 is shorter than the running time of the computation unit 223, the DVFS device 210 may determine that the computation unit 223 becomes a bottleneck in this task performing process. If the computation unit 223 has yet not completed a present computational operation after the storage unit 222 completes reading data, the storage unit 222 may transfer the read data to the computation unit 223 only after the computation unit 223 completes the present computational operation. The DVFS device 210 sends second voltage frequency scaling information to the storage unit 222, in which the second voltage frequency scaling information may be configured to instruct the storage unit 222 to decrease its working voltage or working frequency, so as to reduce the operating speed of the storage unit 222, thereby reducing the overall running power consumption of the chip 220 under the condition of no influence on a completion time of the task.

An embodiment of the application, the DVFS device 210 acquires the operating speed of the chip 220 in real time. In response to determining, by the DVFS device 210, that the operating speed of the chip 220 is greater than a target operating speed, the target operating speed being an operating speed capable of meeting a user requirement, the DVFS device 210 sends third voltage frequency scaling information to the chip 220, in which the third voltage frequency scaling information may be configured to instruct the chip 220 to decrease its working voltage or working frequency so as to reduce the running power consumption of the chip 220.

In one implementation, the chip 220 may be applied to video processing. For example, a user requires that a frame rate for video processing is not lower than 30 frames/second under a normal condition. Assuming that a practical frame rate for video processing of the chip 220 is 100 frames/second in such case, the DVFS device sends voltage frequency scaling information to the chip 220, in which the voltage frequency scaling information may be configured to instruct the chip 220 to decrease its working voltage or working frequency so as to decrease the frame rate for video processing to be about 30 frames/second.

An embodiment of the application, the DVFS device 210 monitors a working state of each of units (including the control unit 221, the storage unit 222, and the computation unit 223) in the chip 220 in real time. In response to determining that any of the units is in an idle state, the DVFS device 220 sends fourth voltage frequency scaling information to the unit, in which the fourth voltage frequency scaling information may be configured to indicate a working voltage or working frequency of the unit to be decreased, thereby reducing the power consumption of the chip 220. If the unit returns to a working state, the DVFS device 210 sends fifth voltage frequency scaling information to the unit to increase the working voltage or working frequency of the unit, so as to enable the operating speed of the unit to meet a working requirement. It can be seen that, according to embodiments of the application, the DVFS device 210 acquires operating speed information of the chip and each unit therein in real time, and decreases the working frequency or working voltage of the chip or each unit therein according to the operating speed information, so as to reduce the overall running power consumption of the chip.

FIG. C3 is a schematic diagram of another DVFS application scenario according to an embodiment of the application. As shown in FIG. C3, a convolutional operation device may include a DVFS device 317, a register unit 312, an interconnection module 313, a computation unit 314, a control unit 315, and a data access unit 316.

The computation unit 314 may include at least two of calculators including an addition calculator, a multiplication calculator, a comparator, and an activation calculator.

The interconnection module 313 may be configured to control a connection relationship of the calculators in the computation unit 314 to enable the at least two calculators to form different computation topological structures.

The register unit 312 (which may be a register unit, an instruction cache, and a scratch pad memory) may be configured to store a operation instruction, an address of a data block in the storage medium, and the computation topological structure corresponding to the operation instruction.

In one implementation, the convolutional operation device further may include a storage medium 311.

The storage medium 311 may be an off-chip memory, of course, may also be an on-chip memory during a practical application, and may be configured to store the data block. The data block may be n-dimensional data, in which n may be an integer more than or equal to one. For example, the data block is one-dimensional data, for example, a vector, if n=1; the data block is two-dimensional data, for example, a matrix, if n=2; and the data block is multidimensional data if n≥3.

The control unit 315 may be configured to extract the operation instruction, an operation field corresponding to the operation instruction, and a first computation topological structure corresponding to the operation instruction from the register unit 312, to decode the operation instruction into an performing instruction, in which the performing instruction may be configured to control the computation unit 314 to perform a computational operation, to transfer the operation field to the data access unit 316, and to transfer the computation topological structure to the interconnection module 313.

The data access unit 316 may be configured to extract the data block corresponding to the operation field from the storage medium 311 and to transfer the data block to the interconnection module 313.

The interconnection module 313 may be configured to receive the data block of the first computation topological structure.

An embodiment of the application, the interconnection module 313 is further configured to replace the data block according to the first computation topological structure.

The computation unit 314 may be configured to call the calculator of the computation unit 314 to perform the computational operation on the data block to obtain a computational result according to the performing instruction, to transfer the computational result to the data access unit 316, and to store it in the storage medium 312.

An embodiment of the application, the computation unit 314 may be further configured to call the calculator to perform a computational operation on the replaced data block to obtain a computational result according to the first computation topological structure and the performing instruction, to transfer the computational result to the data access unit 316, and to store it in the storage medium 312.

An embodiment, the interconnection module 313 may be further configured to control the connection relationship of the calculators in the computation unit 314 to form the first computation topological structure.

The DVFS device 317 may be configured to monitor a working state of the whole convolutional operation device and to dynamically scale a voltage and a frequency of the whole convolutional operation device.

A computation method for the convolutional operation device will be described with different operation instructions below according to an implementation of the application. The operation instruction is, for example, a convolutional operation instruction. The convolutional operation instruction may be applied to a neural network. Thus, the convolutional operation instruction may also be called a convolutional neural network instruction. For the convolutional operation instruction, a formula practically required to be performed may be:

$$s=s(\Sigma wx_i+b)$$

The formula represents that a convolutional kernel W (which may include multiple pieces of data) is multiplied by input data $\chi_i$, and a sum is computed. Then, an offset b may be added. Then, activation computation s(h) may further be performed to obtain a final output result S. The following computation topological structure may be obtained according to the formula: multiplication calculator-addition calculator-(optionally) activation calculator. The convolutional operation instruction may be included in an instruction set. The instruction set may include convolutional neural network COMPUTE instructions with different functions, a CONFIG instruction, an IO instruction, a NOOperation (NOP) instruction, a jump instruction, and a MOVE instruction.

In an embodiment, the COMPUTE instructions include the following instructions.

A convolutional operation instruction: according to the instruction, the convolutional operation device extracts, from specified addresses of the memory (which may be a scratch pad memory or a scalar register file), input data with a specified size and a convolutional kernel respectively, and performs a convolutional operation in a convolutional operation component.

A convolutional neural network sigmoid instruction: according to the instruction, the convolutional operation device extracts, from specified addresses of the memory (which may be a scratch pad memory or a scalar register file), input data with a specified size and a convolutional kernel respectively, performs a convolutional operation in a convolutional operation component, and performs sigmoid activation on an output result.

A convolutional neural network tanh instruction: according to the instruction, the convolutional operation device extracts, from specified addresses of the memory (which may be a scratch pad memory), input data with a specified size and a convolutional kernel respectively, performs a convolutional operation in a convolutional operation component, and performs tanh activation on an output result.

A convolutional neural network ReLU instruction: according to the instruction, the convolutional operation device extracts, from specified addresses of the memory (which may be a scratch pad memory), input data with a specified size and a convolutional kernel respectively, performs a convolutional operation in a convolutional operation component, and performs ReLU activation on an output result.

A convolutional neural network group instruction: according to the instruction, the convolutional operation device extracts, from specified addresses of the memory (which may be a scratch pad memory), input data with a specified size and a convolutional kernel respectively, performs a convolutional operation in a convolutional operation component after grouping, and activates an output result.

The CONFIG instruction may be configured to configure various constants required by computation of a present layer before computation of each layer of an artificial neural network is started.

The IO instruction may be configured to read in input data required by computation from an external storage space and to store the data back into the external space after computation is completed.

The NOP instruction may be configured to clear present control signals in all control signal cache queues in the convolutional operation device to ensure that all instructions before the NOP instruction are performed. The NOP instruction does not include any operation.

The jump instruction may be configured to control jump of an address of a next instruction to be read by the instruction storage unit so as to implement jump of a control flow.

The move instruction may be configured to move data at a certain address of an internal address space of the convolutional operation device to another address of the internal address space of the convolutional operation device. The process is independent from the computation unit, with no resource of the computation unit occupied during performing.

A method by which the convolutional operation device performs the convolutional operation instruction may be as follows.

The control unit 315 extracts the convolutional operation instruction, an operation field corresponding to the convolutional operation instruction, and a first computation topological structure corresponding to the convolutional operation instruction (multiplication calculator-addition calculator-addition calculator-activation calculator) from the register unit 312. The control unit transfers the operation field to the data access unit 316 and transfers the first computation topological structure to the interconnection module 313.

The data access unit 316 extracts a convolutional kernel w, which corresponds to the operation field, and the offset b (if b is equal to zero, the offset b is not required to be extracted) from the storage medium 311, and transfers the convolutional kernel w and the offset b to the computation unit 314.

The multiplication calculator of the computation unit 314 performs a multiplication computation on the convolutional kernel w and input data Xi to obtain a first result, inputs the first result to the addition calculator, and performs addition computation to obtain a second result. The multiplication calculator performs addition computation on the second result and the offset b to obtain a third result, transfers the third result to the activation calculator, and performs activation computation to obtain an output result S. The output result S is transferred to the data access unit 316 for storage in the storage medium. In one implementation, after each operation, an output result of each operation may directly be transferred to the data access unit 316 for storage in the storage medium without waiting for performing of the next operations. In addition, the operation that the multiplication calculator performs addition computation on the second result and the offset b to obtain a third result is optional, in other words, if b is equal to zero, the operation is not required. Moreover, a sequence of the addition computation and the multiplication computation may be exchanged.

In one implementation, the first result may include multiple multiplication computational results.

An embodiment of the application, an embodiment of the application provides a neural network processor, which may include the abovementioned convolutional operation device.

The neural network processor may be configured to perform artificial neural network computation so as to implement artificial intelligence applications of voice recognition, image recognition, translation, and the like.

In a convolutional operation task, a working process of the DVFS device 317 is as follows.

A first condition: in a convolutional operation performing process of the neural network processor, the DVFS device 317 acquires operating speeds of the data access unit 316 and computation unit 314 of the neural network processor in real time. If the DVFS device 317 determines, according to the operating speeds of the data access unit 316 and the computation unit 314, that a running time of the data access unit 316 exceeds a running time of the computation unit 314, the DVFS device 317 may determine that the data access unit 316 becomes a bottleneck in the convolutional operation process. After the computation unit 314 completes performing a present convolutional operational operation, the computation unit 314 may perform a convolutional operational operation according to data transferred by the data access unit 316 this time only after the data access unit 316 completes performing a reading task and transfers the read data to the computation unit 314. The DVFS device 317 sends first voltage frequency scaling information to the computation unit 314, in which the first voltage frequency scaling information may be configured to instruct the computation unit 314 to decrease its working voltage or working frequency, so as to reduce the operating speed of the computation unit 314 and make the operating speed of the computation unit 314 matched with the operating speed of the data access unit 316, which may reduce power consumption of the computation unit 314, avoid occurrence of the condition that the computation unit 314 is idle, and finally reduce overall running power consumption of the neural network processor under the condition of no influence on a completion time of the task.

A second condition: in the convolutional operation performing process of the neural network processor, the DVFS device 317 acquires operating speeds of the data access unit 316 and computation unit 314 of the neural network processor in real time. If the DVFS device 317 determines, according to the operating speeds of the data access unit 316 and the computation unit 314, that the running time of the computation unit 314 exceeds the running time of the data access unit 316, the DVFS device 317 may determine that the computation unit 314 becomes a bottleneck in the convolutional operation process. After the data access unit 316 completes performing a present data reading operation, the data access unit 316 may transfer read data to the computation unit 314 only after the computation unit 314 performs a present convolutional operational operation. The DVFS device 317 sends second voltage frequency scaling information to the data access unit 316, in which the second voltage frequency scaling information may be configured to instruct the data access unit 316 to decrease its working voltage or working frequency, so as to reduce the operating speed of the data access unit 316 and make the operating speed of the data access unit 316 matched with the operating speed of the computation unit 314, which may reduce power consumption of the data access unit 316, avoid occurrence of the condition that the data access unit 316 is idle, and finally reduce the overall running power consumption of the neural network processor under the condition of no influence on the completion time of the task.

If the neural network processor performs artificial neural network computation for an artificial intelligence application, the DVFS device 317 acquires a working parameter for the artificial intelligence application of the neural network processor in real time and scales a working voltage or working frequency of the neural network processor according to the working parameter.

In one implementation, the artificial intelligence application may be video image processing, object recognition, machine translation, voice recognition, image retouching, and the like.

A third condition: if the neural network processor performs video image processing, the DVFS device 317 acquires a frame rate for video image processing of the neural network processor in real time. If the frame rate for video image processing exceeds a target frame rate, the target frame rate being a video image processing frame rate normally required by a user, the DVFS device 317 sends third voltage frequency scaling information to the neural network processor, in which the third voltage frequency scaling information may be configured to instruct the neural network processor to decrease its working voltage or working frequency, so as to meet a normal video image processing requirement of the user and simultaneously reduce the power consumption of the neural network processor.

A fourth condition: if the neural network processor performs voice recognition, the DVFS device 317 acquires a voice recognition speed of the neural network processor in real time. If the voice recognition speed of the neural network processor exceeds a practical voice recognition speed of the user, the DVFS device 317 sends fourth voltage frequency scaling information to the neural network processor, in which the fourth voltage frequency scaling information may be configured to instruct the neural network processor to decrease its working voltage or working frequency, so as to meet a normal voice recognition requirement of the user and simultaneously reduce the power consumption of the neural network processor.

A fifth condition: the DVFS device 317 monitors a working state of each unit or module (including the storage medium 311, the register unit 312, the interconnection module 313, the computation unit 314, the control unit 315, and the data access unit 316) in the neural network processor in real time. If any unit or module of the neural network processor is in an idle state, the DVFS device 317 sends fifth voltage frequency scaling information to the unit or module to decrease a working voltage or working frequency of the unit or the module to further reduce power consumption of the unit or the module. If the unit or the module returns to the working state, the DVFS device 317 sends sixth voltage frequency scaling information to the unit or the module to increase the working voltage or working frequency of the unit or the module, so as to enable an operating speed of the unit or the module to meet a working requirement.

FIG. C4 is a schematic diagram of another DVFS application scenario according to an embodiment of the application. As shown in FIG. C4, a convolutional operation device may include a DVFS device 7, an instruction storage unit 1, a control unit 2, a data access unit 3, an interconnection module 4, a primary computation module 5, and multiple secondary computation modules 6. All of the instruction storage unit 1, the control unit 2, the data access unit 3, the interconnection module 4, the primary computation module 5, and the secondary computation modules 6 may be implemented through a hardware circuit (for example, including, but not limited to, a field-programmable gate array (FPGA), a coarse grained reconfigurable architecture (CGRA), an application specific integrated circuit (ASIC), an analogue circuit, and a memristor).

The instruction storage unit 1 reads in an instruction through the data access unit 3 and stores the read-in instruction.

The control unit 2 reads the instruction from the instruction storage unit 1, decodes the instruction into a control signal for controlling an operation of another module, and sends it to the other module, for example, the data access unit 3, the primary computation module 5, and the secondary computation modules 6.

The data access unit 3 may access an external address space and directly read and write data from/into each unit in the convolutional operation device to complete data loading and storage.

The interconnection module 4 may be configured to connect the primary computation module and the secondary computation modules, and may implement different interconnection topologies (for example, a tree structure, a ring structure, a grid structure, a hierarchical interconnection, and a bus structure).

The DVFS device 7 may be configured to acquire working state information of the data access unit 3 and the primary computation module 5 in real time, and to scale working voltages or working frequencies of the data access unit 3 and the primary computation module 5 according to the working state information.

An embodiment of the application, an embodiment of the application provides a neural network processor, which may include the abovementioned convolutional operation device.

The neural network processor may be configured to perform artificial neural network computation so as to implement artificial intelligence applications of voice recognition, image recognition, translation, and the like.

In a convolutional operation task, a working process of the DVFS device 7 is as follows.

A first condition: in a convolutional operation performing process of the neural network processor, the DVFS device 7 acquires operating speeds of the data access unit 3 and primary computation module 5 of the neural network processor in real time. If the DVFS device 7 determines, according to the operating speeds of the data access unit 3 and the primary computation module 5, that a running time of the data access unit 3 exceeds a running time of the primary computation module 5, the DVFS device 7 may determine that the data access unit 3 becomes a bottleneck in the convolutional operation process. After the primary computation module 5 completes performing a present convolutional operational operation, the primary computation module 5 may perform a convolutional operational operation according to data transferred by the data access unit 3 this time only after the data access unit 3 completes performing a reading task and transfers the read data to the primary computation module 5. The DVFS device 7 sends first voltage frequency scaling information to the primary computation module 5, in which the first voltage frequency scaling information may be configured to instruct the primary computation module 5 to decrease its working voltage or working frequency, so as to reduce the operating speed of the primary computation module 5 and make the operating speed of the primary computation module 5 matched with the operating speed of the data access unit 3, which may reduce power consumption of the primary computation module 5, avoid occurrence of the condition that the primary computation module 5 is idle, and finally reduce overall running power consumption of the neural network processor under the condition of no influence on a completion time of the task.

A second condition: in the convolutional operation performing process of the neural network processor, the DVFS device 7 acquires operating speeds of the data access unit 3 and primary computation module 5 of the neural network processor in real time. If the DVFS device 3 determines, according to the operating speeds of the data access unit 3 and the primary computation module 5, that the running time of the primary computation module 5 exceeds the running time of the data access unit 3, the DVFS device 7 may determine that the primary computation module 5 becomes a bottleneck in the convolutional operation process. After the data access unit 3 completes performing a present data reading operation, the data access unit 3 may transfer read data to the primary computation module 5 only after the primary computation module 5 performs a present convolutional operational operation. The DVFS device 7 sends second voltage frequency scaling information to the data access unit 3, in which the second voltage frequency scaling information may be configured to instruct the data access unit 3 to decrease its working voltage or working frequency, so as to reduce the operating speed of the data access unit 3 and make the operating speed of the data access unit 3 matched with the operating speed of the primary computation module 5, which may reduce power consumption of the data access unit 3, avoid occurrence of the condition that the data access unit 3 is idle, and finally reduce the overall running power consumption of the neural network processor under the condition of no influence on the completion time of the task.

If the neural network processor performs artificial neural network computation for an artificial intelligence application, the DVFS device 7 acquires a working parameter for the artificial intelligence application of the neural network processor in real time and scales a working voltage or working frequency of the neural network processor according to the working parameter.

In one implementation, the artificial intelligence application may be video image processing, object recognition, machine translation, voice recognition, image retouching, and the like.

A third condition: if the neural network processor performs video image processing, the DVFS device 7 acquires a frame rate for video image processing of the neural network processor in real time. If the frame rate for video image processing exceeds a target frame rate, the target frame rate being a video image processing frame rate normally required by a user, the DVFS device 7 sends third voltage frequency scaling information to the neural network processor, in which the third voltage frequency scaling information may be configured to instruct the neural network processor to decrease its working voltage or working frequency, so as to meet a normal video image processing requirement of the user and simultaneously reduce the power consumption of the neural network processor.

A fourth condition: if the neural network processor performs voice recognition, the DVFS device 7 acquires a voice recognition speed of the neural network processor in real time. If the voice recognition speed of the neural network processor exceeds a practical voice recognition speed of the user, the DVFS device 7 sends fourth voltage frequency scaling information to the neural network processor, in which the fourth voltage frequency scaling information may be configured to instruct the neural network processor to decrease its working voltage or working frequency, so as to meet a normal voice recognition requirement of the user and simultaneously reduce the power consumption of the neural network processor.

A fifth condition: the DVFS device 7 monitors and acquires working state information of each unit or module (including the instruction storage unit 1, the control unit 2, the data access unit 3, the interconnection module 4, the primary computation module 5, and the secondary computation modules 6) in the neural network processor in real time. If any unit or module in each unit or module of the neural network processor is in an idle state, the DVFS device 7 sends fifth voltage frequency scaling information to the unit or module to decrease a working voltage or working frequency of the unit or the module to further reduce power consumption of the unit or the module. If the unit or the module returns to a working state, the DVFS device 7 sends sixth voltage frequency scaling information to the unit or the module to increase the working voltage or working frequency of the unit or the module to enable an operating speed of the unit or the module to meet a working requirement.

FIG. C5 schematically shows an implementation mode of the interconnection module 4: an H tree module. The interconnection module 4 forms data paths between the primary computation module 5 and the multiple secondary computation modules 6, with binary tree paths formed by multiple nodes. Each node sends data of an upstream to two nodes of a downstream, merges data returned by the two nodes of the downstream, and returns the data merged to the node of the upstream. For example, in a computation starting stage of a convolutional neural network, neuron data in the primary computation module 5 is sent to each secondary computation module 6 through the interconnection module 4. After a computation process of the secondary computation module 6 is completed, values of neurons output by each secondary computation module are spliced into a complete vector formed by neurons step by step in the interconnection module 4. For example, if there are totally N secondary computation modules in the device, input data xi is sent to the N secondary computation modules respectively, each secondary computation module performs convolutional operation on the input data xi and a convolutional kernel corresponding to the secondary computation module to obtain scalar data, and the interconnection module 4 merges the scalar data of each secondary computation module into an intermediate vector including N elements. If a convolutional window obtains totally A*B (A in an X direction and B in a Y direction, in which X and Y may be coordinate axes of a three-dimensional orthogonal coordinate system) pieces of input data xi by traversing, a convolutional operation is performed on the A*B pieces of xi, and all obtained vectors are merged in the primary computation module to obtain a three-dimensional intermediate result of A*B*N.

FIG. C6 is an exemplary structure block diagram of a primary computation module 5 in a device for performing convolutional neural network forward computation according to an embodiment of the application. As shown in FIG. C6, the primary computation module 5 may include a first computation unit 51, a first data dependency relationship judgment unit 52, and a first storage unit 53.

The first computation unit 51 may include a vector addition unit 511 and an activation unit 512. The first computation unit 51 may be configured to receive a control signal from the control unit 2 and to implement various computational functions of the primary computation module 5. The vector addition unit 511 may be configured to implement an offset addition operation for convolutional neural network forward computation, and to correspondingly add offset data and the intermediate result to obtain an offset result. The activation unit 512 may be configured to perform an active function operation on the offset result. The offset data may be read in from an external address space, and may also be locally stored.

The first data dependency relationship judgment unit 52 may be configured as a port through which the first computation unit 51 reads and writes the first storage unit 53, to ensure data read/write consistency of the first storage unit 53. In addition, the first data dependency relationship judgment unit 52 is also responsible for sending data read from the first storage unit 53 to the secondary computation modules 6 through the interconnection module 4. Output data of the secondary computation modules 6 is directly sent to the first computation unit 51 through the interconnection module 4. An instruction output by the control unit 2 is sent to the computation unit 51 and the first data dependency relationship judgment unit 52 to control their operations.

The storage unit 53 may be configured to cache input data and output data used by the primary computation module 5 in a computation process.

FIG. C7 is an exemplary structure block diagram of a secondary computation module 6 in a device for performing convolutional neural network forward computation according to an embodiment of the application. As shown in FIG. C7, each secondary computation module 6 may include a second computation unit 61, a data dependency relationship judgment unit 62, a second storage unit 63, and a third storage unit 64.

The second computation unit 61 may be configured to receive the control signal sent by the control unit 2 and to perform a convolutional operation. The second computation unit may include a vector multiplication unit 611 responsible for vector multiplication computation and an accumulation unit 612 responsible for accumulation computation of the convolutional operation.

The second data dependency relationship judgment unit 62 is responsible for a read/write operation over the second storage unit 63 in the computation process. The second data dependency relationship judgment unit 62 may be configured to ensure that there is no read/write consistency conflict between data used for instructions before performing the read/write operation. For example, all control signals sent to the second data dependency relationship judgment unit 62 may be stored in an instruction queue of the second data dependency relationship judgment unit 62. In this queue, if a data reading range of a read instruction conflicts with a data writing range of a write instruction located in the front of the queue, the instruction may be performed only after the write instruction it depends on is performed.

The second storage unit 63 may be configured to cache input data and output scalar data of the secondary computation module 6.

The third storage unit 64 may be configured to cache convolutional kernel data required by the secondary computation module 6 in the computation process.

It can be seen that, according to the embodiments of the application, the DVFS device acquires the operating speeds of the neural network processor and each unit and module therein in real time and determines, according to the operating speeds of the neural network processor and each unit and module therein, to decrease the working frequency or working voltage of the neural network processor or each unit therein, so as to meet a requirement of a user during practical work and reduce the overall running power consumption of the chip.

FIG. C8 is a schematic flowchart of a DVFS method according to an embodiment of the application. As shown in FIG. C8, the method may include the following.

In S801, A DVFS device acquires working state information or application scenario information of a chip connected with the DVFS device in real time, in which the application scenario information may be information obtained by the chip through neural network computation or acquired by a sensor connected with the chip.

In S802, the DVFS device sends voltage frequency scaling information to the chip according to the working state information or application scenario information of the chip, in which the voltage frequency scaling information may be configured to instruct the chip to scale its working voltage or working frequency.

The working state information of the chip may include an operating speed of the chip, the voltage frequency scaling information may include first voltage frequency scaling information, and sending the voltage frequency scaling information to the chip according to the working state information or application scenario information of the chip may include:

if the operating speed of the chip is greater than a target speed, sending the first voltage frequency scaling information to the chip, in which the first voltage frequency scaling information may be configured to instruct the chip to decrease its working frequency or working voltage and the target speed may be an operating speed of the chip if a user requirement is met.

Furthermore, the chip may include at least a first unit and a second unit. Output data of the first unit is input data of the second unit. The working state information of the chip may include an operating speed of the first unit and an operating speed of the second unit. The voltage frequency scaling information may include second voltage frequency scaling information. Sending the voltage frequency scaling information to the chip according to the working state information or application scenario information of the chip further may include:

according to the operating speed of the first unit and the operating speed of the second unit, in response to a running time of the first unit being determined to exceed a running time of the second unit, sending the second voltage frequency scaling information to the second unit, in which the second voltage frequency scaling information may be configured to instruct the second unit to decrease its working frequency or working voltage.

Furthermore, the voltage frequency scaling information may include third voltage frequency scaling information, and sending the voltage frequency scaling information to the chip according to the working state information or application scenario information of the chip may further include:

according to the operating speed of the first unit and the operating speed of the second unit, in response to the running time of the second unit being determined to exceed the running time of the first unit, sending the third voltage frequency scaling information to the first unit, in which the third voltage frequency scaling information may be configured to instruct the first unit to decrease its working frequency or working voltage.

In one implementation, the chip may include at least N units, and the working state information of the chip may include working state information of at least S units in the N units, in which N may be an integer larger than one and S may be an integer less than or equal to N. The voltage frequency scaling information may include fourth voltage frequency scaling information, and sending the voltage frequency scaling information to the chip according to the working state information of the chip may further include:

according to the working state information of a unit A, in response to the unit A being determined to be in an idle state, sending the fourth voltage frequency scaling information to the unit A, in which the fourth voltage frequency scaling information may be configured to instruct the unit A to decrease its working frequency or working voltage.

The unit A is any one of the at least S units.

In one implementation, the voltage frequency scaling information may include fifth voltage frequency scaling information, and sending the voltage frequency scaling information to the chip according to the working state information or application scenario information of the chip may further include:

according to the working state information of the unit A, in response to the unit A being determined to return to a working state, sending the fifth voltage frequency scaling information to the unit A, in which the fifth voltage frequency scaling information may be configured to instruct the unit A to increase its working voltage or working frequency.

In one implementation, an application scenario of the chip is image recognition. The application scenario information may include the count of objects in an image to be recognized. The voltage frequency scaling information may include sixth voltage frequency scaling information, and a voltage frequency scaling unit may be further configured to:

in response to determining that the count of the objects in the image to be recognized is smaller than a first threshold value, send the sixth voltage frequency scaling information to the chip, in which the sixth voltage frequency scaling information may be configured to instruct the chip to decrease its working voltage or working frequency.

In one implementation, the application scenario information is object tag information, the voltage frequency scaling information may include seventh voltage frequency scaling information, and the voltage frequency scaling unit may be further configured to:

in response to determining that the object tag information belongs to a preset object tag set, send the seventh voltage frequency scaling information to the chip, in which the seventh voltage frequency scaling information may be configured to instruct the chip to increase its working voltage or working frequency.

In one implementation, the chip is applied to voice recognition, the application scenario information is a voice input rate, the voltage frequency scaling information may include eighth voltage frequency scaling information, and the voltage frequency scaling unit may be further configured to:

if the voice input rate is lower than a second threshold value, send the eighth voltage frequency scaling information to the chip, in which the eighth voltage frequency scaling information may be configured to instruct the chip to decrease its working voltage or working frequency.

In one implementation, the application scenario information is a keyword obtained by voice recognition performed by the chip, the voltage frequency scaling information may include ninth voltage frequency scaling information, and the voltage frequency scaling unit may be further configured to:

if the keyword belongs to a preset keyword set, send the ninth voltage frequency scaling information to the chip, in which the ninth voltage frequency scaling information may be configured to instruct the chip to increase its working voltage or working frequency.

In one implementation, the chip is applied to machine translation, the application scenario information may include a character input speed or the count of characters in an image to be translated, the voltage frequency scaling information may include tenth voltage frequency scaling information, and the voltage frequency scaling unit may be further configured to:

if the character input speed is lower than a third threshold value or the count of the characters in the image to be translated is smaller than a fourth threshold value, send the tenth voltage frequency scaling information to the chip, in which the tenth voltage frequency scaling information may be configured to instruct the chip to decrease its working voltage or working frequency.

In one implementation, the application scenario information is an external light intensity, the voltage frequency scaling information may include eleventh voltage frequency scaling information, and the voltage frequency scaling unit may be further configured to:

if the external light intensity is lower than a fifth threshold value, send the eleventh voltage frequency scaling information to the chip, in which the eleventh voltage frequency scaling information may be configured to instruct the chip to decrease its working voltage or working frequency.

In one implementation, the chip is applied to image retouching, the voltage frequency scaling information may include twelfth voltage frequency scaling information and thirteenth voltage frequency scaling information, and the voltage frequency scaling unit may be further configured to:

if the application scenario information is a face image, send the twelfth voltage frequency scaling information to the chip, in which the twelfth voltage frequency scaling information may be configured to instruct the chip to decrease its working voltage; and if the application scenario information is not a face image, send the thirteenth voltage frequency scaling information to the chip, in which the thirteenth voltage frequency scaling information may be configured to instruct the chip to decrease its working voltage or working frequency.

It is to be noted that a specific implementation process of the abovementioned method embodiment may refer to related descriptions in the embodiment shown in FIG. C1 and will not be described herein.

FIG. D1 is a structure diagram of a convolutional operation device according to an embodiment of the application. As shown in FIG. D1, the convolutional operation device may include a DVFS device 7, an instruction storage unit 1, a control unit 2, a data access unit 3, an interconnection module 4, a primary computation module 5, and N secondary computation modules 6.

All of the instruction storage unit 1, the control unit 2, the data access unit 3, the interconnection module 4, the primary computation module 5, and the N secondary computation modules 6 may be implemented through a hardware circuit (for example, including, but not limited to, an FPGA, a CGRA, an ASIC, an analogue circuit, and a memristor).

The instruction storage unit 1 may be configured to store an instruction read in by the data access unit 3.

The control unit 2 may be configured to read the instruction from the instruction storage unit 1, to decode the instruction into a control signal for controlling an operation of another module, and to send the instruction to the other module, for example, the data access unit 3, the primary computation module 5, and the N secondary computation modules 6.

The data access unit 3 may be configured to perform data or instruction read/write operation between an external address space and the convolutional operation device.

In one implementation, the data access unit 3 may be configured to access the external address space and to directly read and write data from/into each unit in the device to complete data loading and storage.

The N secondary computation modules 6 are configured to implement convolutional operation of input data and convolution kernels in a convolutional neural network algorithm.

In one implementation, the N secondary computation modules 6 are configured to use the same input data and the respective convolutional kernels to concurrently compute respective output scalars.

The interconnection module 4 may be configured to connect the primary computation module 5 and the N secondary computation modules 6, and may implement different interconnection topologies (for example, a tree structure, a ring structure, a grid structure, a hierarchical interconnection, and a bus structure). The interconnection module 4 may implement data transfer between the primary computation module 5 and the N secondary computation modules 6.

In other words, the interconnection module 4 forms data paths of continuous or discrete data between the primary computation module 5 and the N secondary computation modules 6. The interconnection module 4 can be any structure of the tree structure, the ring structure, the grid structure, the hierarchical interconnection, and the bus structure.

The primary computation module 5 may be configured to splice intermediate vectors of all the input data into an intermediate result and to perform subsequent computation on the intermediate result.

The primary computation module 5 may be further configured to add the intermediate result and offset data and then to perform an activation operation. An active function active used by the primary computation module 5 is any nonlinear function of nonlinear functions including sigmoid, tanh, relu, and softmax.

In one implementation, the primary computation module 5 may include a first storage unit 53, a first computation unit 51, and a first data dependency relationship judgment unit 52.

The first storage unit 53 may be configured to cache input data and output data used by the primary computation module 5 in a computation process.

The first computation unit 51 may be configured to complete various computational functions of the primary computation module 5.

The first data dependency relationship judgment unit 52 may be configured as a port through which the first computation unit 51 reads and writes the first storage unit 53 to ensure data read/write consistency of the first storage unit 53, and may be configured to read an input neuron vector from the first storage unit 53, to send it to the N secondary computation modules 6 through the interconnection module 4, and to send an intermediate result vector from the interconnection module 4 to the first computation unit 51.

Each of the N secondary computation modules 6 may include a second computation unit 61, a second data dependency relationship judgment unit 62, a second storage unit 63, and a third storage unit 64.

The second computation unit 61 may be configured to receive a control signal sent by the control unit 2 and to perform an arithmetic logical operation.

The second data dependency relationship judgment unit 62 may be configured to perform a read/write operation on the second storage unit 63 and the third storage unit 64 in the computation process to ensure read/write consistency of the second storage unit 63 and the third storage unit 64.

The second storage unit 63 may be configured to cache the input data and the output scalar obtained by computation of the secondary computation module.

The third storage unit 64 may be configured to cache the convolutional kernel required by the secondary computation module in the computation process.

Furthermore, the first data dependency relationship judgment unit 52 and the second data dependency relationship judgment unit 62 ensure the read/write consistency in a manner of:

judging whether a dependency relationship is formed between data of a control signal which has yet not been performed and a control signal which is under performing, if whether a dependency relationship is not formed between data of a control signal which has yet not been performed and a control signal which is under performing, allowing the control signal to be sent immediately, otherwise allowing the control signal to be sent only after all control signals the control signal depends on are performed.

In one implementation, the data access unit 3 reads in at least one of the input data, the offset data, and the convolutional kernels from the external address space.

Before forward computation for a fully connected layer of a neural layer is started, the primary computation module 5 transfers the input data to each secondary computation module of the N secondary computation modules through the interconnection module 4. After the computation process of the N secondary computation modules 6 is ended, the interconnection module 4 splices the output scalars of the N secondary computation modules 6 into an intermediate vector step by step and transfers it back to the primary computation module 5.

A computation method for the convolutional operation device will be described with different operation instructions below according to an implementation of the application. The operation instruction is, for example, a convolutional operation instruction. The convolutional operation instruction may be applied to a neural network. Thus, the convolutional operation instruction may also be called a convolutional neural network instruction. For the convolutional operation instruction, a formula practically required to be performed may be:

$$s=s(\Sigma wx_i+b)$$

The formula represents that a convolutional kernel W (which may include multiple pieces of data) is multiplied by input data $x_i$, and a sum is computed. Then, an offset b may be added, in one implementation. Then, activation computation S(h) may be further performed to obtain a final output result S, in one implementation. The following computation topological structure may be obtained according to the formula: multiplication calculator-addition calculator-(optionally) activation calculator. The convolutional operation instruction may be included in an instruction set. The instruction set may include convolutional neural network COMPUTE instructions with different functions, a CONFIG instruction, an IO instruction, a NOOperation (NOP) instruction, a jump instruction, and a move instruction.

In an embodiment, the COMPUTE instructions include the following instructions.

A convolutional operation instruction: according to the instruction, the convolutional operation device extracts, from specified addresses of the memory (which may be a scratch pad memory or a scalar register file), input data with a specified size and a convolutional kernel respectively, and performs a convolutional operation in a convolutional operation component.

A convolutional neural network sigmoid instruction: according to the instruction, the convolutional operation device extracts, from specified addresses of the memory (which may be a scratch pad memory or a scalar register file), input data with a specified size and a convolutional kernel respectively, performs a convolutional operation in the convolutional operation component, and performs sigmoid activation on an output result.

A convolutional neural network tanh instruction: according to the instruction, the convolutional operation device extracts, from specified addresses of the memory (which may be a scratch pad memory), input data with a specified size and a convolutional kernel respectively, performs a convolutional operation in a convolutional operation component, and performs tanh activation on an output result.

A convolutional neural network ReLU instruction: according to the instruction, the convolutional operation device extracts, from specified addresses of the memory (which may be a scratch pad memory), input data with a specified size and a convolutional kernel respectively, performs a convolutional operation in a convolutional operation component, and performs ReLU activation on an output result.

A convolutional neural network group instruction: according to the instruction, the convolutional operation device extracts, from specified addresses of the memory (which may be a scratch pad memory), input data with a specified size and a convolutional kernel respectively, performs the convolutional operation in a convolutional operation component after grouping, and activates an output result.

The CONFIG instruction may be configured to configure various constants required by computation of a present layer before computation of each layer of an artificial neural network is started.

The IO instruction may be configured to read in input data required by computation from an external storage space and to store the data back into the external space after computation is completed.

The NOP instruction may be configured to clear present control signals in all control signal cache queues in the device to ensure that all instructions before the NOP instruction are performed. The NOP instruction does not include any operation.

The jump instruction may be configured to control jump of an address of a next instruction to be read by the instruction storage unit so as to implement jump of a control flow.

The move instruction may be configured to move data at a certain address of an internal address space of the device to another address of the internal address space of the device. The process is independent from the computation unit, with no resource of the computation unit occupied if being performed.

A method by which the convolutional operation device performs the convolutional operation instruction may be as follows.

The control unit 2 extracts the convolutional operation instruction, an operation field corresponding to the convolutional operation instruction, and a first computation topological structure corresponding to the convolutional operation instruction (multiplication calculator-addition calculator-addition calculator-activation calculator) from the instruction storage unit 1. The control unit transfers the operation field to the data access unit 3 and transfers the first computation topological structure to the interconnection module 4.

The data access unit 3 extracts a convolutional kernel w, which corresponding to the operation field, and the offset b (if b is equal to zero, the offset b is not required to be extracted) from an external storage medium, and transfers the convolutional kernel w and the offset b to the primary computation module 5.

In one implementation, the first result may include multiple multiplication computational results.

The DVFS device 7 may be configured to acquire working state information of the convolutional operation device and to send voltage frequency scaling information to the convolutional operation device according to the working state information of the convolutional operation device, in which the voltage frequency scaling information may be configured to instruct the convolutional operation device to scale its working voltage or working frequency.

In one implementation, the DVFS device 7 may include an information acquisition unit 71 and a voltage frequency scaling unit 72.

The information acquisition unit 71 may be configured to acquire the working state information of the convolutional operation device in real time.

The voltage frequency scaling unit 72 may be configured to send the voltage frequency scaling information to the convolutional operation device according to the working state information of the convolutional operation device, in which the voltage frequency scaling information may be configured to instruct the convolutional operation device 71 to scale its working voltage or working frequency.

An embodiment of the application, the working state information of the convolutional operation device may include an operating speed of the convolutional operation device, the voltage frequency scaling information may include first voltage frequency scaling information, and the voltage frequency scaling unit 72 may be configured to:

if the operating speed of the convolutional operation device is greater than a target speed, send the first voltage frequency scaling information to the convolutional operation device, in which the first voltage frequency scaling information may be configured to instruct the convolutional operation device to decrease its working frequency or working voltage and the target speed may be an operating speed of the convolutional operation device if a user requirement is met.

An embodiment of the application, the working state information of the convolutional operation device may include an operating speed of the data access unit 3 and an operating speed of the primary computation module 5, the voltage frequency scaling information may include second voltage frequency scaling information, and the voltage frequency scaling unit 72 may be further configured to:

in response to determining, according to the operating speed of the data access unit 3 and the operating speed of the primary computation module 5, that a running time of the data access unit 3 exceeds a running time of the primary computation module 5, send the second voltage frequency scaling information to the primary computation module 5, in which the second voltage frequency scaling information may be configured to instruct the primary computation module 5 to decrease its working frequency or working voltage.

Furthermore, the voltage frequency scaling information may include third voltage frequency scaling information, and the voltage frequency scaling unit 72 may be further configured to:

in response to determining, according to the operating speed of the data access unit 3 and the operating speed of the primary computation module 5, that the running time of the primary computation module 5 exceeds the running time of the data access unit 3, send the third voltage frequency scaling information to the data access unit 3, in which the third voltage frequency scaling information may be configured to instruct the data access unit 3 to decrease its working frequency or working voltage.

An embodiment of the application, the working state information of the convolutional operation device may include working state information of at least S units/modules of the instruction storage unit 1, the control unit 2, the data access unit 3, the interconnection module 4, the primary computation module 5, and the N secondary computation modules 6, in which S may be an integer larger than one and less than or equal to N+5, the voltage frequency scaling information may include fourth voltage frequency scaling information, and the voltage frequency scaling unit 72 may be configured to:

in response to determining, according to the working state information of a unit A, that the unit A is in an idle state, send the fourth voltage frequency scaling information to the unit A, in which the fourth voltage frequency scaling information may be configured to instruct the unit A to decrease its working frequency or working voltage.

The unit A is any one of the at least S units/modules.

Furthermore, the voltage frequency scaling information may include fifth voltage frequency scaling information, and the voltage frequency scaling unit 72 may be further configured to:

in response to determining, according to the working state information of the unit A, that the unit A returns to a working state, send the fifth voltage frequency scaling information to the unit A, in which the fifth voltage frequency scaling information may be configured to instruct the unit A to increase its working voltage or working frequency.

An embodiment of the application, an embodiment of the application provides a neural network processor, which may include the abovementioned convolutional operation device.

The neural network processor may be configured to perform artificial neural network computation and to implement artificial intelligence applications of voice recognition, image recognition, translation, and the like.

In a convolutional operation task, a working process of the DVFS device 7 in FIG. D1 is as follows.

A first condition: in a convolutional operation performing process of the neural network processor, the DVFS device 7 acquires operating speeds of the data access unit 3 and primary computation module 5 of the neural network processor in FIG. D1 in real time. If the DVFS device 7 determines, according to the operating speeds of the data access unit 3 and the primary computation module 5, that a running time of the data access unit 3 exceeds a running time of the primary computation module 5, the DVFS device 7 may determine that the data access unit 3 becomes a bottleneck in the convolutional operation process. After the primary computation module 5 completes performing a present convolutional operational operation, the primary computation module 5 may perform a convolutional operational operation according to data transferred by the data access unit 3 this time only after the data access unit 3 completes performing a reading task and transfers the read data to the primary computation module 5. The DVFS device 7 sends first voltage frequency scaling information to the primary computation module 5, in which the first voltage frequency scaling information may be configured to instruct the primary computation module 5 to decrease its working voltage or working frequency so as to reduce the operating speed of the primary computation module 5 and make the operating speed of the primary computation module 5 matched with the operating speed of the data access unit 3, which may reduce power consumption of the primary computation module 5, avoid occurrence of the condition that the primary computation module 5 is idle, and finally reduce overall running power consumption of the neural network processor under the condition of no influence on a completion time of the task.

A second condition: in the convolutional operation performing process of the neural network processor, the DVFS device 7 in FIG. D1 acquires the operating speeds of the data access unit 3 and primary computation module 5 of the neural network processor in real time. If the DVFS device 7 determines, according to the operating speeds of the data access unit 3 and the primary computation module 5, that the running time of the primary computation module 5 exceeds the running time of the data access unit 3, the DVFS device 7 may determine that the primary computation module 5 becomes a bottleneck in the convolutional operation process. After the data access unit 3 completes performing a present data reading operation, the data access unit 3 may transfer read data to the primary computation module 5 only after the primary computation module 5 performs a present convolutional operational operation. The DVFS device 7 sends second voltage frequency scaling information to the data access unit 3, in which the second voltage frequency scaling information may be configured to instruct the data access unit 3 to decrease its working voltage or working frequency so as to reduce the operating speed of the data access unit 3 and make the operating speed of the data access unit 3 matched with the operating speed of the primary computation module 5, which may reduce power consumption of the data access unit 3, avoid occurrence of the condition that the data access unit 3 is idle, and finally reduce the overall running power consumption of the neural network processor under the condition of no influence on the completion time of the task.

If the neural network processor performs the artificial neural network computation for an artificial intelligence application, the DVFS device 7 in FIG. D1 acquires a working parameter for the artificial intelligence application of the neural network processor in real time and scales a working voltage or working frequency of the neural network processor according to the working parameter.

In one implementation, the artificial intelligence application may be video image processing, object recognition, machine translation, voice recognition, image retouching, and the like.

A third condition: if the neural network processor performs video image processing, the DVFS device 7 in FIG. D1 acquires a frame rate for video image processing of the neural network processor in real time. If the frame rate for video image processing exceeds a target frame rate, the target frame rate being a video image processing frame rate normally required by a user, the DVFS device 7 sends third voltage frequency scaling information to the neural network processor, in which the third voltage frequency scaling information may be configured to instruct the neural network processor to decrease its working voltage or working frequency, so as to meet a normal video image processing requirement of the user and simultaneously reduce the power consumption of the neural network processor.

A fourth condition: if the neural network processor performs voice recognition, the DVFS device 7 in FIG. D1 acquires a voice recognition speed of the neural network processor in real time. If the voice recognition speed of the neural network processor exceeds a practical voice recognition speed of the user, the DVFS device 7 sends fourth voltage frequency scaling information to the neural network processor, in which the fourth voltage frequency scaling information may be configured to instruct the neural network processor to decrease its working voltage or working frequency, so as to meet a normal voice recognition requirement of the user and simultaneously reduce the power consumption of the neural network processor.

A fifth condition: the DVFS device 7 in FIG. D1 monitors and acquires working state information of each unit or module (including the instruction storage unit 1, the control unit 2, the data access unit 3, the interconnection module 4, the primary computation module 5, and the N secondary computation modules 6) in the neural network processor in real time. If any unit or module in each unit or module of the neural network processor is in an idle state, the DVFS device 7 sends fifth voltage frequency scaling information to the unit or module to decrease a working voltage or working frequency of the unit or the module to reduce power consumption of the unit or the module. If the unit or the module returns to a working state, the DVFS device 7 sends sixth voltage frequency scaling information to the unit or the module to increase the working voltage or working frequency of the unit or the module, so as to enable an operating speed of the unit or the module to meet a working requirement.

FIG. D5 schematically shows an implementation mode of the interconnection module 4: an H tree module. The interconnection module 4 forms data paths between the primary computation module 5 and the multiple secondary computation modules 6, and has binary tree paths formed by multiple nodes. Each node sends data of an upstream to two nodes of a downstream, merges data returned by the two nodes of the downstream, and returns the data merged to the node of the upstream. For example, in a computation starting stage of a convolutional neural network, neuron data in the primary computation module 5 is sent to each secondary computation module 6 through the interconnection module 4. After a computation process of the secondary computation module 6 is completed, values of neurons output by each secondary computation module are spliced into a complete vector formed by neurons step by step in the interconnection module. For example, if there are totally N secondary computation modules in the convolutional operation device, input data xi is sent to the N secondary computation modules, each secondary computation module performs convolutional operation on the input data xi and a convolutional kernel corresponding to the secondary computation module to obtain scalar data, and the interconnection module 4 merges the scalar data of each secondary computation module into an intermediate vector including N elements. If a convolutional window obtains totally A*B (A in an X direction and B in a Y direction, X and Y being coordinate axes of a three-dimensional orthogonal coordinate system) pieces of input data xi by traversing, a convolutional operation is performed on the A*B pieces of xi, and all obtained vectors are merged in the primary computation module to obtain a three-dimensional intermediate result of A*B*N.

FIG. D2 is an exemplary structure block diagram of a primary computation module 5 in a device for performing convolutional neural network forward computation according to an embodiment of the application. As shown in FIG. D2, the primary computation module 5 may include a first computation unit 51, a first data dependency relationship judgment unit 52, and a first storage unit 53.

The first computation unit 51 may include a vector addition unit 511 and an activation unit 512. The first computation unit 51 may be configured to receive a control signal from the control unit 2 in FIG. D1 and to realize various computational functions of the primary computation module 5. The vector addition unit 511 may be configured to implement an offset addition operation for convolutional neural network forward computation, and to correspondingly add offset data and the intermediate result to obtain an offset result. The activation unit 512 performs an active function operation on the offset result. The offset data may be read in from an external address space, and may also be locally stored.

The first data dependency relationship judgment unit 52 may be configured as a port through which the first computation unit 51 reads and writes the first storage unit 53, to ensure data read/write consistency of the first storage unit 53. In addition, the first data dependency relationship judgment unit 52 is also responsible for sending data read from the first storage unit 53 to the secondary computation modules 6 through the interconnection module 4. Output data of the secondary computation modules 6 is directly sent to the first computation unit 51 through the interconnection module 4. An instruction output by the control unit 2 is sent to the computation unit 51 and the first data dependency relationship judgment unit 52 to control their operations.

The storage unit 53 may be configured to cache input data and output data used by the primary computation module 5 in a computation process.

FIG. D3 is an exemplary structure block diagram of a secondary computation module 6 in a device for performing convolutional neural network forward computation according to an embodiment of the application. As shown in FIG. D3, each secondary computation module 6 may include a second computation unit 61, a second data dependency relationship judgment unit 62, a second storage unit 63, and a third storage unit 64.

The second computation unit 61 may be configured to receive the control signal sent by the control unit 2 in FIG. D1 and to perform a convolutional operation. The second computation unit may include a vector multiplication unit 611 responsible for vector multiplication computation and an accumulation unit 612 responsible for accumulation computation of the convolutional operation.

The second data dependency relationship judgment unit 62 is responsible for a read/write operation over the second storage unit 63 in the computation process. The second data dependency relationship judgment unit 62 may be configured to ensure that there is no read/write consistency conflict between data used for instructions before performing the read/write operation. For example, all control signals sent to the second data dependency relationship judgment unit 62 may be stored in an instruction queue of the second data dependency relationship judgment unit 62. In this queue, if a data reading range of a read instruction conflicts with a data writing range of a write instruction located in the front of the queue, the instruction may be performed only after the write instruction it depends on is performed.

The second storage unit 63 may be configured to cache input data and output scalar data of the secondary computation module 6.

The third storage unit 64 may be configured to cache convolutional kernel data required by the secondary computation module 6 in the computation process.

An embodiment of the application provides a neural network processor, which may include the abovementioned convolutional operation device.

The neural network processor may be configured to perform artificial neural network computation and to implement artificial intelligence applications of voice recognition, image recognition, translation, and the like.

In a possible application scenario, for a convolutional operation task, a working process of the DVFS device 7 in FIG. D1 is as follows.

The information acquisition unit 71 of the DVFS device 7 acquires working state information or application scenario information of the neural network processor connected with the DVFS device 7 in real time, in which the application scenario information may be information obtained by the neural network processor through neural network computation or acquired by a sensor connected with the neural network processor. The voltage frequency scaling unit 72 of the DVFS device 7 sends voltage frequency scaling information to the neural network processor according to the working state information or application scenario information of the neural network processor, in which the voltage frequency scaling information may be configured to instruct the neural network processor to scale its working voltage or working frequency.

An embodiment of the application, the working state information of the neural network processor may include an operating speed of the neural network processor, the voltage frequency scaling information may include first voltage frequency scaling information, and the voltage frequency scaling unit 72 may be configured to:

if the operating speed of the neural network processor is greater than a target speed, send the first voltage frequency scaling information to the neural network processor, in which the first voltage frequency scaling information may be configured to instruct the neural network processor to decrease its working frequency or working voltage and the target speed may be an operating speed of the neural network processor if a user requirement is met.

In one implementation, the information acquisition unit 71 acquires the operating speed of the neural network processor connected thereto in real time. The operating speed of the neural network processor may be different types of speeds according to different tasks performed by the neural network processor. If an operation performed by the neural network processor is video image processing, the operating speed of the neural network processor may be a frame rate for video image processing of the neural network processor. If the operation performed by the neural network processor is voice recognition, the operating speed of the chip is a speed for voice recognition over information. In response to determining that the operating speed of the neural network processor is greater than the target speed, in other words, the operating speed of the neural network processor reaches the operating speed of the neural network processor if the user requirement is met, the voltage frequency scaling unit 72 sends the first voltage frequency scaling information to the neural network processor to instruct the neural network processor to decrease its working voltage or working frequency so as to reduce power consumption of the neural network processor.

For example, assume that the operation performed by the neural network processor is video image processing and the target speed is 24 frames/second. The information acquisition unit 71 acquires the frame rate for video image processing of the neural network processor in real time. A present frame rate for video image processing of the neural network processor is 54 frames/second. In response to determining that the present frame rate for video image processing of the neural network processor is higher than the target speed, the voltage frequency scaling unit 72 sends the first voltage frequency scaling information to the neural network processor to instruct the neural network processor to decrease its working voltage or working frequency so as to reduce the power consumption of the neural network processor.

An embodiment of the application, the neural network processor may include at least a first unit and a second unit. Output data of the first unit is input data of the second unit. The working state information of the neural network processor may include an operating speed of the first unit and an operating speed of the second unit. The voltage frequency scaling information may include second voltage frequency scaling information. The voltage frequency scaling unit 72 is further configured to:

in response to determining, according to the operating speed of the first unit and the operating speed of the second unit, that a running time of the first unit exceeds a running time of the second unit, send the second voltage frequency scaling information to the second unit, in which the second voltage frequency scaling information may be configured to instruct the second unit to decrease its working frequency or working voltage.

In one implementation, task performing of the neural network processor requires cooperation of the first unit and the second unit. The output data of the first unit is the input data of the second unit. The information acquisition unit 71 acquires the operating speeds of the first unit and the second unit in real time. In response to determining that the operating speed of the first unit is lower than the operating speed of the second unit, in other words, the running time of the first unit exceeds the running time of the second unit, the voltage frequency scaling unit 72 sends the second voltage frequency scaling information to the second unit to instruct the second unit to decrease its working voltage or working frequency to reduce the overall power consumption of the neural network processor on the premise of no influence on the overall operating speed of the neural network processor.

An embodiment of the application, the voltage frequency scaling information may include third voltage frequency scaling information, and the voltage frequency scaling unit 72 is further configured to:

in response to determining, according to the operating speed of the first unit and the operating speed of the second unit, that the running time of the second unit exceeds the running time of the first unit, send the third voltage frequency scaling information to the first unit, in which the third voltage frequency scaling information may be configured to instruct the first unit to decrease its working frequency or working voltage.

In one implementation, task performing of the neural network processor requires cooperation of the first unit and the second unit. The output data of the first unit is the input data of the second unit. The information acquisition unit 71 acquires the operating speeds of the first unit and the second unit in real time. In response to determining that the operating speed of the first unit is greater than the operating speed of the second unit, in other words, the running time of the second unit exceeds the running time of the first unit, the voltage frequency scaling unit 72 sends the third voltage frequency scaling information to the first unit to instruct the first unit to decrease its working voltage or working frequency to reduce the overall power consumption of the neural network processor on the premise of no influence on the overall operating speed of the neural network processor.

An embodiment of the application, the neural network processor may include at least N units, the working state information of the neural network processor may include working state information of at least S units of the at least N units, in which N may be an integer larger than one and S may be an integer less than or equal to N, the voltage frequency scaling information may include fourth voltage frequency scaling information, and the voltage frequency scaling unit 72 may be configured to:

in response to determining, according to the working state information of a unit A, that the unit A is in an idle state, send the fourth voltage frequency scaling information to the unit A, in which the fourth voltage frequency scaling information may be configured to instruct the unit A to decrease its working frequency or working voltage.

The unit A is any one of the at least S units.

An embodiment of the application, the voltage frequency scaling information may include fifth voltage frequency scaling information, and the voltage frequency scaling unit 72 may be further configured to:

in response to determining, according to the working state information of the unit A, that the unit A returns to a working state, send the fifth voltage frequency scaling information to the unit A, in which the fifth voltage frequency scaling information may be configured to instruct the unit A to increase its working voltage or working frequency.

In one implementation, in a working process of the neural network processor, the information acquisition unit 71 acquires the working state information of the at least S units in the neural network processor in real time. In response to determining, according to the working state information of the unit A, that the unit A is in the idle state, the voltage frequency scaling unit 72 sends the fourth voltage frequency scaling information to the unit A to instruct the unit A to decrease its working frequency or working voltage to reduce power consumption of the unit A. In response to determining, according to the working state information of the unit A, that the unit A returns to the working state, the voltage frequency scaling unit 72 sends the fifth voltage frequency scaling information to the unit A to instruct the unit A to increase its working frequency or working voltage so as to enable an operating speed of the unit A to meet a working requirement.

An embodiment of the application, an application scenario of the neural network processor is image recognition, the application scenario information may include the count of objects in an image to be recognized, in which the voltage frequency scaling information may include sixth voltage frequency scaling information, and the voltage frequency scaling unit 72 may be further configured to:

in response to determining that the count of the objects in the image to be recognized is smaller than a first threshold value, send the sixth voltage frequency scaling information to the neural network processor, in which the sixth voltage frequency scaling information may be configured to instruct the neural network processor to decrease its working voltage or working frequency.

In one implementation, the neural network processor is applied to image recognition. The count of the objects in the image to be recognized is obtained by the neural network processor through a neural network algorithm. After the information acquisition unit 71 acquires the count of the objects in the image to be recognized (for example, the application scenario information) from the neural network processor, in response to determining, by the voltage frequency scaling unit 72, that the count of the objects in the image to be recognized is smaller than the first threshold value, the voltage frequency scaling unit 72 sends the sixth voltage frequency scaling information to the neural network processor to instruct the neural network processor to decrease its working voltage or working frequency. In response to determining that the count of the objects in the image to be recognized is larger than the first threshold value, the voltage frequency scaling unit 72 sends voltage frequency scaling information configured to instruct the neural network processor to increase its working voltage or working frequency to the neural network processor.

An embodiment of the application, the application scenario information is object tag information, the voltage frequency scaling information may include seventh voltage frequency scaling information, and the voltage frequency scaling unit 72 may be further configured to:

in response to determining that the object tag information belongs to a preset object tag set, send the seventh voltage frequency scaling information to the neural network processor, in which the seventh voltage frequency scaling information may be configured to instruct the neural network processor to increase its working voltage or working frequency.

For example, the preset object tag set may include multiple object tags. The object tag may be "human", "dog", "tree", and "flower". If the neural network processor determines, through the neural network algorithm, that the present application scenario may include a dog, after the neural network processor transfers object tag information including the "dog" to the information acquisition unit 71; the voltage frequency scaling unit 72, in response to determining that the object tag information may include the "dog", sends the seventh voltage frequency scaling information to the neural network processor to instruct the neural network processor to increase its working voltage or working frequency. In response to determining that the object tag information does not belong to the preset object tag set, the voltage frequency scaling unit 72 sends voltage frequency scaling information configured to instruct the neural network processor to decrease its working voltage or working frequency to the neural network processor.

An embodiment of the application, the neural network processor is applied to voice recognition, the application scenario information is a voice input rate, the voltage frequency scaling information may include eighth voltage frequency scaling information, and the voltage frequency scaling unit 72 may be further configured to:

if the voice input rate is lower than a second threshold value, send the eighth voltage frequency scaling information to the neural network processor, in which the eighth voltage frequency scaling information may be configured to instruct the neural network processor to decrease its working voltage or working frequency.

In one implementation, if the application scenario of the neural network processor is voice recognition, an input unit of the neural network processor inputs a voice to the neural network processor according to a certain rate. The information acquisition unit 71 acquires the voice input rate in real time and transfers voice input rate information to the voltage frequency scaling unit 72. In response to determining that the voice input rate is lower than the second threshold value, the voltage frequency scaling unit 72 sends the eighth voltage frequency scaling information to the neural network processor to instruct the neural network processor to decrease its working voltage or working frequency. In response to determining that the voice input rate is higher than the second threshold value, the voltage frequency scaling unit 72 sends voltage frequency scaling information configured to instruct the neural network processor to increase its working voltage or working frequency to the neural network processor.

An embodiment of the application, if the application scenario information is a keyword obtained by voice recognition performed by the neural network processor, the voltage frequency scaling information may include ninth voltage frequency scaling information, and the voltage frequency scaling unit may be further configured to:

in response to determining that the keyword belongs to a preset keyword set, send the ninth voltage frequency scaling information to the neural network processor, in which the ninth voltage frequency scaling information may be configured to instruct the neural network processor to increase its working voltage or working frequency.

Furthermore, if the keyword does not belong to the keyword set, the voltage frequency scaling unit 72 sends the voltage frequency scaling information configured to instruct the neural network processor to decrease its working voltage or working frequency to the neural network processor.

For example, the application scenario of the neural network processor is voice recognition. The preset keyword set may include keywords such as "image retouching", "neural network algorithm", "image processing", and "Alipay". If the application scenario information is "image retouching", the voltage frequency scaling unit 72 sends the ninth voltage frequency scaling information to instruct the neural network processor to increase its working voltage or working frequency. If the application scenario information is "photographing", the voltage frequency scaling unit 72 sends voltage frequency scaling information configured to instruct the neural network processor to decrease its working voltage or working frequency to the neural network processor.

An embodiment of the application, if the neural network processor is applied to machine translation, the application scenario information may include a character input speed or the count of characters in an image to be translated, the voltage frequency scaling information may include tenth voltage frequency scaling information, and the voltage frequency scaling unit 72 may be further configured to:

if the character input speed is lower than a third threshold value or the count of the characters in the image to be translated is smaller than a fourth threshold value, send the tenth voltage frequency scaling information to the neural network processor, in which the tenth voltage frequency scaling information may be configured to instruct the neural network processor to decrease its working voltage or working frequency.

In one implementation, the neural network processor is applied to machine translation. The application scenario information acquired by the information acquisition unit 71 is the character input speed or the count of the characters in the image to be translated, and the application scenario information is transferred to the voltage frequency scaling unit 72. In response to determining that the character input speed is lower than the third threshold value or the count of the characters in the image to be translated is smaller than the fourth threshold value, the voltage frequency scaling unit 72 sends the tenth voltage frequency scaling information to the neural network processor to instruct the neural network processor to decrease its working voltage. In response to determining that the character input speed is greater than the third threshold value or the count of the characters in the image to be translated is larger than the fourth threshold value, the voltage frequency scaling unit 72 sends voltage frequency scaling information configured to instruct the neural network processor to increase its working voltage to the neural network processor.

An embodiment of the application, if the application scenario information is an external light intensity, the voltage frequency scaling information may include eleventh voltage frequency scaling information, and the voltage frequency scaling unit 72 may be further configured to:

if the external light intensity is lower than a fifth threshold value, send the eleventh voltage frequency scaling information to the neural network processor, in which the eleventh voltage frequency scaling information may be configured to instruct the neural network processor to decrease its working voltage or working frequency.

In one implementation, the external light intensity is acquired by a light sensor connected with the neural network processor. After acquiring the light intensity, the information acquisition unit 71 transfers the light intensity to the voltage frequency scaling unit 72. In response to determining that the light intensity is lower than the fifth threshold value, the voltage frequency scaling unit 72 sends the eleventh voltage frequency scaling information to the neural network processor to instruct the neural network processor to decrease its working voltage. In response to determining that the light intensity is higher than the fifth threshold value, the voltage frequency scaling unit 72 sends voltage frequency scaling information configured to instruct the neural network processor to increase its working voltage or working frequency to the neural network processor.

An embodiment of the application, the neural network processor is applied to image retouching, the voltage frequency scaling information may include twelfth voltage frequency scaling information and thirteenth voltage frequency scaling information, and the voltage frequency scaling unit 72 may be further configured to:

if the application scenario information is a face image, send the twelfth voltage frequency scaling information to the neural network processor, in which the twelfth voltage frequency scaling information may be configured to instruct the neural network processor to increase its working voltage or working frequency, and if the application scenario information is not a face image, send the thirteenth voltage frequency scaling information to the neural network processor, in which the thirteenth voltage frequency scaling information may be configured to instruct the neural network processor to decrease its working voltage or working frequency.

An embodiment of the application, if the neural network processor is applied to voice recognition, the application scenario information is voice intensity. If the voice intensity is higher than a sixth threshold value, the voltage frequency scaling unit 72 sends, to the neural network processor, voltage frequency scaling information configured to instruct the neural network processor to decrease its working voltage or working frequency. If the voice intensity is lower than the sixth threshold value, the voltage frequency scaling unit 72 sends voltage frequency scaling information configured to instruct the neural network processor to increase its working voltage or working frequency to the neural network processor.

It is to be noted that the scenario information may be external scenario information, for example, the light intensity and the voice intensity, acquired by a sensor. The application scenario information may also be information computed according to an artificial intelligence algorithm. For example, in an object recognition task, real-time computation result information of the neural network processor may be fed back to the information acquisition unit. The information may include information such as the count of objects in a scenario, a face image, and an object tag keyword.

In one implementation, the artificial intelligence algorithm may include, but is not limited to, the neural network algorithm.

FIG. D6 is a schematic structure diagram of another convolutional operation device according to an embodiment of the application. As shown in FIG. D6, the convolutional operation device may include a DVFS device 617, a register unit 612, an interconnection module 613, a computation unit 614, a control unit 615, and a data access unit 616.

The computation unit 614 may include at least two of an addition calculator, a multiplication calculator, a comparator, and an activation calculator.

The interconnection module 613 may be configured to control a connection relationship of the calculators in the computation unit 614 to enable the at least two calculators to form different computation topological structures.

The register unit 612 (which may be a register unit, an instruction cache, and a scratch pad memory) may be configured to store an operation instruction, an address of a data block in a storage medium, and the computation topological structure corresponding to the operation instruction.

In one implementation, the convolutional operation device may further include a storage medium 611.

The storage medium 611 may be an off-chip memory, of course, may also be an on-chip memory during a practical application, and may be configured to store the data block. The data block may specifically be n-dimensional data, in which n may be an integer more than or equal to one. For example, the data block is one-dimensional data, for example, a vector, if n=1; the data block is two-dimensional data, for example, a matrix, if n=2; and the data block is multidimensional data if n≥3.

The control unit 615 may be configured to extract the operation instruction, an operation field corresponding to the operation instruction, and a first computation topological structure corresponding to the operation instruction from the register unit 612, to decode the operation instruction into an performing instruction, in which the performing instruction may be configured to control the computation unit 614 to perform a computational operation, to transfer the operation field to the data access unit 616, and to transfer the computation topological structure to the interconnection module 613.

The data access unit 616 may be configured to extract the data block corresponding to the operation field from the storage medium 611 and to transfer the data block to the interconnection module 613.

The interconnection module 613 may be configured to receive the data block of the first computation topological structure.

An embodiment of the application, the interconnection module 613 may be further configured to replace the data block according to the first computation topological structure.

The computation unit 614 may be configured to call the calculator of the computation unit 614 to perform the computational operation on the data block to obtain a computational result according to the performing instruction, to transfer the computational result to the data access unit 616, and to store it in the storage medium 611.

An embodiment of the application, the computation unit 614 may be further configured to call the calculator to perform a computational operation on the replaced data block to obtain a computational result according to the first computation topological structure and the performing instruction, to transfer the computational result to the data access unit 616, and to store it in the storage medium 611.

An embodiment, the interconnection module 613 may be further configured to, according to the connection relationship of the calculators in the computation unit 614, form the first computation topological structure.

The DVFS device 617 may be configured to monitor a working state of the whole convolutional operation device, and to dynamically scale a voltage and a frequency of the whole convolutional operation device.

A computation method for the convolutional operation device will be described with different operation instructions below according to an implementation of the application. The operation instruction is, for example, a convolutional operation instruction. The convolutional operation instruction may be applied to a neural network. Thus, the convolutional operation instruction may also be called a convolutional neural network instruction. For the convolutional operation instruction, a formula practically required to be performed may be:

$$s=s(\Sigma wx_i+b)$$

The formula represents that a convolutional kernel W (which may include multiple pieces of data) is multiplied by input data $x_i$, and a sum is computed. Then, an offset b may be added. Then, activation computation s(h) may further be performed to obtain a final output result S. The following computation topological structure may be obtained according to the formula: multiplication calculator-addition calculator-(optionally) activation calculator. The convolutional operation instruction may be included in an instruction set. The instruction set may include convolutional neural network COMPUTE instructions with different functions, a CONFIG instruction, an IO instruction, a NOOperation (NOP) instruction, a jump instruction, and a move instruction.

In an embodiment, the COMPUTE instructions include the following instructions.

A convolutional operation instruction: according to the instruction, the convolutional operation device extracts, from specified addresses of the memory (which may be a scratch pad memory or a scalar register file), input data with a specified size and a convolutional kernel respectively, and performs a convolutional operation in a convolutional operation component.

A convolutional neural network sigmoid instruction: according to the instruction, the convolutional operation device extracts, from specified addresses of the memory (which may be a scratch pad memory or a scalar register file), input data with a specified size and a convolutional kernel respectively, performs a convolutional operation in a convolutional operation component, and performs sigmoid activation on an output result.

A convolutional neural network tanh instruction: according to the instruction, the convolutional operation device extracts, from specified addresses of the memory (which may be a scratch pad memory), input data with a specified size and a convolutional kernel respectively, performs a convolutional operation in a convolutional operation component, and performs tanh activation on an output result.

A convolutional neural network ReLU instruction: according to the instruction, the device extracts, from specified addresses of the memory (which may be a scratch pad memory), input data with a specified size and a convolutional kernel respectively, performs the convolutional operation in a convolutional operation component and performs ReLU activation on the output result.

A convolutional neural network group instruction: according to the instruction, the convolutional operation device extracts, from specified addresses of the memory (which may be a scratch pad memory), input data with a specified size and a convolutional kernel respectively, performs the convolutional operation in a convolutional operation component after grouping, and preferably activates the output result.

The CONFIG instruction may be configured to configure various constants required by computation of a present layer before computation of each layer of an artificial neural network is started.

The IO instruction may be configured to read in input data required by computation from an external storage space and store the data back into the external space after computation is completed.

The NOP instruction may be configured to clear present control signals in all control signal cache queues in the device to ensure that all instructions before the NOP instruction are performed. The NOP instruction does not include any operation.

The jump instruction may be configured to control jump of an address of a next instruction to be read by the instruction storage unit so as to implement jump of a control flow.

The move instruction may be configured to move data at a certain address of an internal address space of the convolutional operation device to another address of the internal address space of the convolutional operation device. The process is independent from the computation unit, with no resource of the computation unit occupied if being performed.

A method by which the convolutional operation device performs the convolutional operation instruction may be as follows.

The control unit 615 extracts the convolutional operation instruction, an operation field corresponding to the convolutional operation instruction, and a first computation topological structure corresponding to the convolutional operation instruction (multiplication calculator-addition calculator-addition calculator-activation calculator) from the register unit 612. The control unit transfers the operation field to the data access unit 616 and transfers the first computation topological structure to the interconnection module 613.

The data access unit 616 extracts a convolutional kernel w, which corresponds to the operation field, and the offset b (if b is zero, the offset b is not required to be extracted) from the storage medium 611, and transfers the convolutional kernel w and the offset b to the computation unit 614.

The multiplication calculator of the computation unit 614 performs multiplication computation on the convolutional kernel w and input data Xi to obtain a first result and inputs the first result to the addition calculator. Addition computation is performed to obtain a second result. Addition computation is performed on the second result and the offset b to obtain a third result. The third result is transferred to the activation calculator. Activation computation is performed to obtain an output result S. The output result S is transferred to the data access unit 616 for storage in the storage medium 611. In one implementation, after each operation, an output result of each operation may directly be transferred to the data access unit 616 for storage in the storage medium 611 without waiting for performing of the next operations. In addition, the operation that the addition computation is performed on the second result and the offset b to obtain the third result is optional, in other words, if b is zero, the operation is not required. Moreover, a sequence of the addition computation and the multiplication computation may be exchanged.

In one implementation, the first result may include multiple multiplication computational results.

An embodiment of the application, an embodiment of the application provides a neural network processor, which may include the abovementioned convolutional operation device.

The neural network processor may be configured to perform artificial neural network computation so as to implement artificial intelligence applications of voice recognition, image recognition, translation, and the like.

In a convolutional operation task, a working process of the DVFS device 617 in FIG. D6 is as follows.

A first condition: in a convolutional operation performing process of the neural network processor, the DVFS device 617 in FIG. D6 acquires operating speeds of the data access unit 616 and computation unit 614 of the neural network processor in real time. If the DVFS device 617 determines, according to the operating speeds of the data access unit 616 and the computation unit 614, that a running time of the data access unit 616 exceeds a running time of the computation unit 614, the DVFS device 617 may determine that the data access unit 616 becomes a bottleneck in the convolutional operation process. After the computation unit 614 completes performing a present convolutional operational operation, the computation unit 614 may perform a convolutional operational operation according to data transferred by the data access unit 616 this time only after the data access unit 616 completes performing a reading task and transfers the read data to the computation unit 614. The DVFS device 617 sends first voltage frequency scaling information to the computation unit 614, in which the first voltage frequency scaling information may be configured to instruct the computation unit 614 to decrease its working voltage or working frequency, so as to reduce the operating speed of the computation unit 614 and make the operating speed of the computation unit 614 matched with the operating speed of the data access unit 616, which may reduce power consumption of the computation unit 614, avoid occurrence of the condition that the computation unit 614 is idle, and finally reduce overall running power consumption of the neural network processor under the condition of no influence on a completion time of the task.

A second condition: in the convolutional operation performing process of the neural network processor, the DVFS device 617 acquires the operating speeds of the data access unit 616 and computation unit 614 of the neural network processor in real time. If the DVFS device 617 determines, according to the operating speeds of the data access unit 616 and the computation unit 614, that the running time of the computation unit 614 exceeds the running time of the data access unit 616, the DVFS device 617 may determine that the computation unit 614 becomes a bottleneck in the convolutional operation process. After the data access unit 616 completes performing a present data reading operation, the data access unit 616 may transfer read data to the computation unit 614 only after the computation unit 614 performs a present convolutional operational operation. The DVFS device 617 sends second voltage frequency scaling information to the data access unit 616, in which the second voltage frequency scaling information may be configured to instruct the data access unit 616 to decrease its working voltage or working frequency to reduce the operating speed of the data access unit 616 and make the operating speed of the data access unit 616 matched with the operating speed of the computation unit 614, which may reduce power consumption of the data access unit 616, avoid occurrence of the condition that the data access unit 616 is idle, and finally reduce the overall running power consumption of the neural network processor under the condition of no influence on the completion time of the task.

If the neural network processor performs artificial neural network computation for an artificial intelligence application, the DVFS device 617 acquires a working parameter for the artificial intelligence application of the neural network processor in real time and scales a working voltage or working frequency of the neural network processor according to the working parameter.

In one implementation, the artificial intelligence application may be video image processing, object recognition, machine translation, voice recognition, image retouching, and the like.

A third condition: if the neural network processor performs video image processing, the DVFS device 617 acquires a frame rate for video image processing of the neural network processor in real time. If the frame rate for video image processing exceeds a target frame rate, the target frame rate being a video image processing frame rate normally required by a user, the DVFS device 617 sends third voltage frequency scaling information to the neural network processor, in which the third voltage frequency scaling information may be configured to instruct the neural network processor to decrease its working voltage or working frequency, so as to meet a normal video image processing requirement of the user and simultaneously reduce the power consumption of the neural network processor.

A fourth condition: if the neural network processor performs voice recognition, the DVFS device 617 acquires a voice recognition speed of the neural network processor in real time. If the voice recognition speed of the neural network processor exceeds a practical voice recognition speed of the user, the DVFS device 617 sends fourth voltage frequency scaling information to the neural network processor, in which the fourth voltage frequency scaling information may be configured to instruct the neural network processor to decrease its working voltage or working frequency, so as to meet a normal voice recognition requirement of the user and simultaneously reduce the power consumption of the neural network processor.

A fifth condition: the DVFS device 617 monitors a working state of each unit or module (including the storage medium 611, the register unit 612, the interconnection module 613, the computation unit 614, the control unit 615 and the data access unit 616) in the neural network processor in real time. If any unit or module in each unit or module of the neural network processor is in an idle state, the DVFS device sends fifth voltage frequency scaling information to the unit or module to decrease a working voltage or working frequency of the unit or the module to further reduce power consumption of the unit or the module. If the unit or the module returns to a working state, the DVFS device sends sixth voltage frequency scaling information to the unit or the module to increase the working voltage or working frequency of the unit or the module, so as to enable an operating speed of the unit or the module to meet a working requirement.

FIG. D7 is a schematic flowchart of a method for performing single-layer convolutional neural network forward computation according to an embodiment of the application. The method is applied to the abovementioned convolutional operation device. As shown in FIG. D7, the method may include the following.

In S701, an IO instruction is pre-stored at a starting address of an instruction storage unit.

In S702, computation is started, a control unit reads the IO instruction from the starting address of the instruction storage unit, and a data access unit reads, according to a control signal decoded from the IO instruction, all corresponding convolutional neural network operation instructions from an external address space and caches all the instructions in the instruction storage unit.

In S703, the control unit reads in a next IO instruction from the instruction storage unit, and the data access unit reads all data required by a primary computation module from the external address space to a first storage unit of the primary computation module according to a control signal decoded from the next IO instruction.

In S704, the control unit reads in another IO instruction from the instruction storage unit, and the data access unit reads convolutional kernel data required by secondary computation modules from the external address space according to a decoded control signal decoded from the another IO instruction.

In S705, the control unit reads in a next CONFIG instruction from the instruction storage unit, and the convolutional operation device configures various constants required by computation of a present layer of a neural network according to a control signal decoded from the next CONFIG instruction.

In S706, the control unit reads in a next COMPUTE instruction from the instruction storage unit, and the primary computation module sends input data in a convolutional window to the N secondary computation modules through an interconnection module according to a control signal decoded from the next COMPUTE instruction, stores the input data in second storage units of the N secondary computation modules, and moves the convolutional window according to the next COMPUTE instruction.

In S707, computation units of the N secondary computation modules read convolutional kernels from third storage units according to the control signal decoded from the COMPUTE instruction, read the input data from the second storage units, complete convolutional operation of the input data and the convolutional kernels, and return obtained output scalars through the interconnection module.

In S708, the output scalars returned by the N secondary computation modules are spliced into complete intermediate vectors step by step in the interconnection module.

In S709, the primary computation module obtains the intermediate vectors returned by the interconnection module, moves the convolutional window to traverse all the input data, splices all the intermediate returned vectors into an intermediate result, reads offset data from the first storage unit according to the control signal decoded from the COMPUTE instruction, and adds the offset data and the intermediate result together to obtain an offset result through a vector addition unit. An activation unit activates the offset result and writes final output data back into the first storage unit.

In S710, the control unit reads in yet another IO instruction from the instruction storage unit, and the data access unit stores the output data of the first storage unit to a specified address of the external address space according to a control signal decoded from the yet another IO instruction. The computation is ended.

In one implementation, the method may further include the following:

acquiring working state information of the convolutional operation device in real time;

sending voltage frequency scaling information to the convolutional operation device according to the working state information of the convolutional operation device, in which the voltage frequency scaling information may be configured to instruct the convolutional operation device to scale its working voltage or working frequency.

In one implementation, the working state information of the convolutional operation device may include an operating speed of the convolutional operation device, in which the voltage frequency scaling information may include first voltage frequency scaling information, and sending the voltage frequency scaling information to the convolutional operation device according to the working state information of the convolutional operation device may include:

if the operating speed of the convolutional operation device is greater than a target speed, sending the first voltage frequency scaling information to the convolutional operation device, in which the first voltage frequency scaling information may be configured to instruct the convolutional operation device to decrease its working frequency or working voltage and the target speed may be an operating speed of the convolutional operation device if a user requirement is met.

In one implementation, the working state information of the convolutional operation device may include an operating speed of the data access unit and an operating speed of the primary computation module, the voltage frequency scaling information may include second voltage frequency scaling information, and sending the voltage frequency scaling information to the convolutional operation device according to the working state information of the convolutional operation device further may include:

according to the operating speed of the data access unit and the operating speed of the primary computation module, in response to a running time of the data access unit being determined to exceed a running time of the primary computation module, sending the second voltage frequency scaling information to the primary computation module, in which the second voltage frequency scaling information may be configured to instruct the primary computation module to decrease its working frequency or working voltage.

In one implementation, the voltage frequency scaling information may include third voltage frequency scaling information, and sending the voltage frequency scaling information to the convolutional operation device according to the working state information of the convolutional operation device may further include:

according to the operating speed of the data access unit and the operating speed of the primary computation module, in response to the running time of the primary computation module being determined to exceed the running time of the data access unit, sending the third voltage frequency scaling information to the data access unit, in which the third voltage frequency scaling information may be configured to instruct the data access unit to decrease its working frequency or working voltage.

In one implementation, the working state information of the convolutional operation device may include working state information of at least S units/modules of the instruction storage unit, the control unit, the data access unit, the interconnection module, the primary computation module and the N secondary computation modules, in which S may be an integer larger than one and less than or equal to N+5, the voltage frequency scaling information may include fourth voltage frequency scaling information, and sending the voltage frequency scaling information to the convolutional operation device according to the working state information of the convolutional operation device may further include:

according to the working state information of a unit A, in response to the unit A being determined to be in an idle state, sending the fourth voltage frequency scaling information to the unit A, in which the fourth voltage frequency scaling information may be configured to instruct the unit A to decrease its working frequency or working voltage.

The unit A is any one of the at least S units/modules.

In one implementation, the voltage frequency scaling information may include fifth voltage frequency scaling information, and sending the voltage frequency scaling information to the convolutional operation device according to the working state information of the convolutional operation device further include:

according to the working state information of the unit A, in response to the unit A being determined to return to a working state, sending the fifth voltage frequency scaling information to the unit A, in which the fifth voltage frequency scaling information may be configured to instruct the unit A to increase its working voltage or working frequency.

It is to be noted that a specific implementation process of the abovementioned method embodiment may refer to related descriptions in the embodiments shown in Figs. D1-D6 and will not be described herein.

An embodiment of the application, a method for performing multilayer convolutional neural network forward computation is provided, which may include that: the neural network forward computation method shown in FIG. D7 is performed on each layer, after performing for a previous layer of a convolutional neural network, a operation instruction of a present layer takes an output data address, stored in a primary computation module, of the previous layer as an input data address of the present layer, and convolutional kernel and offset data addresses in the instruction are changed into corresponding addresses of the present layer.

Another aspect of the application provides an image compression method and device, which may be applied to training of a compression neural network configured for image compression, so that image compression effectiveness and recognition accuracy can be improved.

FIG. E1 is a neural network computation process according to an embodiment of the application. As shown in FIG. E1, dotted arrows in the figure represent reverse computation and solid arrows represent forward computation. During the forward computation, after performing for a previous layer of an artificial neural network is completed, an output neuron obtained by the previous layer is determined as an input neuron of a next layer for computation (or the output neuron is determined as the input neuron of the next layer after processed by some operations), and meanwhile, a weight is also replaced with a weight of the next layer. During the reverse computation, after performing of reverse computation for the previous layer of the artificial neural network is completed, an input neuron gradient obtained by the previous layer is determined as an output neuron gradient of the next layer for computation (or the output neuron gradient is determined as the input neuron gradient of the next layer after processed by some operations), and meanwhile, the weight is also replaced with the weight of the next layer.

A forward propagation stage of the neural network corresponds to the forward computation and is a process from input of input data to output of output data. A back propagation stage corresponds to the reverse computation and is a process that an error between final result data and expected output data is reversely subjected to the forward propagation stage. Forward propagation and back propagation are repeated, the weight of each layer is corrected in an error gradient descent manner, and the weight of each layer is regulated. It is also a neural network learning and training process. Network output errors may be reduced.

In the application, types of compression training image sets of the compression neural network and the numbers of training images in the training image sets of each type are not limited. If there are more types, the numbers are larger, and the count of training times is larger, an image compression loss rate is lower and improvement of image recognition accuracy may be facilitated.

A compression training image set may include multiple dimensions of images at multiple angles, images under multiple light intensities, images acquired by various types of image acquisition devices, or the like. Training the compression neural network for compression training image sets corresponding to different dimensions may improve the image compression effectiveness under different conditions and extend an application range of the image compression method.

For tag information of a training image in a compression training image set, a specific content of the tag information is not limited in the application. A part of an image to be trained may be marked to detect whether training of the compression neural network is completed or not. For example, in a driving image shot by a road video monitor, tag information can be target license number information. The driving image is input into the compression neural network to obtain a compressed image. The compressed image is recognized on the basis of a recognition neural network model to obtain reference license number information. If the reference license number information is matched with the target license number information, it may be determined that training of the compression neural network is completed. Otherwise, if the present number of training times of the compression neural network is smaller than a preset threshold value, the compression neural network is still required to be trained.

A type of the tag information is not limited in the application. It may be license number information and may also be face information, traffic sign information, object classification information, and the like.

The recognition neural network model involved in the application is data obtained if training of a recognition neural network configured for image recognition is completed. A training method for the recognition neural network is not limited. Batch Gradient Descent (BGD), Stochastic Gradient Descent (SGD), mini-batch SGD, or the like may be adopted for training. A training period is completed by single forward computation and reverse gradient propagation.

Each training image in a recognition training image set at least may include tag information consistent with a type of target tag information of each training image in compression training images. In other words, the recognition neural network model may recognize a compressed image output by the compression neural network (to be trained or having been trained).

For example, if a type of tag information of a compression training image is a license number, a type of tag information of a recognition training image at least may include the license number. Therefore, the recognition neural network model may be ensured to recognize the compressed image output by the compression neural network to obtain license number information.

In one implementation, the compression training image set at least may include the recognition training image set.

Since the images in the training image set are limited by influence of factors such as the angle, the light, or the image acquisition device, adopting the recognition training image for training may improve the accuracy of the recognition neural network model to further improve training efficiency of the compression neural network, for example, facilitating improvement of the image compression effectiveness.

FIG. E2 is a schematic flowchart of an image compression method according to an embodiment of the application. As shown in FIG. E2, the image compression method may include the following.

In S201, an original image with a first resolution is acquired.

The first resolution is an input resolution of a compression neural network. A second resolution is lower than the first resolution and is an output resolution of the compression neural network. A compression ratio (a ratio of the second resolution to the first resolution) of an image input into the compression neural network is fixed. In other words, if different images are compressed on the basis of the same compression neural network model, images with the same compression ratio may be obtained.

The original image is any training image in a compression training image set of the compression neural network. Tag information of the original image is determined as target tag information. The tag information is not limited in the application. The tag information may be marked by artificial recognition, and may also be obtained by inputting the original image into a recognition neural network and performing recognition on the basis of a recognition neural network model, etc.

In S202, the original image is compressed on the basis of a target model to obtain a compressed image with a second resolution.

The target model is a present neural network model of the compression neural network. In other words, the target model is a present parameter of the compression neural network. The original image of which the resolution is equal to the input resolution of the compression neural network may be compressed on the basis of the target model to obtain the compressed image of which the resolution is equal to the output resolution of the compression neural network.

In one implementation, compressing the original image is compressed on the basis of the target model to obtain the compressed image with the second resolution may include: recognizing the original image on the basis of the target model to obtain multiple pieces of image information; and compressing the original image on the basis of the target model and the multiple pieces of image information to obtain the compressed image.

The abovementioned training image may include multiple dimensions. The original image may be recognized on the basis of the target model at first to determine image information corresponding to each dimension, and then the original image is compressed for each piece of image information. Therefore, accuracy of image compression under different dimensions is improved.

In S203, the compressed image is recognized on the basis of a recognition neural network model to obtain reference tag information.

A recognition method is not limited in the application and may include two parts, for example, feature extraction and feature recognition. A result obtained by the feature recognition is determined as the reference tag information. For example, reference tag information corresponding to a compressed driving image obtained after a driving image is compressed is a license number, and reference tag information corresponding to a compressed face image obtained after a face image is compressed is a face recognition result.

In one implementation, recognizing the compressed image on the basis of the recognition neural network model to obtain the reference tag information may include: preprocessing the compressed image to obtain an image to be recognized; and recognizing the image to be recognized on the basis of the recognition neural network model to obtain the reference tag information.

Preprocessing may include, but is not limited to, any one or more of: data format conversion processing (for example, normalization processing and integer type conversion), data deduplication processing, data exception processing, missing data filling processing, and the like. Preprocessing the compressed image may improve recognition efficiency and accuracy of image recognition.

Similarly, acquiring the original image with the first resolution may include: receiving an input image; and preprocessing the input image to obtain the original image. Preprocessing the input image may improve compression efficiency of image compression.

Preprocessing may further include size processing. A neural network has a fixed size requirement, in other words, only an image equal to a basic image size of the neural network may be processed. A basic image size of the compression neural network is determined as a first basic image size and a basic image size of the recognition neural network is determined as a second basic image size. In other words, a size requirement of the compression neural network on the input image is that an image size of the input image is equal to the first basic image size, and a size requirement of the recognition neural network on the input image is that the image size of the input image is equal to the second basic image size. The compression neural network may compress an image consistent with the first basic image size to obtain a compressed image. The recognition neural network may recognize an image consistent with the second basic image size to obtain reference tag information.

A specific size processing manner is not limited in the application, which may include a cropping or pixel filling manner, may also adopt a manner of scaling according to the basic image size, may further adopt an input image downsampling method, and the like.

Peripheral pixel cropping refers to cropping a noncritical information region on a periphery of an image. Downsampling processing refers to a process of reducing a sampling rate of a specific signal. For example, an average value of four adjacent pixels is computed as a value of a pixel at a position corresponding to the four pixels of the processed image, so that a size of the image is reduced.

In one implementation, the operation that the compressed image is preprocessed to obtain the image to be recognized may include that: if an image size of the compressed image is smaller than the basic image size of the recognition neural network, the compressed image is filled with pixels according to the basic image size to obtain the image to be recognized.

The pixels are not limited in the application and may correspond to any color mode, for example, rgb(0, 0, 0). Specific pixel filling positions are also not limited and may be any position except the compressed image. In other words, the compressed image is not processed, and instead, a pixel filling manner is adopted for image extension. Therefore, the compressed image may be prevented from deformation, and improvement of the recognition efficiency and accuracy of image recognition may be facilitated.

For example, as shown in FIG. E3, the compressed image is placed at a left upper position of the image to be recognized, and positions, except the compressed image, of the image to be recognized are filled with pixels.

Similarly, preprocessing the input image to obtain the original image may include: if an image size of the input image is smaller than the first basic image size of the compression neural network, filling the input image with pixels according to the first basic image size to obtain the original image. After pixel filling, the original image to be compressed is recognized by the recognition neural network to obtain the reference tag information. Since the pixel filling does not change a compression rate of the input image, training efficiency and accuracy of the compression neural network can be improved.

In S204, a loss function is acquired according to the target tag information and the reference tag information.

In the application, the loss function may be configured to describe a magnitude of an error between the target tag information and the reference tag information. The tag information may include multiple dimensions, and is usually computed by a formula for a difference of two squares:

$$E = \frac{1}{2} \sum_{k=1}^{c} (t_k - y_k)^2$$

where c is the dimension of the tag information, $t_k$ is the $k^{th}$ dimension of the reference tag information and $y_k$ is the $k^{th}$ dimension of the target tag information.

In S205, whether the loss function is convergent to a first threshold value or whether the present number of training times of the compression neural network is more than or equal to a second threshold value is judged; if the loss function is convergent to a first threshold value or the present number of training times of the compression neural network is more than or equal to a second threshold value is judged, S206 is performed; if the loss function is not convergent to a first threshold value or the present number of training times of the compression neural network is not more than or equal to a second threshold value is judged, S207 is performed.

In the training method for the compression neural network involved in the application, a training period corresponding to each training image is completed by single forward computation and reverse gradient propagation. A threshold value of the loss function is set to be the first threshold value. A threshold value of the count of training times of the compression neural network is set to be the second threshold value. If the loss function is convergent to the first threshold value or the count of training times is more than or equal to the second threshold value, training of the compression neural network is completed, and the target model is determined as a corresponding compression neural network model if training of the compression neural network is completed. Otherwise, a back propagation stage of the compression neural network is started according to the loss function. The target model is updated according to the loss function and training is performed for the next training image. In other words, S202-S205 are performed, and if the abovementioned condition is met, training is ended and S206 is performed.

A reverse training method for the compression neural network is not limited in the application. As an implementation, reference can be made to the flowchart of a single-layer neural network computation method provided in FIG. E4. FIG. E4 may be applied to a schematic structure diagram of a device for performing compression neural network reverse training in FIG. E5.

As shown in FIG. E5, the device may include an instruction cache unit 21, a control unit 22, a DMA 23, an H tree module 24, a primary computation module 25, and multiple secondary computation modules 26. The device may be implemented through a hardware circuit (for example, an ASIC).

The instruction cache unit 21 may be configured to read an instruction in through the DMA 23 and to cache the read-in instruction. The control unit 22 may be configured to read the instruction from the instruction cache unit 21 and to decode the instruction into a microinstruction controlling an operation of another module, the another module being, for example, the DMA 23, the primary computation module 25, and the secondary computation module 26. The DMA 23 may be configured to access an external address space and to directly read and write data from/into each cache unit in the device so as to complete data loading and storage.

FIG. E6 shows a structure of the H tree module 24. As shown in FIG. E6, the H tree module 24 forms a data path between the primary computation module 25 and the multiple secondary computation modules 26 and has an H tree structure. An H tree has binary tree paths formed by multiple nodes. Each node sends data of an upstream to two nodes of a downstream, merges data returned by the two nodes of the downstream, and returns the data merged to the node of the upstream. For example, in a reverse computation process of a neural network, vectors returned by the two nodes of the downstream may be added into a vector at the present node and returned to the node of the upstream. In a computation starting stage of each layer of the artificial neural network, an input gradient in the primary computation module 25 is sent to each secondary computation module 26 through the H tree module 24. After a computation process of each secondary computation module 26 is completed, output gradient vector partial sums output by each secondary computation module 26 may be added with one another in the H tree module 24 step by step. In other words, all the output gradient vector partial sums are summed as a final output gradient vector.

FIG. E7 is a schematic structure diagram of the primary computation module 25. The primary computation module 25 may include a computation unit 251, a data dependency relationship judgment unit 252, and a neuron cache unit 253.

The neuron cache unit 253 may be configured to cache input data and output data used by the primary computation module 25 in a computation process. The computation unit 251 may be configured to complete various computational functions of the primary computation module. The data dependency relationship judgment unit 252 may be configured as a port through which the computation unit 251 reads and writes the neuron cache unit 253, and may ensure no read/write consistency conflict of data in the neuron cache unit 253. In one implementation, the data dependency relationship judgment unit 252 judges whether a dependency relationship is formed between data of a microinstruction which has yet not been performed and data of a microinstruction which is under performing, if a dependency relationship is not formed between data of a microinstruction which has yet not been performed and data of a microinstruction which is under performing, allows the microinstruction to be sent immediately, otherwise allows the microinstruction to be sent only after all microinstructions the microinstruction depends on are performed. For example, all microinstructions sent to the data dependency relationship judgment unit 252 may be stored in an instruction queue of the data dependency relationship judgment unit 252. In this queue, if a data reading range of a read instruction conflicts with a data writing range of a write instruction located in the front of the queue, the instruction may be performed only after the write instruction it depends on is performed. In addition, the data dependency relationship judgment unit 252 may be configured to read an input gradient vector from the neuron cache unit 253 and to send the input gradient vector to the secondary computation modules 26 through the H tree module 24. Output data of the secondary computation modules 26 is directly sent to the first computation unit 251 through the H tree module 24. The instruction sent by the control unit 22 is sent to the computation unit 251 and the data dependency relationship judgment unit 252 to control their operations.

FIG. E8 is a schematic structure diagram of the secondary computation module 26. As shown in FIG. E8, each secondary computation module 26 may include a computation unit 261, a data dependency relationship judgment unit 262, a neuron cache unit 263, a weight cache unit 264, and a weight gradient cache unit.

The computation unit 261 may be configured to receive a microinstruction sent by the control unit 22 and to perform arithmetic logical operation.

The data dependency relationship judgment unit 262 is responsible for a read/write operation over the cache unit in a computation process. The data dependency relationship judgment unit 262 may be configured to ensure no read/write consistency conflict of the cache unit. In one implementation, the data dependency relationship judgment unit 262 may be configured to judge whether a dependency relationship is formed between data of a microinstruction which has yet not been performed and data of a microinstruction which is under performing. If a dependency relationship is not formed between data of a microinstruction which has yet not been performed and data of a microinstruction which is under performing, allows the microinstruction to be sent immediately, otherwise allows the microinstruction to be sent only after all microinstructions the microinstruction depends on are performed. For example, all microinstructions sent to the data dependency relationship judgment unit 262 may be stored in an instruction queue of the data dependency relationship judgment unit 262. In this queue, if a data reading range of a read instruction conflicts with a data writing range of a write instruction located in the front of the queue, the instruction may be performed only after the write instruction it depends on is performed.

The neuron cache unit 263 may be configured to cache input gradient vector data and an output gradient vector partial sum obtained by computation of the secondary computation module 26.

The weight cache unit 264 may be configured to cache a weight vector required by the secondary computation module 26 in the computation process. For each secondary computation module 26, only a column corresponding to the secondary computation module 26 in a weight matrix may be stored.

The weight gradient cache unit 265 may be configured to cache weight gradient data required by the secondary computation module 26 in a weight updating process. The weight gradient data stored by each secondary computation module 26 corresponds to a weight vector stored in the secondary computation module.

In a process of computing the output gradient vectors for reverse training of each layer of the artificial neural network, the secondary computation modules 26 may be configured to implement the first half part of the process which can be concurrently operated and to update the weights. For example, for a fully connected layer of the artificial neural network (a Multi-Layer Perceptron (MLP)), the process is illustrated by out_gradient=w*in_gradient. Multiplication of the weight matrix w and the input gradient vector in_gradient may be divided into unrelated concurrent computation subtasks. The out_gradient and the in_gradient are column vectors. Each secondary computation module 26 only computes products of part of scalar elements of in_gradient and corresponding columns of the weight matrix w. Each obtained output vector is a partial sum to be accumulated of a final result. These partial sums are added in pairs step by step in the H tree to obtain the final result. Therefore, the computation process is turned into concurrent partial sum computation processes and a subsequent accumulation process. Each secondary computation module 26 computes a partial sums of the output gradient vector, and all the partial sums are accumulated in the H tree module 24 to obtain a final output gradient vector. Each secondary computation module 26 simultaneously multiplies the input gradient vectors and output of each layer during forward computation to compute weight gradients and then to update the weights stored in the secondary computation module 26. Forward computation and reverse training are two main processes of a neural network algorithm. For a training (updating) process of weights of the neural network, the neural network needs to compute forward output of input vectors in the network formed by the present weights at first, which is the forward computation process, and reversely train (update) the weights of each layer layer-by-layer according to difference values between output values and tagged values of the input vectors, which is the reverse training process. In the forward computation process, output vectors of each layer and a derivative value of an active function may be stored, which are required in the reverse training process. Therefore, the data (the output vectors and the derivative value) has certainly existed at the start of reverse training. The output values of each layer in the forward computation are data required at the start of reverse computation, which may be cached in the primary computation module through the DMA and sent to the secondary computation modules through the H tree. The primary computation module 25 performs subsequent computation on the basis of the output gradient vector, for example, multiplying the output gradient vector by a derivative of the active function during forward computation to obtain an input gradient value of the next layer. The derivative of the active function during forward computation is data required at the start of reverse computation, which may be cached in the primary computation module through the DMA.

According to an embodiment of the application, an instruction set for performing of artificial neural network forward computation on the abovementioned device is further provided. The instruction set may include a CONFIG instruction, a COMPUTE instruction, an IO instruction, a NOP instruction, a jump instruction, and a move instruction.

The CONFIG instruction may be configured to configure various constants required by computation of a present layer before computation of each layer of an artificial neural network is started.

The COMPUTE instruction may be configured to complete arithmetic logical operation for each layer of an artificial neural network.

The IO instruction may be configured to read in input data required by computation from an external address space and to store the data back into the external space after computation is completed.

The NOP instruction may be configured to clear present microinstructions in all microinstruction cache queues in the device to ensure that all instructions before the NOP instruction are performed. The NOP instruction does not include any operation.

The jump instruction may be configured to control jump of an address of a next instruction to be read by the instruction cache unit to implement jump of a control flow.

The move instruction may be configured to move data at a certain address of an internal address space of the device to another address of the internal address space of the device. The process is independent from the computation unit, with no resource of the computation unit occupied if being performed.

FIG. E9 is an exemplary block diagram of compression neural network reverse training according to an embodiment of the application. A process of computing an output gradient vector is out_gradient=w*in_gradient, where matrix vector multiplication of a weight matrix w and an input gradient vector in_gradient may be divided into unrelated concurrent computation subtasks. Each secondary computation module 26 computes a partial sum of the output gradient vector, and all the partial sums are accumulated in the H tree module 24 to obtain a final output gradient vector. In FIG. E9, an output gradient vector input gradient of a previous layer is multiplied by a derivative of a corresponding active function to obtain input data of a present layer, and the input data is multiplied by the weight matrix to obtain the output gradient vector. A process of computing a weight updating gradient is illustrated by dw=x*in_gradient. Each secondary computation module 26 computes an updating gradient of a weight of a part corresponding to the secondary computation module. The secondary computation module 26 multiplies the input gradient by an input neuron during forward computation to compute the weight updating gradient dw, and then updates the weight w according to a learning rate set by an instruction by use of w, dw and a weight updating gradient dw' used for last weight updating.

As shown in FIG. E9, input gradient ([input gradient0, . . . , input gradient3] in FIG. E9) is an output gradient vector of the $(n+1)^{th}$ layer. The output gradient vector is multiplied by a derivative value ([f (out0), f(out3)] in FIG. E9) of the $n^{th}$ layer in a forward computation process to obtain an input gradient vector of the $n^{th}$ layer at first. The process is completed in the primary computation module 25. The input gradient vector is sent to the secondary computation modules 26 by the H tree module 24 and is temporally stored in the neuron cache units 263 of the secondary computation modules 26. Then, the input gradient vector is multiplied by the weight matrix to obtain an output gradient vector of the $n^{th}$ layer. In this process, the $i^{th}$ secondary computation module computes a product of the $i^{th}$ scalar of the input gradient vector and a column vector [w_i0, . . . , w_iN] of the weight matrix. Obtained output vectors of the abovementioned process are accumulated in pairs step by step in the H tree module 24 to obtain a final output gradient vector output gradient ([output gradient0, . . . , output gradient3] in FIG. E9).

Meanwhile, the secondary computation modules 26 are also required to update the weights stored in the secondary computation modules. The process of computing the weight updating gradient is illustrated by dw_ij=x_j*in_gradient_i, where x_j is the $j^{th}$ element of the input (for example, output of an $(n-1)^{th}$ layer) vector of the $n^{th}$ layer during forward computation and in_gradient_i is the $i^{th}$ element of the input gradient vector (for example, the product of input gradient and the derivative f' in FIG. E9) of the $n^{th}$ layer during reverse computation. Input of the $n^{th}$ layer during forward computation is data existing at the start of reverse training, and is sent to the secondary computation modules 26 through the H tree module 24 and temporally stored in the neuron cache units 263. Then, the secondary computation modules 26, after completing computation of the partial sums of the output gradient vector, multiply the $i^{th}$ scalar of the input gradient vector and the input vector of the $n^{th}$ layer during forward computation to obtain weight updating gradient vectors dw and accordingly update the weights.

As shown in FIG. E4, an IO instruction is pre-stored at a starting address of the instruction cache unit. The control unit reads the IO instruction from the starting address of the instruction cache unit, and according to a microinstruction decoded from the IO instruction, the DMA reads all instructions related to single-layer artificial neural network reverse training from the external address space and caches them in the instruction cache unit. The control unit reads in a next IO instruction from the instruction cache unit, and according to a microinstruction decoded from the next IO instruction, the DMA reads all data required by the primary computation module from the external address space to the neuron cache unit of the primary computation module, the data including the input neurons, derivative value of the active function, and the input gradient vectors during previous forward computation. The control unit reads in another IO instruction from the instruction cache unit, and according to a microinstruction decoded from the another IO instruction, the DMA reads all weight data and weight gradient data required by the secondary computation modules from the external address space and stores them in weight cache units and weight gradient cache units of the corresponding secondary computation modules respectively. The control unit reads in a next CONFIG instruction from the instruction cache unit, and according to a microinstruction decoded from the next CONFIG instruction, the computation unit configures values of a register in the computation unit, including various constants required by computation of the present layer of the neural network, an accuracy setting for computation of the present layer, a learning rate for weight updating, and the like. The control unit reads in another COMPUTE instruction from the instruction cache unit, and according to a microinstruction decoded from the another CONFIG instruction, the primary computation module sends the input gradient vector and the input neuron during forward computation to each secondary computation module through the H tree module, in which the input gradient vector and the input neuron during forward computation may be stored in the neuron cache units of the secondary computation modules. According to a microinstruction decoded from the COMPUTE instruction, the computation units of the secondary computation modules read the weight vectors (for example, part of columns of the weight matrix stored in the secondary computation modules) from the weight cache units, complete vector multiply scalar computation on the weight vectors and the input gradient vector, and return the partial sums of the output vector through the H tree. Meanwhile, the secondary computation modules multiply the input gradient vectors and the input neurons and store the obtained weight gradients to the weight gradient cache units. In the H tree module, the output gradient partial sums returned by each secondary computation module are accumulated in pairs step by step to obtain the complete output gradient vector. The primary computation module obtains a returned value of the H tree module, reads the derivative value of the active function during forward computation from the neuron cache unit according to the microinstruction decoded from the COMPUTE instruction, multiplies the derivative value by the returned output vector to obtain the input gradient vector for reverse training of the next layer, and writes it back to the neuron cache unit. The control unit reads in yet another COMPUTE instruction from the instruction cache unit, and according to a microinstruction decoded from the yet another COMPUTE instruction, the secondary computation modules read the weight w from the weight cache units, read the present weight gradient dw and the weight gradient dw' used for last weight updating from the weight gradient cache units, and update the weight w. The control unit reads in yet another IO instruction from the instruction cache unit, the DMA stores the output gradient vector in the neuron cache unit to a specified address of the external address space according to a microinstruction decoded from the yet another IO instruction, and the computation is ended.

An implementation process for a multilayer artificial neural network is similar to the process for the single-layer neural network. After performing for a previous layer of the artificial neural network is completed, an operation instruction of a next layer may take an output gradient vector computed in the primary computation module as an input gradient vector for training of the next layer for the above-mentioned computation process. A weight address and weight gradient address in the instruction may also be changed into addresses corresponding to the present layer.

With adoption of the device for performing neural network reverse training, support to the multilayer artificial neural network forward computation is effectively improved. Adoption of a dedicated on-chip cache for multilayer neural network reverse training fully mines reusability of the input neurons and the weight data, avoids repeated reading of these data from the memory, reduces a memory access bandwidth, and solves the performance bottleneck problems brought by a memory bandwidth to the multilayer artificial neural network forward computation.

In S206, a target original image with the first resolution is acquired, and the target original image is compressed on the basis of the compression neural network model to obtain a target compressed image with the second resolution.

The target original image is an image consistent with the type of the tag information of the training image (image belonging to the same data set). If the loss function is convergent to the first threshold value or the count of training times is more than or equal to the second threshold value, training of the compression neural network is completed, the image may directly be input into the compression neural network and subjected to image compression to obtain the target compressed image, and the target compressed image may be recognized by the recognition neural network.

In one implementation, after the operation that the target original image is compressed on the basis of the compression neural network model to obtain the target compressed image with the second resolution, the method further may include that: the target compressed image is recognized on the basis of the recognition neural network model to obtain tag information of the target original image, and the tag information of the target original image is stored.

In other words, after training of the compression neural network is completed, the compressed image may be recognized on the basis of the recognition neural network model, so that artificial recognition efficiency and accuracy of the tag information are improved.

In S207, the target model is updated according to the loss function to obtain an updated model, the updated model is determined as the target model, a next training image is determined as the original image, and the S202 is performed.

According to the embodiment, the loss function is acquired through a reference tag value, which is obtained by the recognition neural network model obtained by training, and a target tag value of the original image. Training is completed if the loss function meets a preset condition or the present number of training times of the compression neural network exceeds the preset threshold value, otherwise the compression neural network is trained to repeatedly regulate its weight, in other words, an image content represented by each pixel in the same image is regulated, so as to reduce loss of the compression neural network. Image compression is performed through the compression neural network model obtained by training, so that image compression effectiveness is improved, and improvement of recognition accuracy is facilitated.

FIG. E10 is a schematic structure diagram of an image compression device 300 according to an embodiment of the application. As shown in FIG. E10, the image compression device 300 may include a processor 301 and a memory 302.

In the embodiment of the application, the memory 302 may be configured to store a first threshold value, a second threshold value, a present neural network model and the count of training times of a compression neural network, a compression training image set of the compression neural network, tag information of each training image in the compression training image set, a recognition neural network model, and a compression neural network model. The present neural network model of the compression neural network is determined as a target model, the compression neural network model is a corresponding target model if training of the compression neural network is completed, and the recognition neural network model is a corresponding neural network model if training of a recognition neural network is completed.

The processor 301 may be configured to acquire an original image with a first resolution, in which the original image may be any training image of the compression training image set and tag information of the original image may be determined as target tag information. The processor 301 may be configured to compress the original image on the basis of the target model to obtain a compressed image with a second resolution, in which the second resolution may be lower than the first resolution. The processor 301 may be further configured to recognize the compressed image on the basis of the recognition neural network model to obtain reference tag information. The processor 301 may be configured to acquire a loss function according to the target tag information and the reference tag information, if the loss function is convergent to the first threshold value or the count of training times is more than or equal to the second threshold value, to acquire a target original image with the first resolution, to confirm the target model to be the compression neural network model, and to compress the target original image on the basis of the compression neural network model to obtain a target compressed image with the second resolution.

In one implementation, the processor 301 is further configured to, if the loss function is not convergent to the first threshold value or the count of training times is smaller than the second threshold value, update the target model according to the loss function to obtain an updated model, to determine the updated model as the target model, to determine a next training image as the original image, and to perform the step of acquire the original image with the first resolution.

In one implementation, the processor 301 may be configured to preprocess the compressed image to obtain an image to be recognized and to recognize the image to be recognized on the basis of the recognition neural network model to obtain the reference tag information.

In one implementation, preprocessing may include size processing. The memory 302 may be further configured to store a basic image size of the recognition neural network. The processor 301 may be configured to, if an image size of the compressed image is smaller than the basic image size, fill the compressed image with pixels according to the basic image size to obtain the image to be recognized.

In one implementation, the compression training image set at least may include a recognition training image set. The processor 301 is further configured to adopt the recognition training image set to train the recognition neural network to obtain the recognition neural network model, each training image in the recognition training image set including at least tag information consistent with a type of the target tag information.

In one implementation, the processor 301 is further configured to recognize the target compressed image on the basis of the recognition neural network model to obtain tag information of a target original image.

The memory 302 is further configured to store the tag information of the target original image.

In one implementation, the compression training image set may include multiple dimensions. The processor 301 may be configured to recognize the original image on the basis of the target model to obtain multiple pieces of image information, each dimension corresponding to a piece of image information, and may be configured to compress the original image on the basis of the target model and the multiple pieces of image information to obtain the compressed image.

It can be understood that: the compressed image of the original image is acquired on the basis of the target model, the reference tag information of the compressed image is acquired on the basis of the recognition neural network model, the loss function is acquired according to the target tag information included in the original image and the reference tag information, if the loss function is convergent to the first threshold value or the present number of training times of the compression neural network is more than or equal to the second threshold value, training of the compression neural network configured for image compression is completed, the target model is determined as the compression neural network model, and the target compressed image of the target original image may be acquired on the basis of the compression neural network model. In other words, the loss function is acquired through a reference tag value obtained by the recognition neural network model obtained by training and a target tag value of the original image, training is completed if the loss function meets a preset condition or the present number of training times of the compression neural network exceeds the preset threshold value, otherwise the compression neural network is trained to repeatedly regulate its weight, in other words, an image content represented by each pixel in the same image is regulated, so as to reduce loss of the compression neural network, improve image compression effectiveness, and further facilitate improvement of the recognition accuracy.

An embodiment of the application, an electronic device 400 is provided. The electronic device 400 may include an image compression device 300. As shown in FIG. E11, the electronic device 400 may include a processor 401, a memory 402, a communication interface 403, and one or more programs 404. The one or more programs 404 are stored in the memory 402 and are configured to be performed by the processor 401. The programs 404 include instructions configured to perform part or all of the operations described in the abovementioned image compression method.

It is to be noted that each unit or module may be a circuit, including a digital circuit, an analogue circuit, and the like. Physical implementation of a structure of each unit or module may include, but is not limited to, a physical device, which may include, but is not limited to, a transistor, a memristor, and the like. The chip or the neural network processor may be any proper hardware processor, for example, a CPU, a GPU, an FPGA, a digital signal processor (DSP), and an ASIC. The storage unit may be any proper magnetic storage medium or magneto-optic storage medium, for example, a resistive random access memory (RRAM), a DRAM, a SRAM, an enhanced dynamic random access memory (EDRAM), a high bandwidth memory (HBM), and a hybrid memory cube (HMC), and the like.

The application may be applied to numerous universal or dedicated computer system environments or configurations, for example, a personal computer (PC), a server computer, a handheld device or a portable device, a tablet device, a multiprocessor system, a microprocessor-based system, a set-top box, a programmable consumer electronic device, a network PC, a minicomputer, a large computer, and a distributed computation environment including any abovementioned system or device.

According to an embodiment, the application provides a chip, which may include the abovementioned computation device. The chip may simultaneously perform various types of computation on a weight and an input neuron to achieve computational diversity. In addition, a dedicated on-chip cache for the multilayer artificial neural network computation algorithm is adopted, so that reusability of the input neurons and the weight data is fully mined, repeated reading of these data from the memory is avoided, a memory access bandwidth is reduced, and the problem that a memory bandwidth becomes a performance bottleneck of multilayer artificial neural network computation and a training algorithm of the multilayer artificial neural network computation is solved.

An embodiment of the application provides a chip package structure, which may include the abovementioned neural network processor.

An embodiment of the application provides a board card, which may include the abovementioned chip package structure.

An embodiment of the application provides an electronic device, which may include the abovementioned board card.

The electronic device may include, but is not limited to, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable device, a transportation means, a household electrical appliance, and a medical device.

The transportation means may include an airplane, a ship, and/or a vehicle. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

Those of ordinary skill in the art may realize that the units and algorithm steps of each example described in combination with the embodiments of the application may be implemented by electronic hardware, computer software, or a combination of the two. For clearly describing exchangeability of the hardware and the software, compositions and steps of each example have been generally described in the descriptions according to functions. Whether these functions are performed in a hardware or software manner depends on specific applications and design constraints of the technical solutions. Professionals may realize the described functions for each specific application by use of different methods, but such realization shall fall within the scope of the application.

Those skilled in the art may clearly know that, for convenient and brief description, working processes of terminals and units described above may refer to the corresponding processes in the method embodiments and will not be elaborated herein.

In the embodiments provided by the application, it is to be understood that the disclosed terminals and methods may be implemented in other manners. For example, the device embodiment described above is only schematic. For example, division of the units is only logical function division and another division manner may be adopted during practical implementation. For example, multiple units or components may be combined or integrated into another system or some characteristics may be neglected or not performed. In addition, coupling, direct coupling, or communication connection between each displayed or discussed component may be indirect coupling or communication connection, implemented through some interfaces, devices, or units, and may be electrical, mechanical, or in other forms.

The units described as separate parts may or may not be physically separated. Parts displayed as units may or may not be physical units, and for example, may be located in the same place, or may also be distributed in multiple network units. Part or all of the units may be selected to achieve the purpose of the solutions of the embodiments of the application according to a practical requirement.

In addition, each functional unit in the embodiments of the application may be integrated into a processing unit, each unit may also physically exist independently, and two or more units may also be integrated into one unit. The integrated unit may be implemented in the form of hardware or a software functional unit.

If being implemented in the form of a software functional unit and sold or used as an independent product, the integrated unit may be stored in a computer-readable storage medium. Based on such an understanding, all or part of the technical solutions may be embodied in form of software product. The computer software product is stored in a storage medium, including a plurality of instructions configured to enable a computer device (which may be a PC, a server, a network device, or the like) to perform all or part of the operations of the method in each embodiment of the application. The storage medium may include various media capable of storing program codes such as a U disk, a mobile hard disk, a read-only memory (ROM), a random access memory (RAM), a magnetic disk, or an optical disk.

It is to be noted that implementation modes which are not shown or described in the drawings or the body of the specification are all in forms known to those of ordinary skill in the art and are not described in detail. In addition, the definitions about each component and method are not limited to each specific structure, shape, or manner mentioned in the embodiments, to which those of ordinary skill in the art may make simple modifications or replacements.

The purposes, technical solutions, and beneficial effects of the application are further described above with the specific embodiments in detail. It is to be understood that the above is only the specific embodiment of the application and not intended to limit the application. Any modifications, equivalent replacements, improvements, and the like made within the spirit and principle of the application shall fall within the scope of protection of the application.

What is claimed:

1. A processing method, comprising:
   quantifying weights to generate a weight codebook;
   quantifying input neurons to generate a neuron codebook; and
   determining a computational codebook according to the weight codebook and the neuron codebook, wherein the quantifying the weights includes
      grouping the weights into one or more weight groups;
      clustering each of the one or more weight groups into one or more weight types in accordance with a clustering algorithm;
      assigning one or more weight indices respectively to the one or more weight types, wherein each of the weight indices corresponds to one of the one or more weight types;
      determining a weight dictionary, wherein the weight dictionary includes weight positions and weight indices;
      replacing the weights of each weight type with a central weight; and
      determining the weight codebook, wherein the weight codebook includes the weight indices and the central weights respectively corresponding to the one or more weight types.

2. The processing method of claim 1, wherein the quantifying the input neurons includes:
   dividing the input neurons into one or more segments, where each of the one or more segment corresponds to a neuron range and a neuron index;
   determining a neuron dictionary that includes the input neurons and the one or more segments respectively corresponding to the input neurons; and
   replacing the input neurons of each segment with a central neuron; and
   determining the neuron codebook that includes the one or more central neurons and the one or more neuron indices.

3. The processing method of claim 2, wherein the determining the computational codebook includes:
   determining the corresponding weight indices in the weight codebook according to the weights;
   determining the central weights corresponding to the weights based on the weight indices;
   determining the corresponding neuron indices in the neuron codebook according to the input neurons;
   determining the central neurons corresponding to the input neurons through the neuron indices; and
   generating the computational codebook in a form of a matrix based on the central weights and the central neurons.

4. The processing method of claim 3, wherein the generating the computational codebook is based on a computational operation includes at least one of: addition, multiplication, and pooling, and pooling includes average pooling, maximum pooling, and median pooling.

5. The processing method of claim 4, further comprising:
   retraining the weights and the input neurons, wherein during retraining, only the weight codebook and the neuron codebook are trained, contents in the weight dictionary and the neuron dictionary are kept unchanged, and adopting a back propagation algorithm for retraining.

6. The processing method of claim 1, wherein the grouping the weights includes:
   assigning the weights in a neural network into one weight group.

7. The processing method of claim 1, wherein the grouping the weights includes:
   dividing the weights of all convolutional layers, the weights of all fully connected layers, and the weights of all long short-term memory (LSTM) network layers in the neural network into three weight groups respectively.

8. The processing method of claim 1, wherein the grouping the weights includes:
   dividing the weights of one or more convolutional layers, the weights of one or more fully connected layers, and the weights of one or more LSTM network layers in the neural network into the one or more weight groups respectively.

9. The processing method of claim 1, wherein the grouping the weights includes:
   dividing the weights in a layer of the neural network into the one or more weight groups.

10. The processing method of claim 1, wherein the clustering algorithm includes K-means, K-medoids, Clara, and/or Clarans.

11. The processing method of claim 3, wherein a selection method for the central weight corresponding to each type includes: determining a value of $W_0$ if a cost function $J(w, w_0)$ is minimum, wherein the value of $W_0$ is the central weight, $$J(w, w_0) = \sum_{i=1}^{n}(w_i - w_0)^2,$$

$J(w,w_0)$ is the cost function, W refers to all the weights of the type, $W_0$ is the central weight, n is the count of all the weights of the type, $W_i$ is the $i^{th}$ weight of the type, $1 \le i \le n$, and i is a positive integer.

12. A neural network system, comprising:
   a memory configured to store one or more instructions; and
   a processor configured to:
      quantify weights to generate a weight codebook,
      quantify input neurons to generate a neuron codebook, and
      determine a computational codebook according to the weight codebook and the neuron codebook, wherein the processor is further configured to:
         group the weights into one or more weight groups;
         cluster each of the one or more weight groups into one or more weight types in accordance with a clustering algorithm;
         assign one or more weight indices respectively to the one or more weight types, wherein each of the weight indices corresponds to one of the one or more weight types;

determine a weight dictionary, wherein the weight dictionary includes weight positions and weight indices;

replace the weights of each weight type with a central weight; and determine the weight codebook, wherein the weight codebook includes the weight indices and the central weights respectively corresponding to the one or more weight types.

13. The neural network system of claim 12, wherein the processor is further configured to:

divide the input neurons into one or more segments, where each of the one or more segment corresponds to a neuron range and a neuron index;

determine a neuron dictionary that includes the input neurons and the one or more segments respectively corresponding to the input neurons; and replace the input neurons of each segment with a central neuron; and determine the neuron codebook that includes the one or more central neurons and the one or more neuron indices.

14. The neural network system of claim 13, wherein the processor is further configured to:

determine the corresponding weight indices in the weight codebook according to the weights;

determine the central weights corresponding to the weights based on the weight indices;

determine the corresponding neuron indices in the neuron codebook according to the input neurons;

determine the central neurons corresponding to the input neurons through the neuron indices; and generate the computational codebook in a form of a matrix based on the central weights and the central neurons.

15. The neural network system of claim 14, wherein the processor is configured to generate the computational codebook based on a computational operation includes at least one of: addition, multiplication, and pooling, and pooling includes average pooling, maximum pooling, and median pooling.

16. The neural network system of claim 15, wherein the processor is further configured to:

retrain the weights and the input neurons, wherein during retraining, only the weight codebook and the neuron codebook are trained, contents in the weight dictionary and the neuron dictionary are kept unchanged, and adopt a back propagation algorithm for retraining.

17. The neural network system of claim 12, wherein the processor is further configured to assign the weights in a neural network into one weight group.

18. The neural network system of claim 12, wherein the processor is further configured to divide the weights of all convolutional layers, the weights of all fully connected layers, and the weights of all long short-term memory (LSTM) network layers in the neural network into three weight groups respectively.

19. The neural network system of claim 12, wherein the processor is further configured to divide the weights of one or more convolutional layers, the weights of one or more fully connected layers, and the weights of one or more LSTM network layers in the neural network into the one or more weight groups respectively.

20. The neural network system of claim 12, wherein the processor is further configured to divide the weights in a layer of the neural network into the one or more weight groups.

21. The neural network system of claim 12, wherein the clustering algorithm includes K-means, K-medoids, Clara, and/or Clarans.

22. The neural network system of claim 12, wherein the processor is configured to determine the central weights by determining a value of $W_0$ if a cost function $J(w, w_0)$ is minimum, wherein the value of $W_0$ is the central weight, $$J(w, w_0) = \sum_{i=1}^{n} (w_i - w_0)^2,$$

$J(w,w_0)$ is the cost function, W refers to all the weights of the type, $W_0$ is the central weight, n is the count of all the weights of the type, $W_i$ is the $i^{th}$ weight of the type, $1 \leq i \leq n$, and i is a positive integer.

* * * * *